US011893214B2

(12) United States Patent
Triverio et al.

(10) Patent No.: US 11,893,214 B2
(45) Date of Patent: Feb. 6, 2024

(54) REAL-TIME COMMUNICATION USER INTERFACE

(71) Applicant: Apple Inc., Cupertino, CA (US)

(72) Inventors: Marco Triverio, San Francisco, CA (US); Jae Woo Chang, San Jose, CA (US); Lauren E. Tappana, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/740,104

(22) Filed: May 9, 2022

(65) Prior Publication Data

US 2022/0365643 A1    Nov. 17, 2022

Related U.S. Application Data

(60) Provisional application No. 63/189,081, filed on May 15, 2021.

(51) Int. Cl.
*G06F 3/0484* (2022.01)
*H04L 65/403* (2022.01)
(Continued)

(52) U.S. Cl.
CPC .......... *G06F 3/0484* (2013.01); *G06F 3/0482* (2013.01); *G06Q 10/1095* (2013.01); *H04L 51/046* (2013.01); *H04L 65/403* (2013.01)

(58) Field of Classification Search
CPC .. G06F 3/0484; G06F 3/0482; G06F 3/04842; H04L 51/046; H04L 65/403;
(Continued)

(56) References Cited

U.S. PATENT DOCUMENTS 5,617,526 A    4/1997 Oran et al.
6,726,094 B1   4/2004 Rantze et al.
(Continued)

FOREIGN PATENT DOCUMENTS

AU    2015100713 A4    6/2015
CA    2845537 A1       9/2014
(Continued)

OTHER PUBLICATIONS

Intention to Grant received for European Patent Application No. 20166552.8, dated Jun. 29, 2023, 8 pages.
(Continued)

*Primary Examiner* — Nicholas Ulrich
(74) *Attorney, Agent, or Firm* — DLA Piper LLP (US)

(57) ABSTRACT

The present disclosure generally relates to real-time communication user interfaces. A computer system displays a plurality of selectable options for sharing a link to a real-time communication session via a plurality of respective communication protocols. A computer system displays a selectable user interface element corresponding to a link to a real-time communication session that, when selected via user input, initiates a process to send the link to a user and displays a user interface for participating in the real-time communication session with the user. A computer system displays a visual representation of a user attempting to join a real-time communication session that includes an option that is selectable to determine whether the user is allowed to participate in the real-time communication session.

66 Claims, 44 Drawing Sheets

(51) Int. Cl.
*H04L 51/046* (2022.01)
*G06F 3/0482* (2013.01)
*G06Q 10/1093* (2023.01)

(58) Field of Classification Search
CPC . H04L 51/04; H04L 65/1069; H04L 65/1093; H04L 65/4015; H04L 12/1818; G06Q 10/1095; G06Q 10/1093
See application file for complete search history.

(56) References Cited

U.S. PATENT DOCUMENTS

| | | |
|---|---|---|
| 6,728,784 B1 | 4/2004 | Mattaway |
| 6,731,308 B1 | 5/2004 | Tang et al. |
| 7,185,054 B1 | 2/2007 | Ludwig et al. |
| 7,571,014 B1 | 8/2009 | Lambourne et al. |
| 7,801,971 B1 | 9/2010 | Amidon et al. |
| 7,903,171 B2 | 3/2011 | Takabatake et al. |
| 8,169,463 B2 | 5/2012 | Enstad et al. |
| 8,274,544 B2 | 9/2012 | Kurtz et al. |
| 8,370,448 B2 | 2/2013 | Galchev |
| 8,914,752 B1 | 12/2014 | Spiegel |
| 9,185,062 B1 | 11/2015 | Yang et al. |
| 9,253,531 B2 | 2/2016 | Relyea et al. |
| 9,380,264 B1 | 6/2016 | Vakalapudi |
| 9,462,017 B1 | 10/2016 | Siracusano, Jr. |
| 9,635,314 B2 | 4/2017 | Barkley et al. |
| 9,800,951 B1 | 10/2017 | Carlson et al. |
| 9,819,877 B1 | 11/2017 | Faulkner et al. |
| 10,194,189 B1 | 1/2019 | Goetz et al. |
| 10,284,812 B1 | 5/2019 | Van Os et al. |
| 10,353,532 B1 | 7/2019 | Holz et al. |
| 10,362,272 B1 | 7/2019 | Van Os et al. |
| 10,389,977 B1 | 8/2019 | Van Os et al. |
| 10,410,426 B2 | 9/2019 | Kamini et al. |
| 10,523,625 B1 | 12/2019 | Allen et al. |
| 10,523,976 B2 | 12/2019 | Hemmati et al. |
| 10,645,294 B1 | 5/2020 | Manzari et al. |
| 10,771,741 B1 | 9/2020 | Reynolds et al. |
| 10,909,586 B2 | 2/2021 | Avedissian et al. |
| 10,924,446 B1 | 2/2021 | Paul |
| 10,963,145 B1 | 3/2021 | Voss et al. |
| 10,972,655 B1 | 4/2021 | Ostap et al. |
| 11,079,913 B1 | 8/2021 | Kim et al. |
| 11,212,449 B1 | 12/2021 | Manzari et al. |
| 11,258,619 B2 | 2/2022 | Libin |
| 11,360,634 B1 | 6/2022 | Chang et al. |
| 11,449,188 B1 | 9/2022 | Chang et al. |
| 2001/0030597 A1 | 10/2001 | Inoue et al. |
| 2001/0041007 A1 | 11/2001 | Aoki |
| 2002/0101446 A1 | 8/2002 | Tang et al. |
| 2003/0112938 A1 | 6/2003 | Kanakubo et al. |
| 2003/0160861 A1 | 8/2003 | Barlow et al. |
| 2003/0225836 A1 | 12/2003 | Lee et al. |
| 2004/0003040 A1 | 1/2004 | Beavers et al. |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0124365 A1 | 6/2005 | Balasuriya et al. |
| 2005/0144247 A1 | 6/2005 | Christensen et al. |
| 2005/0233780 A1 | 10/2005 | Jani et al. |
| 2006/0002315 A1 | 1/2006 | Theurer et al. |
| 2006/0002523 A1 | 1/2006 | Bettis et al. |
| 2006/0098085 A1 | 5/2006 | Nichols et al. |
| 2006/0098634 A1 | 5/2006 | Umemoto et al. |
| 2006/0158730 A1 | 7/2006 | Kira |
| 2007/0004389 A1 | 1/2007 | Wallace et al. |
| 2007/0124783 A1 | 5/2007 | Ahiska et al. |
| 2008/0122796 A1 | 5/2008 | Jobs et al. |
| 2008/0313278 A1 | 12/2008 | Hochberg |
| 2009/0046075 A1 | 2/2009 | Kim et al. |
| 2009/0117936 A1 | 5/2009 | Maeng |
| 2009/0164587 A1 | 6/2009 | Gavita et al. |
| 2009/0174763 A1 | 7/2009 | Bengtsson et al. |
| 2009/0249244 A1 | 10/2009 | Robinson et al. |
| 2009/0256780 A1 | 10/2009 | Small et al. |
| 2009/0262206 A1 | 10/2009 | Park |
| 2009/0287790 A1 | 11/2009 | Upton et al. |
| 2009/0309897 A1 | 12/2009 | Morita et al. |
| 2010/0011065 A1 | 1/2010 | Scherpa et al. |
| 2010/0039498 A1 | 2/2010 | Liu et al. |
| 2010/0085416 A1 | 4/2010 | Hegde et al. |
| 2010/0097438 A1 | 4/2010 | Ujii |
| 2010/0121636 A1 | 5/2010 | Burke et al. |
| 2010/0162171 A1 | 6/2010 | Felt et al. |
| 2010/0169435 A1 | 7/2010 | Osullivan et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0318928 A1 | 12/2010 | Neuman et al. |
| 2010/0318939 A1 | 12/2010 | Moon |
| 2011/0085017 A1 | 4/2011 | Robinson et al. |
| 2011/0115875 A1 | 5/2011 | Sadwick et al. |
| 2011/0126148 A1 | 5/2011 | Krishnaraj et al. |
| 2011/0161836 A1 | 6/2011 | Mu et al. |
| 2011/0193995 A1 | 8/2011 | Goh et al. |
| 2011/0249073 A1 | 10/2011 | Cranfill et al. |
| 2011/0249086 A1 | 10/2011 | Guo et al. |
| 2011/0252146 A1 | 10/2011 | Santamaria et al. |
| 2011/0273526 A1 | 11/2011 | Mehin et al. |
| 2011/0296163 A1 | 12/2011 | Abernethy et al. |
| 2012/0002001 A1 | 1/2012 | Prentice |
| 2012/0019610 A1 | 1/2012 | Hornyak et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0092436 A1 | 4/2012 | Pahud et al. |
| 2012/0114108 A1 | 5/2012 | Katis et al. |
| 2012/0173383 A1 | 7/2012 | Badawiyeh et al. |
| 2012/0185355 A1 | 7/2012 | Kilroy |
| 2012/0188394 A1 | 7/2012 | Park et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0320141 A1 | 12/2012 | Bowen et al. |
| 2013/0055113 A1 | 2/2013 | Chazin et al. |
| 2013/0061155 A1 | 3/2013 | Hon |
| 2013/0088413 A1 | 4/2013 | Raffle et al. |
| 2013/0132865 A1 | 5/2013 | Li |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0216206 A1 | 8/2013 | Dubin et al. |
| 2013/0219276 A1 | 8/2013 | Shan |
| 2013/0225140 A1 | 8/2013 | Greisson |
| 2013/0282180 A1 | 10/2013 | Layton |
| 2013/0328770 A1 | 12/2013 | Parham |
| 2014/0018053 A1 | 1/2014 | Cho et al. |
| 2014/0026074 A1 | 1/2014 | Cortes et al. |
| 2014/0043424 A1 | 2/2014 | Gava et al. |
| 2014/0063176 A1 | 3/2014 | Modai et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0201126 A1 | 7/2014 | Zadeh et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0331149 A1 | 11/2014 | Labey |
| 2014/0349754 A1 | 11/2014 | Kaneoka et al. |
| 2014/0354759 A1 | 12/2014 | Cranfill et al. |
| 2014/0368719 A1 | 12/2014 | Kaneko et al. |
| 2014/0373081 A1 | 12/2014 | Dodson et al. |
| 2014/0375747 A1 | 12/2014 | Martinez et al. |
| 2015/0033149 A1 | 1/2015 | Kuchoor |
| 2015/0058413 A1 | 2/2015 | Ge |
| 2015/0067541 A1 | 3/2015 | Owens et al. |
| 2015/0078680 A1 | 3/2015 | Shakib et al. |
| 2015/0085057 A1 | 3/2015 | Ouyang et al. |
| 2015/0095804 A1 | 4/2015 | Grossman et al. |

(56) References Cited

U.S. PATENT DOCUMENTS

| | | |
|---|---|---|
| 2015/0106720 A1 | 4/2015 | Backer |
| 2015/0116353 A1 | 4/2015 | Miura et al. |
| 2015/0177914 A1 | 6/2015 | Coyner et al. |
| 2015/0193196 A1 | 7/2015 | Lin et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-Natal et al. |
| 2015/0304413 A1 | 10/2015 | Park |
| 2015/0319006 A1 | 11/2015 | Plummer et al. |
| 2015/0319144 A1 | 11/2015 | Barton et al. |
| 2015/0334140 A1 | 11/2015 | Singh et al. |
| 2015/0350143 A1 | 12/2015 | Lemay et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0370426 A1 | 12/2015 | Carrigan et al. |
| 2015/0373065 A1 | 12/2015 | Holmquist et al. |
| 2016/0014059 A1 | 1/2016 | Rathod |
| 2016/0014477 A1 | 1/2016 | Siders |
| 2016/0029004 A1 | 1/2016 | Campbell et al. |
| 2016/0057173 A1 | 2/2016 | Singman et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0180259 A1 | 6/2016 | Marianko et al. |
| 2016/0210602 A1 | 7/2016 | Siddique et al. |
| 2016/0212374 A1 | 7/2016 | Usbergo et al. |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0277708 A1 | 9/2016 | Rintel et al. |
| 2016/0277903 A1 | 9/2016 | Poosala et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0316038 A1 | 10/2016 | Jolfaei |
| 2016/0320849 A1 | 11/2016 | Koo |
| 2016/0335041 A1 | 11/2016 | Wachter et al. |
| 2016/0352661 A1 | 12/2016 | Yang et al. |
| 2016/0364106 A1 | 12/2016 | Koum et al. |
| 2016/0380780 A1 | 12/2016 | Stephenson et al. |
| 2017/0006162 A1 | 1/2017 | Bargetzi et al. |
| 2017/0024100 A1 | 1/2017 | Pieper et al. |
| 2017/0031557 A1 | 2/2017 | Xiangli et al. |
| 2017/0034583 A1 | 2/2017 | Long et al. |
| 2017/0048817 A1 | 2/2017 | Yang et al. |
| 2017/0064184 A1 | 3/2017 | Tsai |
| 2017/0083189 A1 | 3/2017 | Yang et al. |
| 2017/0094019 A1 | 3/2017 | Ahmed et al. |
| 2017/0097621 A1 | 4/2017 | Ackmann et al. |
| 2017/0111587 A1 | 4/2017 | Herbst et al. |
| 2017/0111595 A1 | 4/2017 | Soni et al. |
| 2017/0126592 A1 | 5/2017 | El |
| 2017/0150904 A1 | 6/2017 | Park et al. |
| 2017/0206779 A1 | 7/2017 | Lee et al. |
| 2017/0220212 A1 | 8/2017 | Yang et al. |
| 2017/0230585 A1 | 8/2017 | Nash et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0344253 A1 | 11/2017 | Zhang |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0359191 A1 | 12/2017 | Smith et al. |
| 2017/0359285 A1 | 12/2017 | Weinig et al. |
| 2017/0373868 A1 | 12/2017 | Deets, Jr. |
| 2018/0047200 A1 | 2/2018 | O'hara et al. |
| 2018/0048820 A1 | 2/2018 | Hinkel et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0091732 A1 | 3/2018 | Wilson et al. |
| 2018/0095616 A1 | 4/2018 | Valdivia et al. |
| 2018/0101297 A1 | 4/2018 | Yang et al. |
| 2018/0103074 A1* | 4/2018 | Rosenberg ............ G06F 3/0482 |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0139374 A1 | 5/2018 | Yu |
| 2018/0157455 A1 | 6/2018 | Troy et al. |
| 2018/0191965 A1 | 7/2018 | Faulkner et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0227341 A1 | 8/2018 | Rizzi |
| 2018/0228003 A1 | 8/2018 | O'driscoll et al. |
| 2018/0249047 A1 | 8/2018 | Marlatt |
| 2018/0293959 A1 | 10/2018 | Monga et al. |
| 2018/0295079 A1 | 10/2018 | Longo |
| 2018/0308480 A1 | 10/2018 | Jang et al. |
| 2018/0309801 A1 | 10/2018 | Rathod |
| 2018/0332559 A1 | 11/2018 | Gudivada et al. |
| 2018/0341448 A1 | 11/2018 | Behzadi et al. |
| 2018/0348764 A1 | 12/2018 | Zhang et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-Natal et al. |
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0068670 A1 | 2/2019 | Adam et al. |
| 2019/0102049 A1 | 4/2019 | Anzures et al. |
| 2019/0102145 A1 | 4/2019 | Wilberding et al. |
| 2019/0124021 A1 | 4/2019 | Demattei |
| 2019/0138951 A1 | 5/2019 | Brownhill et al. |
| 2019/0173939 A1* | 6/2019 | Lewis .................... G06Q 50/01 |
| 2019/0199963 A1 | 6/2019 | Ahn et al. |
| 2019/0199993 A1 | 6/2019 | Babu et al. |
| 2019/0205861 A1 | 7/2019 | Bace |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0297039 A1 | 9/2019 | Rodriguez et al. |
| 2019/0303861 A1 | 10/2019 | Mathias et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0347181 A1 | 11/2019 | Cranfill et al. |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0370805 A1 | 12/2019 | Van Os et al. |
| 2020/0050502 A1 | 2/2020 | Ghafourifar et al. |
| 2020/0055515 A1 | 2/2020 | Herman et al. |
| 2020/0106952 A1 | 4/2020 | Missig et al. |
| 2020/0106965 A1 | 4/2020 | Malia et al. |
| 2020/0135191 A1 | 4/2020 | Nourbakhsh |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0195887 A1 | 6/2020 | Van Os et al. |
| 2020/0213530 A1 | 7/2020 | Ahn |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0383157 A1 | 12/2020 | Lee et al. |

(56) References Cited

U.S. PATENT DOCUMENTS

| | | | |
|---|---|---|---|
| 2020/0385116 | A1 | 12/2020 | Sabripour et al. |
| 2020/0395012 | A1 | 12/2020 | Kim et al. |
| 2020/0400957 | A1 | 12/2020 | Van Heugten |
| 2021/0043189 | A1 | 2/2021 | Pyun |
| 2021/0064317 | A1 | 3/2021 | Juenger et al. |
| 2021/0065134 | A1 | 3/2021 | Chhabra et al. |
| 2021/0096703 | A1 | 4/2021 | Anzures et al. |
| 2021/0097768 | A1 | 4/2021 | Malia et al. |
| 2021/0099829 | A1 | 4/2021 | Soto et al. |
| 2021/0136129 | A1 | 5/2021 | Ponnusamy et al. |
| 2021/0144336 | A1 | 5/2021 | Van Os et al. |
| 2021/0152503 | A1 | 5/2021 | Rodriguez et al. |
| 2021/0158622 | A1 | 5/2021 | Leelaphattarakij et al. |
| 2021/0158830 | A1 | 5/2021 | Boehlke |
| 2021/0176204 | A1 | 6/2021 | Geppert et al. |
| 2021/0182169 | A1 | 6/2021 | Mardente et al. |
| 2021/0195084 | A1 | 6/2021 | Olajos et al. |
| 2021/0217106 | A1 | 7/2021 | Hauser et al. |
| 2021/0265032 | A1 | 8/2021 | Burgess et al. |
| 2021/0266274 | A1 | 8/2021 | Liu et al. |
| 2021/0306288 | A1* | 9/2021 | Boyd ................. G06F 3/04817 |
| 2021/0323406 | A1 | 10/2021 | So et al. |
| 2021/0333864 | A1 | 10/2021 | Harvey et al. |
| 2021/0349680 | A1 | 11/2021 | Kim et al. |
| 2021/0352172 | A1 | 11/2021 | Kim et al. |
| 2021/0360199 | A1 | 11/2021 | Oz et al. |
| 2021/0409359 | A1 | 12/2021 | Eirinberg et al. |
| 2022/0004356 | A1 | 1/2022 | Kim et al. |
| 2022/0006946 | A1 | 1/2022 | Missig et al. |
| 2022/0046186 | A1 | 2/2022 | Fayad et al. |
| 2022/0046222 | A1 | 2/2022 | Meier |
| 2022/0050578 | A1 | 2/2022 | Waldman et al. |
| 2022/0053142 | A1 | 2/2022 | Manzari et al. |
| 2022/0122089 | A1 | 4/2022 | Bonilla Kuhlmann et al. |
| 2022/0244836 | A1 | 8/2022 | O'Leary et al. |
| 2022/0247918 | A1 | 8/2022 | O'Leary et al. |
| 2022/0247919 | A1 | 8/2022 | O'Leary et al. |
| 2022/0278992 | A1 | 9/2022 | Baker et al. |
| 2022/0286314 | A1 | 9/2022 | Meyer et al. |
| 2022/0365739 | A1 | 11/2022 | Chang et al. |
| 2022/0365740 | A1 | 11/2022 | Chang et al. |
| 2022/0368548 | A1 | 11/2022 | Chang et al. |
| 2022/0368659 | A1 | 11/2022 | Chang et al. |
| 2022/0368742 | A1 | 11/2022 | Chang et al. |
| 2022/0374136 | A1 | 11/2022 | Chang et al. |
| 2023/0004264 | A1 | 1/2023 | Anzures et al. |
| 2023/0041125 | A1 | 2/2023 | Kim et al. |
| 2023/0094453 | A1 | 3/2023 | O'leary et al. |
| 2023/0098395 | A1 | 3/2023 | O'leary et al. |
| 2023/0109787 | A1 | 4/2023 | O'leary et al. |
| 2023/0143275 | A1* | 5/2023 | Opara ..................... G06F 9/543 |
| | | | 715/769 |
| 2023/0188674 | A1 | 6/2023 | Van Os et al. |
| 2023/0262317 | A1 | 8/2023 | O'leary et al. |

FOREIGN PATENT DOCUMENTS

| | | |
|---|---|---|
| CN | 1689327 A | 10/2005 |
| CN | 1890996 A | 1/2007 |
| CN | 101075173 A | 11/2007 |
| CN | 101431564 A | 5/2009 |
| CN | 101682622 A | 3/2010 |
| CN | 101853132 A | 10/2010 |
| CN | 101854247 A | 10/2010 |
| CN | 101917529 A | 12/2010 |
| CN | 102215217 A | 10/2011 |
| CN | 102572369 A | 7/2012 |
| CN | 102651731 A | 8/2012 |
| CN | 103039064 A | 4/2013 |
| CN | 103222247 A | 7/2013 |
| CN | 103237191 A | 8/2013 |
| CN | 103384235 A | 11/2013 |
| CN | 103442774 A | 12/2013 |
| CN | 103458215 A | 12/2013 |
| CN | 103649985 A | 3/2014 |
| CN | 103718152 A | 4/2014 |
| CN | 103748610 A | 4/2014 |
| CN | 104010158 A | 8/2014 |
| CN | 104081335 A | 10/2014 |
| CN | 104427288 A | 3/2015 |
| CN | 104469143 A | 3/2015 |
| CN | 104602133 A | 5/2015 |
| CN | 104869046 A | 8/2015 |
| CN | 104980578 A | 10/2015 |
| CN | 105094957 A | 11/2015 |
| CN | 105141498 A | 12/2015 |
| CN | 105204846 A | 12/2015 |
| CN | 105264473 A | 1/2016 |
| CN | 105389173 A | 3/2016 |
| CN | 105391778 A | 3/2016 |
| CN | 105554429 A | 5/2016 |
| CN | 105900376 A | 8/2016 |
| CN | 106210855 A | 12/2016 |
| CN | 106303648 A | 1/2017 |
| CN | 106471793 A | 3/2017 |
| CN | 106713946 A | 5/2017 |
| CN | 107066523 A | 8/2017 |
| CN | 107122049 A | 9/2017 |
| CN | 107491257 A | 12/2017 |
| CN | 107533417 A | 1/2018 |
| CN | 107534656 A | 1/2018 |
| CN | 107704177 A | 2/2018 |
| CN | 107728876 A | 2/2018 |
| CN | 104025538 B | 4/2018 |
| CN | 107992248 A | 5/2018 |
| CN | 109196825 A | 1/2019 |
| EP | 2056568 A1 | 5/2009 |
| EP | 2237536 A1 | 10/2010 |
| EP | 2600584 A1 | 6/2013 |
| EP | 2446619 B1 | 10/2015 |
| EP | 3038427 A1 | 6/2016 |
| EP | 2761582 B1 | 3/2017 |
| EP | 2258103 B1 | 5/2018 |
| EP | 3163866 B1 | 5/2020 |
| IN | 1038MUM2005 A | 6/2007 |
| JP | 2005-94696 A | 4/2005 |
| JP | 2007-150921 A | 6/2007 |
| JP | 2008-99330 A | 4/2008 |
| JP | 2013-524683 A | 6/2013 |
| JP | 2014-71835 A | 4/2014 |
| JP | 2014-87126 A | 5/2014 |
| JP | 2014-170982 A | 9/2014 |
| JP | 2015-11507 A | 1/2015 |
| JP | 2015-170234 A | 9/2015 |
| JP | 2016-1446 A | 1/2016 |
| JP | 2016-174282 A | 9/2016 |
| JP | 2017-228843 A | 12/2017 |
| JP | 2018-7158 A | 1/2018 |
| JP | 2018-56719 A | 4/2018 |
| KR | 10-2018-0085931 A | 7/2018 |
| KR | 10-2020-0039030 A | 4/2020 |
| WO | 01/18665 A1 | 3/2001 |
| WO | 2004/032507 A1 | 4/2004 |
| WO | 2005/060501 A2 | 7/2005 |
| WO | 2009/005914 A1 | 1/2009 |
| WO | 2010/137513 A1 | 12/2010 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/037170 A1 | 3/2012 |
| WO | 2012/170118 A1 | 12/2012 |
| WO | 2013/114821 A1 | 8/2013 |
| WO | 2014/052871 A1 | 4/2014 |
| WO | 2014/058937 A1 | 4/2014 |
| WO | 2016/168154 A1 | 10/2016 |
| WO | 2017/218143 A1 | 12/2017 |
| WO | 2017/218153 A1 | 12/2017 |
| WO | 2018/213401 A1 | 11/2018 |
| WO | 2018/213415 A1 | 11/2018 |
| WO | 2018/232333 A1 | 12/2018 |
| WO | 2019/067131 A1 | 4/2019 |
| WO | 2021/112983 A1 | 6/2021 |

(56) References Cited

FOREIGN PATENT DOCUMENTS

OTHER PUBLICATIONS

Notice of Allowance received for Australian Patent Application No. 2022228207, dated Jul. 3, 2023, 3 pages.
Notice of Allowance received for U.S. Appl. No. 17/483,564, dated Jul. 17, 2023, 46 pages.
Abdulezer et al., "Skype For Dummies", Available Online at: https://ixn.es/Skype%20For%20Dummies.pdf, 2007, 361 pages.
Applicant-Initiated Interview Summary received for U.S. Appl. No. 17/476,404, dated Jul. 27, 2022, 6 pages.
Applicant-Initiated Interview Summary received for U.S. Appl. No. 17/482,987, dated Apr. 11, 2022, 4 pages.
Applicant-Initiated Interview Summary received for U.S. Appl. No. 17/483,564, dated Jul. 21, 2022, 5 pages.
Applicant-Initiated Interview Summary received for U.S. Appl. No. 17/483,564, dated Mar. 14, 2022, 2 pages.
Applicant-Initiated Interview Summary received for U.S. Appl. No. 17/483,679, dated Apr. 29, 2022, 2 pages.
Applicant-Initiated Interview Summary received for U.S. Appl. No. 17/484,899, dated Apr. 27, 2022, 5 pages.
Applicant-Initiated Interview Summary received for U.S. Appl. No. 17/484,907, dated Jan. 10, 2022, 2 pages.
Corrected Notice of Allowance received for U.S. Appl. No. 17/027,373, dated Jul. 12, 2022, 2 pages.
Corrected Notice of Allowance received for U.S. Appl. No. 17/121,610, dated Jun. 7, 2022, 4 pages.
Corrected Notice of Allowance received for U.S. Appl. No. 17/157,166, dated Jun. 29, 2022, 4 pages.
Corrected Notice of Allowance received for U.S. Appl. No. 17/483,582, dated Feb. 15, 2022, 2 pages.
Corrected Notice of Allowance received for U.S. Appl. No. 17/484,907, dated Jun. 15, 2022, 2 pages.
Corrected Notice of Allowance received for U.S. Appl. No. 17/484,907, dated Mar. 18, 2022, 2 pages.
Final Office Action received for U.S. Appl. No. 17/483,564, dated Apr. 18, 2022, 23 pages.
Final Office Action received for U.S. Appl. No. 17/483,679, dated May 24, 2022, 21 pages.
Final Office Action received for U.S. Appl. No. 17/484,899, dated May 12, 2022, 29 pages.
"HuddleCamHD SimplTrack2 Auto Tracking Camera Installation & Operation Manual", Available Online at: https://huddlecamhd.com/wp-content/uploads/2021/01/SimplTrack2-User-Manual-v1_2-6-20.pdf, Jun. 2020, 41 pages.
International Search Report and Written Opinion received for PCT Patent Application No. PCT/US2022/014271, dated Jul. 4, 2022, 23 pages.
Invitation to Pay Additional Fees and Partial International Search Report received for PCT Patent Application No. PCT/US2022/014271, dated May 12, 2022, 20 pages.
Non-Final Office Action received for U.S. Appl. No. 17/482,987, dated Jan. 18, 2022, 25 pages.
Non-Final Office Action received for U.S. Appl. No. 17/483,549, dated Jan. 11, 2022, 5 pages.
Non-Final Office Action received for U.S. Appl. No. 17/483,564, dated Jan. 6, 2022, 23 pages.
Non-Final Office Action received for U.S. Appl. No. 17/483,679, dated Feb. 1, 2022, 19 pages.
Non-Final Office Action received for U.S. Appl. No. 17/484,899, dated Jan. 24, 2022, 24 pages.
Non-Final Office Action received for U.S. Appl. No. 17/484,907, dated Nov. 19, 2021, 24 pages.
Notice of Acceptance received for Australian Patent Application No. 2021203903, dated May 25, 2022, 3 pages.
Notice of Allowance received for Japanese Patent Application No. 2020-159840, dated Jul. 8, 2022, 4 pages (1 page of English Translation and 3 pages of Official Copy).
Notice of Allowance received for Korean Patent Application No. 10-2020-0123805, dated Jun. 19, 2022, 5 pages (2 pages of English Translation and 3 pages of Official Copy).
Notice of Allowance received for U.S. Appl. No. 17/027,373, dated Aug. 2, 2022, 2 pages.
Notice of Allowance received for U.S. Appl. No. 17/027,373, dated Jun. 3, 2022, 8 pages.
Notice of Allowance received for U.S. Appl. No. 17/121,610, dated Jul. 7, 2022, 5 pages.
Notice of Allowance received for U.S. Appl. No. 17/121,610, dated Jul. 13, 2022, 4 pages.
Notice of Allowance received for U.S. Appl. No. 17/482,987, dated Jun. 23, 2022, 9 pages.
Notice of Allowance received for U.S. Appl. No. 17/482,987, dated May 11, 2022, 10 pages.
Notice of Allowance received for U.S. Appl. No. 17/483,549, dated Apr. 15, 2022, 10 pages.
Notice of Allowance received for U.S. Appl. No. 17/483,582, dated Apr. 19, 2022, 5 pages.
Notice of Allowance received for U.S. Appl. No. 17/483,582, dated Jan. 20, 2022, 10 pages.
Notice of Allowance received for U.S. Appl. No. 17/484,907, dated Jul. 25, 2022, 10 pages.
Notice of Allowance received for U.S. Appl. No. 17/484,907, dated Mar. 2, 2022, 13 pages.
Notice of Allowance received for U.S. Appl. No. 17/484,907, dated May 20, 2022, 13 pages.
Office Action received for Chinese Patent Application No. 202010126661.4, dated Jun. 2, 2022, 11 pages (7 pages of English Translation and 4 pages of Official Copy).
Office Action received for Chinese Patent Application No. 202110327012.5, dated Apr. 29, 2022, 17 pages (10 pages of English Translation and 7 pages of Official Copy).
Office Action received for Chinese Patent Application No. 202110328601.5, dated Apr. 27, 2022, 25 pages (14 pages of English Translation and 11 pages of Official Copy).
Office Action received for Korean Patent Application No. 10-2021-7017731, dated May 30, 2022, 5 pages (2 pages of English Translation and 3 pages of Official Copy).
Applicant Initiated Interview Summary received for U.S. Appl. No. 16/790,619, dated Jul. 28, 2020, 3 pages.
Applicant-Initiated Interview Summary received for U.S. Appl. No. 16/528,941, dated Nov. 10, 2020, 2 pages.
Applicant-Initiated Interview Summary received for U.S. Appl. No. 16/528,941, dated Jun. 19, 2020, 3 pages.
Applicant-Initiated Interview Summary received for U.S. Appl. No. 16/799,481, dated Jul. 24, 2020, 3 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/121,610, dated Oct. 29, 2021, 2 pages.
Applicant-Initiated Interview Summary received for U.S. Appl. No. 17/223,794, dated Sep. 7, 2021, 3 pages.
Applicant-Initiated Interview Summary received for U.S. Appl. No. 17/476,404, dated Mar. 18, 2022, 2 pages.
Certificate of Examination received for Australian Patent Application No. 2019100499, dated Aug. 15, 2019, 2 pages.
Certificate of Examination received for Australian Patent Application No. 2019101062, dated Jun. 2, 2020, 2 pages.
Certificate of Examination received for Australian Patent Application No. 2020101324, dated Sep. 7, 2020, 2 pages.
Corrected Notice of Allowance received for U.S. Appl. No. 16/109,552, dated Jun. 13, 2019, 2 pages.
Corrected Notice of Allowance received for U.S. Appl. No. 16/144,572, dated Mar. 21, 2019, 3 pages.
Corrected Notice of Allowance received for U.S. Appl. No. 16/147,432, dated Jan. 18, 2019, 3 pages.
Corrected Notice of Allowance received for U.S. Appl. No. 16/147,432, dated Jul. 16, 2019, 3 pages.
Corrected Notice of Allowance received for U.S. Appl. No. 16/511,578, dated Feb. 13, 2020, 3 pages.

(56) References Cited

OTHER PUBLICATIONS

Corrected Notice of Allowance received for U.S. Appl. No. 16/790,619, dated Oct. 13, 2020, 3 pages.
Corrected Notice of Allowance received for U.S. Appl. No. 16/799,481, dated Oct. 27, 2020, 3 pages.
Corrected Notice of Allowance received for U.S. Appl. No. 17/121,610, dated Mar. 31, 2022, 3 pages.
Corrected Notice of Allowance received for U.S. Appl. No. 17/121,610, dated May 20, 2022, 4 pages.
Corrected Notice of Allowance received for U.S. Appl. No. 17/157,166, dated Apr. 13, 2022, 4 pages.
Corrected Notice of Allowance received for U.S. Appl. No. 17/157,166, dated Apr. 25, 2022, 4 pages.
Corrected Notice of Allowance received for U.S. Appl. No. 17/157,166, dated Dec. 9, 2021, 4 pages.
Corrected Notice of Allowance received for U.S. Appl. No. 17/157,166, dated Dec. 15, 2021, 4 pages.
Corrected Notice of Allowance received for U.S. Appl. No. 17/157,166, dated Jan. 5, 2022, 4 pages.
Corrected Search Report and Opinion received for Danish Patent Application No. PA201870364, dated Sep. 5, 2018, 13 pages.
Decision to Grant received for Danish Patent Application No. PA201870362, dated May 15, 2020, 2 pages.
Decision to Grant received for European Patent Application No. 19729395.4, dated Dec. 9, 2021, 2 pages.
Ex-Parte Quayle Action received for U.S. Appl. No. 17/121,610, dated Dec. 9, 2021, 7 pages.
Examiner Initiated-Interview Summary received for U.S. Appl. No. 16/528,941, dated Dec. 1, 2020, 2 pages.
Examiner-Initiated Interview Summary received for U.S. Appl. No. 17/027,373, dated Mar. 31, 2022, 4 pages.
Extended European Search Report received for European Patent Application No. 20166552.8, dated Jun. 12, 2020, 9 pages.
Extended European Search Report received for European Patent Application No. 20205496.1, dated Mar. 11, 2021, 11 pages.
Final Office Action received for U.S. Appl. No. 16/528,941, dated Jul. 13, 2020, 15 pages.
Final Office Action received for U.S. Appl. No. 17/026,818, dated Jan. 29, 2021, 21 pages.
Final Office Action received for U.S. Appl. No. 17/476,404, dated May 5, 2022, 30 pages.
Intention to Grant received for Danish Patent Application No. PA201870362, dated Feb. 14, 2020, 2 pages.
Intention to Grant received for Danish Patent Application No. PA202070617, dated Nov. 15, 2021, 2 pages.
Intention to Grant received for European Patent Application No. 19729395.4, dated Jul. 23, 2021, 10 pages.
International Preliminary Report on Patentability received for PCT Patent Application No. PCT/US2018/048151, dated Apr. 9, 2020, 14 pages.
International Preliminary Report on Patentability received for PCT Patent Application No. PCT/US2019/031202, dated Nov. 19, 2020, 13 pages.
International Search Report and Written Opinion received for PCT Patent Application No. PCT/US2018/048151, dated Jan. 10, 2019, 23 pages.
International Search Report and Written Opinion received for PCT Patent Application No. PCT/US2019/031202, dated Oct. 4, 2019, 19 pages.
International Search Report and Written Opinion received for PCT Patent Application No. PCT/US2021/031760, dated Sep. 16, 2021, 18 pages.
Invitation to Pay Additional Fees received for PCT Patent Application No. PCT/US2018/048151, dated Nov. 6, 2018, 18 pages.
Invitation to Pay Additional Fees received for PCT Patent Application No. PCT/US2019/031202, dated Aug. 8, 2019, 12 pages.
Minutes of the Oral Proceedings received for European Patent Application No. 19729395.4, dated Jul. 21, 2021, 6 pages.
Non-Final Office Action received for U.S. Appl. No. 16/035,422, dated Nov. 30, 2018, 13 pages.
Non-Final Office Action received for U.S. Appl. No. 17/157,166, dated Jul. 9, 2021, 12 pages.
Non-Final Office Action received for U.S. Appl. No. 17/476,404, dated Feb. 8, 2022, 26 pages.
Non-Final Office Action received for U.S. Appl. No. 16/109,552, dated Oct. 17, 2018, 16 pages.
Non-Final Office Action received for U.S. Appl. No. 16/144,572, dated Nov. 30, 2018, 8 pages.
Non-Final Office Action received for U.S. Appl. No. 16/383,403, dated Aug. 23, 2019, 10 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/790,619, dated May 4, 2020, 13 pages.
Non-Final Office Action received for U.S. Appl. No. 16/799,481, dated May 1, 2020, 13 pages.
Non-Final Office Action received for U.S. Appl. No. 17/026,818, dated Nov. 25, 2020, 20 pages.
Non-Final Office Action received for U.S. Appl. No. 17/027,373, dated Feb. 2, 2022, 17 pages.
Non-Final Office Action received for U.S. Appl. No. 17/121,610, dated May 13, 2021, 17 pages.
Non-Final Office Action received for U.S. Appl. No. 17/223,794, dated Jun. 16, 2021, 32 pages.
Notice of Acceptance received for Australian Patent Application No. 2019266225, dated Dec. 23, 2020, 3 pages.
Notice of Acceptance received for Australian Patent Application No. 2020239711, dated Dec. 16, 2021, 3 pages.
Notice of Acceptance received for Australian Patent Application No. 2021200789, dated Feb. 26, 2021, 3 pages.
Notice of Allowance received for Chinese Patent Application No. 201880056514.5, dated Jan. 11, 2021, 2 pages (1 page of English Translation and 1 page of Official Copy).
Notice of Allowance received for Chinese Patent Application No. 201910400180.5, dated Nov. 5, 2020, 2 pages (1 page of English Translation and 1 page of Official Copy).
Notice of Allowance received for Chinese Patent Application No. 202011243876.0, dated Sep. 8, 2021, 4 pages (1 page of English Translation and 3 pages of Official Copy).
Notice of Allowance received for Japanese Patent Application No. 2018-183504, dated Sep. 27, 2019, 4 pages (1 page of English Translation and 3 pages of Official Copy).
Notice of Allowance received for Japanese Patent Application No. 2019-194597, dated Nov. 19, 2021, 4 pages (1 page of English Translation and 3 pages of Official Copy).
Notice of Allowance received for Korean Patent Application No. 10-2020-7032110, dated Mar. 8, 2021, 4 pages (1 page of English Translation and 3 pages of Official Copy).
Notice of Allowance received for U.S. Appl. No. 16/035,422, dated Apr. 10, 2019, 6 pages.
Notice of Allowance received for U.S. Appl. No. 16/528,941, dated Aug. 10, 2021, 5 pages.
Notice of Allowance received for U.S. Appl. No. 16/528,941, dated May 19, 2021, 5 pages.
Notice of Allowance received for U.S. Appl. No. 17/157,166, dated Nov. 16, 2021, 6 pages.
Notice of Allowance received for U.S. Appl. No. 16/109,552, dated Mar. 13, 2019, 25 pages.
Notice of Allowance received for U.S. Appl. No. 16/109,552, dated May 13, 2019, 2 pages.
Notice of Allowance received for U.S. Appl. No. 16/144,572, dated Feb. 28, 2019, 7 pages.
Notice of Allowance received for U.S. Appl. No. 16/147,432, dated Dec. 18, 2018, 13 pages.
Notice of Allowance received for U.S. Appl. No. 16/147,432, dated May 20, 2019, 6 pages.
Notice of Allowance received for U.S. Appl. No. 16/383,403, dated Jan. 10, 2020, 11 pages.
Notice of Allowance received for U.S. Appl. No. 16/511,578, dated Nov. 18, 2019, 12 pages.

(56) References Cited

OTHER PUBLICATIONS

Notice of Allowance received for U.S. Appl. No. 16/790,619, dated Sep. 8, 2020, 6 pages.
Notice of Allowance received for U.S. Appl. No. 16/799,481, dated Sep. 8, 2020, 6 pages.
Notice of Allowance received for U.S. Appl. No. 17/026,818, dated May 13, 2021, 10 pages.
Notice of Allowance received for U.S. Appl. No. 17/121,610, dated Mar. 11, 2022, 5 pages.
Notice of Allowance received for U.S. Appl. No. 17/157,166, dated Mar. 30, 2022, 6 pages.
Office Action received for Australian Patent Application No. 2019100499, dated Jun. 28, 2019, 4 pages.
Office Action received for Australian Patent Application No. 2019101062, dated Apr. 22, 2020, 2 pages.
Office Action received for Australian Patent Application No. 2019101062, dated Dec. 5, 2019, 3 pages.
Office Action received for Australian Patent Application No. 2019266225, dated Nov. 23, 2020, 4 pages.
Office Action received for Australian Patent Application No. 2020239711, dated Sep. 13, 2021, 5 pages.
Office Action received for Australian Patent Application No. 2021203903, dated Feb. 24, 2022, 3 pages.
Office Action received for Chinese Patent Application No. 201880056514.5, dated Sep. 2, 2020, 7 pages (1 page of English Translation and 6 pages of Official Copy).
Office Action received for Chinese Patent Application No. 201910400179.2, dated Dec. 27, 2021, 32 pages (13 pages of English Translation and 19 pages of Official Copy).
Office Action received for Chinese Patent Application No. 201910400180.5, dated Jun. 1, 2020, 11 pages (5 pages of English Translation and 6 pages of Official Copy).
Office Action received for Chinese Patent Application No. 201910704856.X, dated Apr. 6, 2021, 13 pages (7 pages of English Translation and 6 pages of Official Copy).
Office Action received for Chinese Patent Application No. 201910704856.X, dated Dec. 9, 2020, 23 pages (13 pages of English Translation and 10 pages of Official Copy).
Office Action received for Chinese Patent Application No. 201910704856.X, dated May 27, 2020, 26 pages (14 pages of English Translation and 12 pages of Official Copy).
Office Action received for Chinese Patent Application No. 202010126661.4, dated Feb. 3, 2021, 16 pages (9 pages of English Translation and 7 pages of Official Copy).
Office Action received for Chinese Patent Application No. 202010126661.4, dated Mar. 4, 2022, 13 pages (8 pages of English Translation and 5 pages of Official Copy).
Office Action received for Chinese Patent Application No. 202011243876.0, dated Apr. 6, 2021, 11 pages (5 pages of English Translation and 6 pages of Official Copy).
Office Action received for Chinese Patent Application No. 202110328597.2, dated Apr. 15, 2022, 18 pages (9 pages of English Translation and 9 pages of Official Copy).
Office Action received for Chinese Patent Application No. 202110328602.X, dated Mar. 24, 2022, 6 pages (3 pages of English Translation and 3 pages of Official Copy).
Office Action received for Danish Patent Application No. PA201870362, dated Aug. 22, 2019, 4 pages.
Office Action received for Danish Patent Application No. PA201870362, dated Dec. 18, 2018, 2 pages.
Office Action received for Danish Patent Application No. PA201870363, dated Mar. 26, 2019, 3 pages.
Office Action received for Danish Patent Application No. PA201870364, dated Jan. 28, 2019, 8 pages.
Office Action received for Danish Patent Application No. PA201870364, dated Jun. 11, 2019, 11 pages.
Office Action received for Danish Patent Application No. PA202070617, dated Sep. 24, 2021, 4 pages.
Office Action received for European Patent Application No. 18779093.6, dated Dec. 11, 2020, 4 pages.
Office Action received for European Patent Application No. 18779093.6, dated Mar. 17, 2022, 4 pages.
Office Action received for European Patent Application No. 19729395.4, dated Jul. 15, 2020, 4 pages.
Office Action received for European Patent Application No. 19729395.4, dated Sep. 29, 2020, 10 pages.
Office Action received for European Patent Application No. 20166552.8, dated Mar. 24, 2021, 8 pages.
Office Action received for European Patent Application No. 20205496.1, dated Nov. 10, 2021, 5 pages.
Office Action received for Indian Patent Application No. 201814036860, dated Jul. 29, 2021, 8 pages.
Office Action received for Indian Patent Application No. 202014041529, dated Dec. 6, 2021, 6 pages.
Office Action received for Japanese Patent Application No. 2019-194597, datec Jan. 18, 2021, 10 pages (5 pages of English Translation and 5 pages of Official Copy).
Office Action received for Japanese Patent Application No. 2020-159840, dated Dec. 10, 2021, 13 pages (7 pages of English Translation and 6 pages of Official Copy).
Office Action received for Japanese Patent Application No. 2020-159840, dated Mar. 28, 2022, 6 pages (3 pages of English Translation and 3 pages of Official Copy).
Office Action received for Korean Patent Application No. 10-2020-7032110, dated Dec. 15, 2020, 6 pages (2 pages of English Translation and 4 pages of official Copy).
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Search Report and Opinion received for Danish Patent Application No. PA201870362, dated Sep. 7, 2018, 9 pages.
Search Report and Opinion received for Danish Patent Application No. PA201870363, dated Sep. 11, 2018, 12 pages.
Search Report and Opinion received for Danish Patent Application No. PA201870364, dated Sep. 4, 2018, 12 pages.
Search Report and Opinion received for Danish Patent Application No. PA202070617, dated Dec. 23, 2020, 8 pages.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Corrected Notice of Allowance received for U.S. Appl. No. 17/950,900, dated Jun. 30, 2023, 2 pages.
Office Action received for European Patent Application No. 18779093.6, dated Jun. 28, 2023, 4 pages.
Applicant-Initiated Interview Summary received for U.S. Appl. No. 17/479,897, dated Jun. 12, 2023, 2 pages.
Applicant-Initiated Interview Summary received for U.S. Appl. No. 17/483,564, dated Jun. 21, 2023, 4 pages.
Examiner Interview Summary received for U.S. Appl. No. 17/903,946, dated Jun. 28, 2023, 2 pages.
Final Office Action received for U.S. Appl. No. 17/483,679, dated Jun. 13, 2023, 33 pages.
Non-Final Office Action received for U.S. Appl. No. 17/484,899, dated Jun. 14, 2023, 41 pages.
Notice of Allowance received for U.S. Appl. No. 17/950,900, dated Jun. 16, 2023, 6 pages.
Office Action received for Chinese Patent Application No. 202111652452.4, dated May 19, 2023, 15 pages (8 pages of English Translation and 7 pages of Official Copy).

(56) References Cited

OTHER PUBLICATIONS

Applicant-Initiated Interview Summary received for U.S. Appl. No. 17/476,404, dated Jun. 2, 2023, 2 pages.
Final Office Action received for U.S. Appl. No. 17/483,564, dated May 25, 2023, 26 pages.
Notice of Acceptance received for Australian Patent Application No. 2022201532, dated May 22, 2023, 3 pages.
Office Action received for Chinese Patent Application No. 202110328597.2, dated May 15, 2023, 13 pages (6 pages of English Translation and 7 pages of Official Copy).
Advisory Action received for U.S. Appl. No. 17/483,679, dated Sep. 20, 2022, 8 pages.
Applicant-Initiated Interview Summary received for U.S. Appl. No. 17/476,404, dated Dec. 20, 2022, 2 pages.
Applicant-Initiated Interview Summary received for U.S. Appl. No. 17/479,897, dated Oct. 31, 2022, 3 pages.
Applicant-Initiated Interview Summary received for U.S. Appl. No. 17/482,977, dated Dec. 5, 2022, 2 pages.
Applicant-Initiated Interview Summary received for U.S. Appl. No. 17/483,542, dated Nov. 23, 2022, 4 pages.
Applicant-Initiated Interview Summary received for U.S. Appl. No. 17/483,679, dated Aug. 23, 2022, 3 pages.
Applicant-Initiated Interview Summary received for U.S. Appl. No. 17/484,899, dated Sep. 1, 2022, 5 pages.
Corrected Notice of Allowance received for U.S. Appl. No. 17/027,373, dated Oct. 26, 2022, 2 pages.
Corrected Notice of Allowance received for U.S. Appl. No. 17/483,549, dated Aug. 24, 2022, 3 pages.
Corrected Notice of Allowance received for U.S. Appl. No. 17/484,907, dated Aug. 26, 2022, 2 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2022/029261, dated Oct. 20, 2022, 18 pages.
International Search Report and Written Opinion received for PCT Patent Application No. PCT/US2022/029273, dated Oct. 27, 2022, 19 pages.
International Search Report and Written Opinion received for PCT Patent Application No. PCT/US2022/029580, dated Nov. 7, 2022, 20 pages.
Invitation to Pay Additional Fees and Partial International Search Report received for PCT Patent Application No. PCT/US2022/029261, dated Aug. 29, 2022, 16 pages.
Invitation to Pay Additional Fees and Partial International Search Report received for PCT Patent Application No. PCT/US2022/029580, dated Sep. 5, 2022, 13 pages.
Invitation to Pay Additional Fees received for PCT Patent Application No. PCT/US2022/029273, dated Sep. 2, 2022, 13 pages.
Invitation to Pay Search Fees received for European Patent Application No. 21728781.2, dated Dec. 2, 2022, 3 pages.
Non-Final Office Action received for U.S. Appl. No. 17/476,404, dated Sep. 14, 2022, 31 pages.
Non-Final Office Action received for U.S. Appl. No. 17/479,897, dated Aug. 30, 2022, 10 pages.
Non-Final Office Action received for U.S. Appl. No. 17/482,977, dated Oct. 13, 2022, 20 pages.
Non-Final Office Action received for U.S. Appl. No. 17/483,542, dated Sep. 22, 2022, 18 pages.
Non-Final Office Action received for U.S. Appl. No. 17/483,564, dated Nov. 28, 2022, 24 pages.
Non-Final Office Action received for U.S. Appl. No. 17/483,679, dated Dec. 9, 2022, 31 pages.
Notice of Allowance received for Chinese Patent Application No. 201910400179.2, dated Oct. 9, 2022, 4 pages (1 page of English Translation and 3 pages of Official Copy).
Notice of Allowance received for Korean Patent Application No. Oct. 10-2022-0091730, dated Oct. 4, 2022, 5 pages (2 pages of English Translation and 3 pages of Official Copy).
Notice of Allowance received for U.S. Appl. No. 17/027,373, dated Oct. 3, 2022, 5 pages.
Office Action received for Australian Patent Application No. 2022201532, dated Dec. 19, 2022, 5 pages.
Office Action received for Chinese Patent Application No. 202110327012.5, dated Nov. 28, 2022, 16 pages (10 pages of English Translation and 6 pages of Official Copy).
Office Action received for Chinese Patent Application No. 202110328597.2, dated Oct. 10, 2022, 13 pages (7 pages of English Translation and 6 pages of Official Copy).
Office Action received for Chinese Patent Application No. 202110328601.5, dated Nov. 2, 2022, 29 pages (19 pages of English Translation and 10 pages of Official Copy).
Office Action received for Chinese Patent Application No. 202110328602.X, dated Dec. 1, 2022, 28 pages (17 pages of English Translation 11 pages of Official Copy).
Office Action received for Chinese Patent Application No. 202111652452.4, dated Aug. 29, 2022, 23 pages (12 pages of English Translation and 11 pages of Official Copy).
QQ, "Method of QQ voice chat", Online Available at: https://www.taodocs.com/p-47909082.html, May 25, 2016, 3 pages (Official Copy only). {See Communication under 37 CFR § 1.98(a) (3)}.
Summons to Attend Oral Proceedings received for European Patent Application No. 20205496.1, dated Sep. 8, 2022, 9 pages.
6. Voice chat with friends through QQ, online available at: https://v.qq.com/x/page/a0166p7xrt0.html, Sep. 22, 2015, 1 page (Official Copy Only) (See Communication under 37 CFR § 1.98(a) (3)).
Applicant-Initiated Interview Summary received for U.S. Appl. No. 17/483,542, dated May 22, 2023, 3 pages.
Applicant-Initiated Interview Summary received for U.S. Appl. No. 17/483,564, dated Apr. 21, 2023, 5 pages.
Applicant-Initiated Interview Summary received for U.S. Appl. No. 17/483,679, dated May 19, 2023, 3 pages.
Applicant-Initiated Interview Summary received for U.S. Appl. No. 17/950,900, dated Jan. 26, 2023, 5 pages.
Brief Communication Regarding Oral Proceedings received for European Patent Application No. 20205496.1, dated Apr. 19, 2023, 1 page.
Corrected Notice of Allowance received for U.S. Appl. No. 17/482,977, dated Apr. 24, 2023, 3 pages.
Corrected Notice of Allowance received for U.S. Appl. No. 17/950,900, dated Apr. 14, 2023, 2 pages.
Corrected Notice of Allowance received for U.S. Appl. No. 17/950,922, dated Apr. 14, 2023, 2 pages.
Decision to Refuse received for European Patent Application No. 20205496.1, dated May 12, 2023, 16 pages.
Final Office Action received for U.S. Appl. No. 17/479,897, dated Jan. 10, 2023, 15 pages.
Final Office Action received for U.S. Appl. No. 17/950,900, dated Jan. 23, 2023, 14 pages.
International Search Report and Written Opinion received for PCT Patent Application No. PCT/US2022/044592, dated Mar. 14, 2023, 22 pages.
Invitation to Pay Additional Fees received for PCT Patent Application No. PCT/US2022/044592, dated Jan. 16, 2023, 21 pages.
Minutes of the Oral Proceedings received for European Patent Application No. 20205496.1, dated May 9, 2023, 7 pages.
Non-Final Office Action received for U.S. Appl. No. 17/476,404, dated Mar. 30, 2023, 29 pages.
Non-Final Office Action received for U.S. Appl. No. 17/479,897, dated Apr. 25, 2023, 14 pages.
Non-Final Office Action received for U.S. Appl. No. 17/483,542, dated Jan. 31, 2023, 14 pages.
Non-Final Office Action received for U.S. Appl. No. 17/872,736, dated May 11, 2023, 17 pages.
Non-Final Office Action received for U.S. Appl. No. 17/903,946, dated Apr. 14, 2023, 17 pages.
Non-Final Office Action received for U.S. Appl. No. 17/950,900, dated Dec. 1, 2022, 14 pages.
Notice of Allowance received for Japanese Patent Application No. 2021-206121, dated May 15, 2023, 4 pages (1 page of English Translation and 3 pages of Official Copy).

(56) References Cited

OTHER PUBLICATIONS

Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2021-7017731, dated Feb. 28, 2023, 5 pages (2 pages of English Translation and 3 pages of Official Copy).
Notice of Allowance received for U.S. Appl. No. 17/482,977, dated Jan. 24, 2023, 10 pages.
Notice of Allowance received for U.S. Appl. No. 17/950,900, dated Mar. 7, 2023, 10 pages.
Notice of Allowance received for U.S. Appl. No. 17/950,922, dated Apr. 5, 2023, 10 pages.
Office Action received for Australian Patent Application No. 2022228207, dated Apr. 28, 2023, 3 pages.
Office Action received for Chinese Patent Application No. 202110327012.5, dated Mar. 16, 2023, 12 pages (7 pages of English Translation and 5 pages of Official Copy).
Office Action received for Chinese Patent Application No. 202110328601.5, dated Mar. 24, 2023, 25 pages (15 pages of English Translation and 10 pages of Official Copy).
Office Action received for Chinese Patent Application No. 202111652452.4, dated Feb. 11, 2023, 28 pages (13 pages of English Translation and 15 pages of Official Copy).
Office Action received for European Patent Application No. 21728781.2, dated Mar. 1, 2023, 13 pages.
Office Action received for Indian Patent Application No. 202015013360, dated Mar. 17, 2023, 7 pages.
Office Action received for Indian Patent Application No. 202215025360, dated Mar. 29, 2023, 6 pages.
Office Action received for Indian Patent Application No. 202215025361, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Office Action received for Japanese Patent Application No. 2021-206121, dated Feb. 20, 2023, 7 pages (3 pages of English Translation and 4 pages of Official Copy).
Result of Consultation received for European Patent Application No. 20205496.1, dated Apr. 18, 2023, 3 pages.
Dolan Tim, "How To Make a Laptop Webcam into a Document Camera—IPEVO Mirror—Cam Review", Retrieved from the Internet: URL: https://www.youtube.com/watch?v=- K8jyZ1hbbg, Aug. 29, 2020, 1 page.
Jiutian Technology, "Windows 8 Chinese version from entry to proficiency", Jan. 1, 2014, 5 pages (Official Copy Only) (See Communication under 37 CFR § 1.98(a) (3)).
Larson Tom, "How to Turn your Webcam into a Document Camera", Retrieved from the Internet: URL: https://www.youtube.com/watchv=UlaW22FxRZM, Nov. 7, 2020, 1 page.
Song Jianhua, "Guidelines for Network", Feb. 29, 2008, 11 pages (Official Copy Only) (See Communication under 37 CFR § 1.98(a) (3)).
Intention to Grant received for European Patent Application No. 21728781.2, dated Jul. 28, 2023, 9 pages.
Non-Final Office Action received for U.S. Appl. No. 17/732,204, dated Aug. 4, 2023, 18 pages.
Office Action received for Chinese Patent Application No. 202110328597.2, dated Jul. 18, 2023, 16 pages (1 page of English Translation and 15 pages of Official Copy).
Office Action received for Chinese Patent Application No. 202110328602.X, dated Jun. 29, 2023, 27 pages (18 pages of English Translation and 9 pages of Official Copy).
Applicant-Initiated Interview Summary received for U.S. Appl. No. 17/483,679, dated Aug. 18, 2023, 2 pages.
Corrected Notice of Allowance received for U.S. Appl. No. 17/479,897, dated Aug. 17, 2023, 2 pages.
Corrected Notice of Allowance received for U.S. Appl. No. 17/483,542, dated Aug. 25, 2023, 3 pages.
Ex-Parte Quayle Action received for U.S. Appl. No. 17/903,946, dated Aug. 4, 2023, 4 pages.
International Preliminary Report on Patentability received for PCT Patent Application No. PCT/US2022/014271, dated Aug. 10, 2023, 17 pages.
Non-Final Office Action received for U.S. Appl. No. 17/684,843, dated Aug. 11, 2023, 23 pages.
Notice of Allowance received for U.S. Appl. No. 17/483,542, dated Aug. 11, 2023, 9 pages.
Notice of Allowance received for U.S. Appl. No. 17/872,736, dated Aug. 21, 2023, 6 pages.
Applicant-Initiated Interview Summary received for U.S. Appl. No. 17/872,736, dated Jul. 25, 2023, 2 pages.
Garrison DR., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
Notice of Allowance received for Chinese Patent Application No. 202110328601.5, dated Jul. 5, 2023, 5 pages (1 page of English Translation and 4 pages of Official Copy).
Notice of Allowance received for U.S. Appl. No. 17/479,897, dated Jul. 26, 2023, 7 pages.
Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only) (See Communication Under 37 CFR § 1.98(a) (3)).
Applicant-Initiated Interview Summary received for U.S. Appl. No. 17/484,899, dated Sep. 12, 2023, 6 pages.
Final Office Action received for U.S. Appl. No. 17/476,404, dated Sep. 12, 2023, 30 pages.
Notice of Allowance received for U.S. Appl. No. 17/872,736, dated Aug. 30, 2023, 4 pages.
Non-Final Office Action received for U.S. Appl. No. 17/483,679, dated Sep. 13, 2023, 32 pages.
Notice of Allowance received for U.S. Appl. No. 17/950,922, dated Sep. 20, 2023, 6 pages.
Notice of Hearing received for Indian Patent Application No. 201814036860, dated Sep. 8, 2023, 2 pages.
International Preliminary Report on Patentability received for PCT Patent Application No. PCT/US2022/029273, dated Nov. 30, 2023, 14 pages.

\* cited by examiner

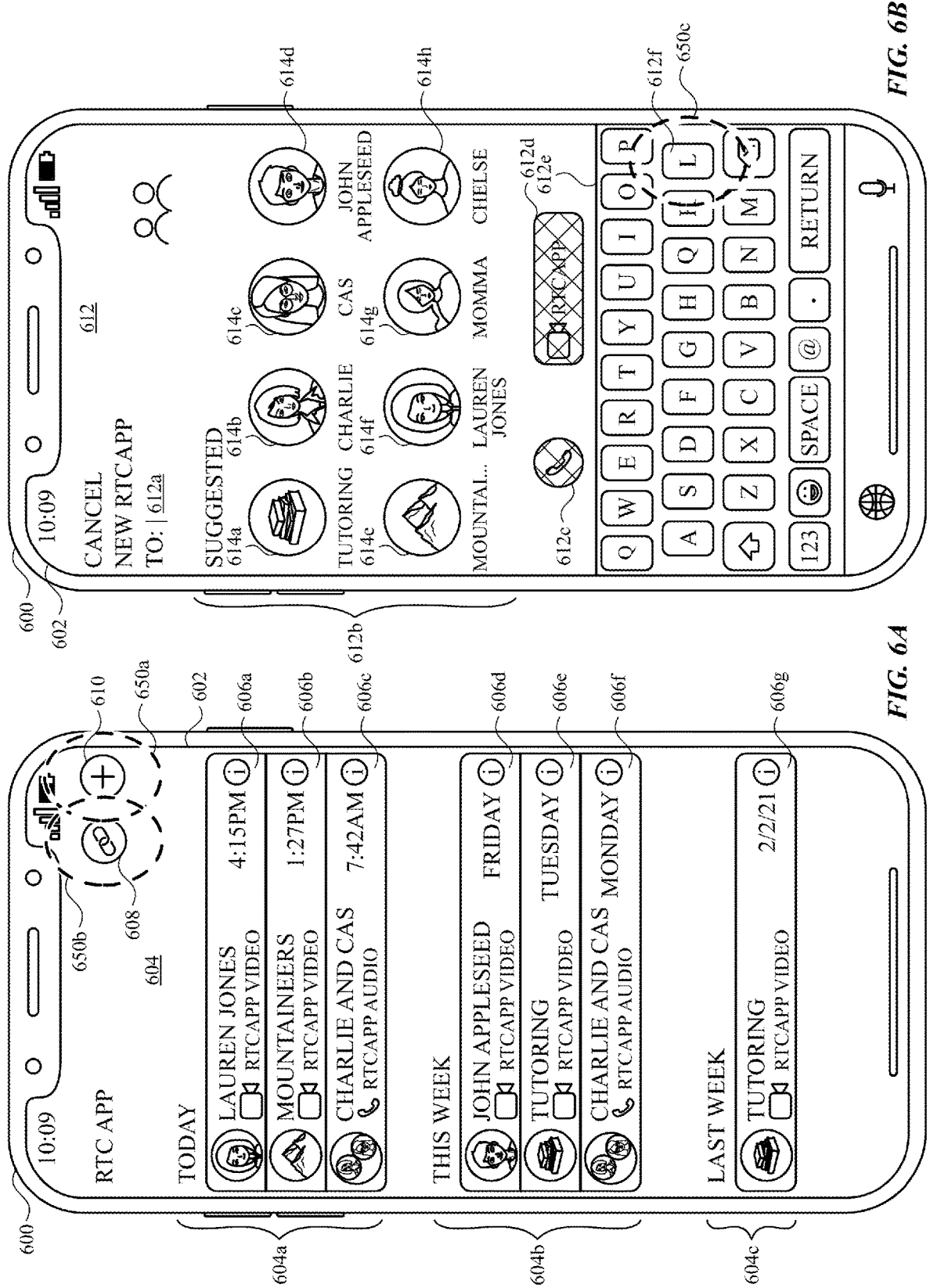

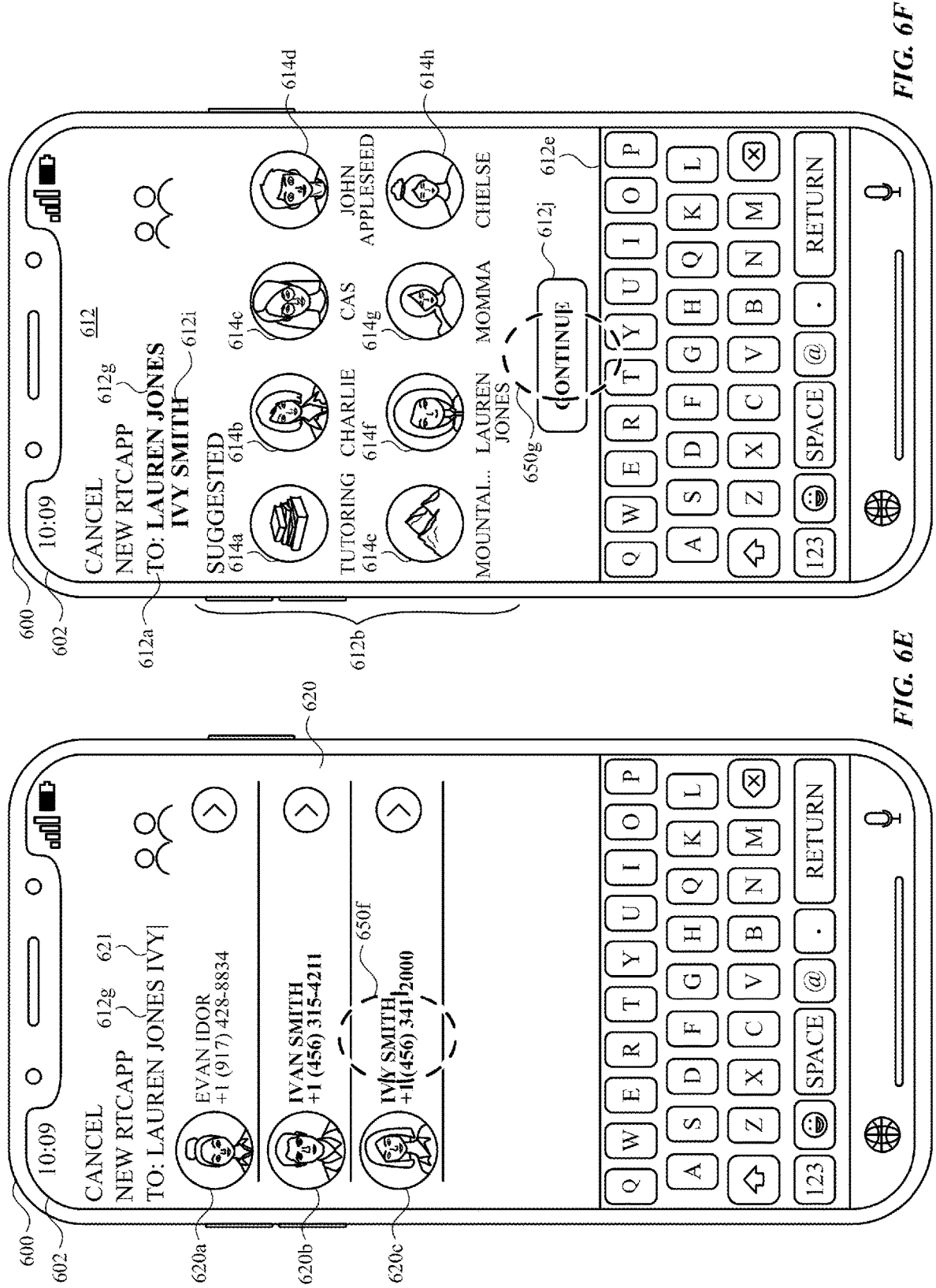

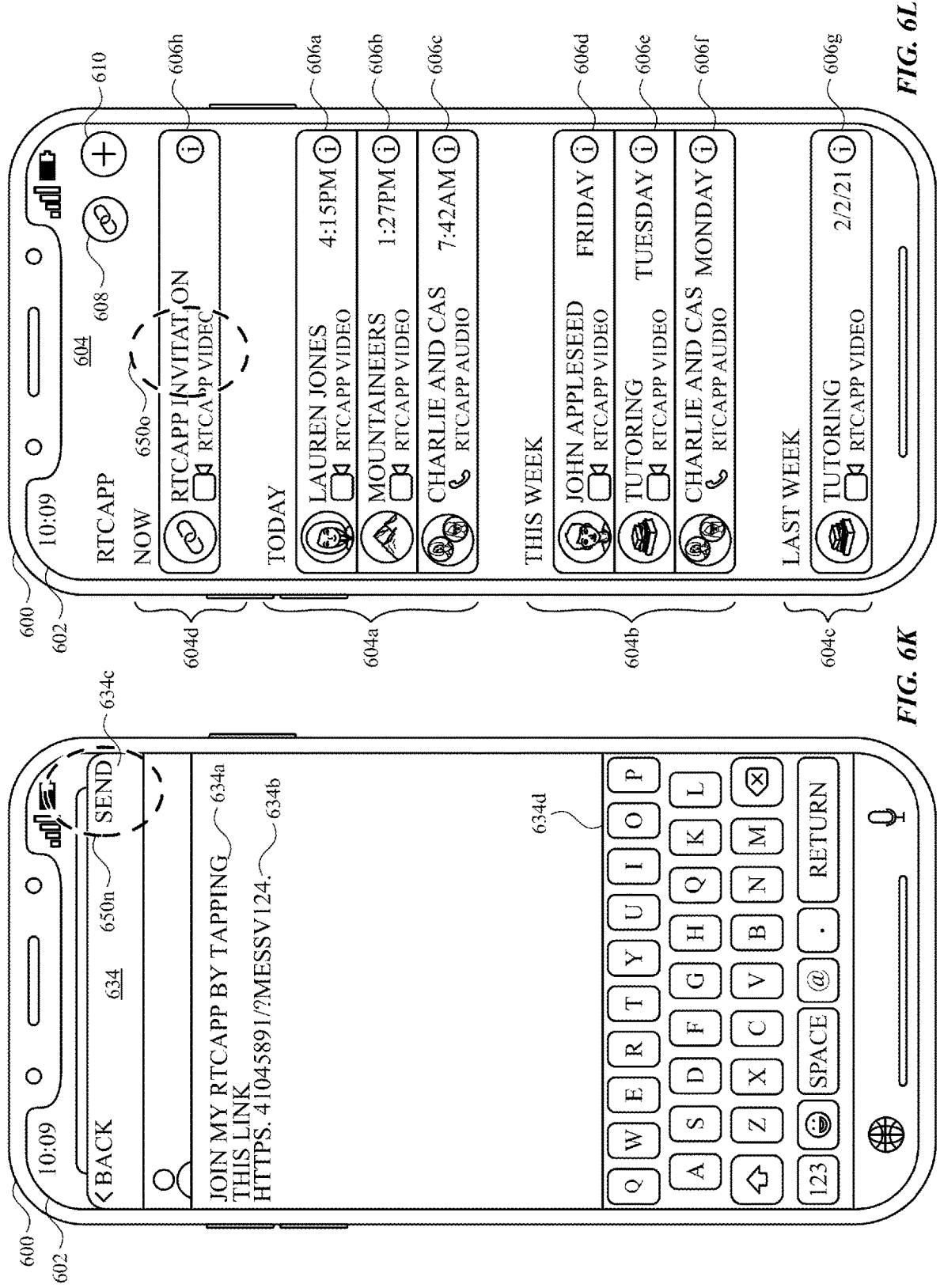

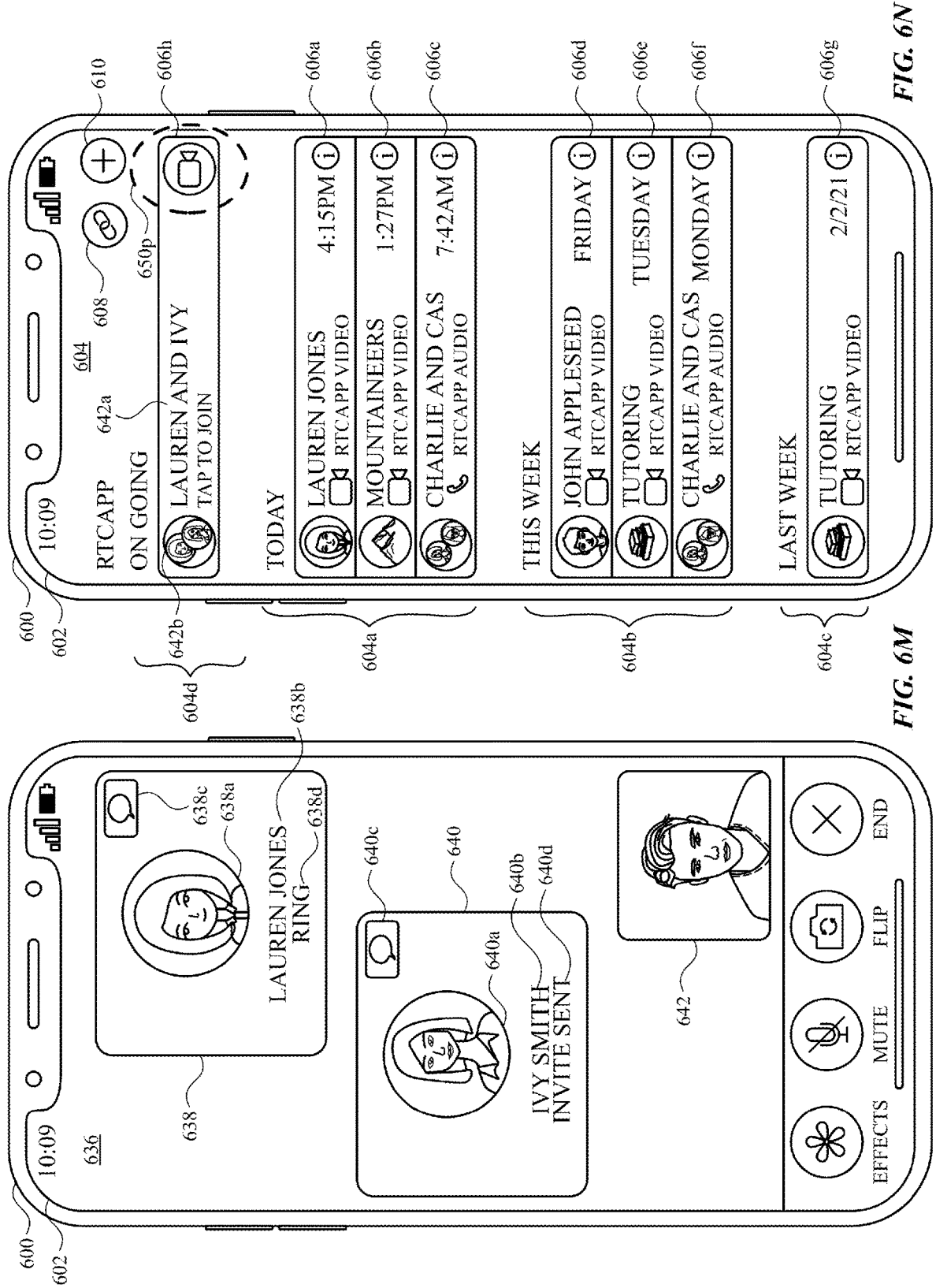

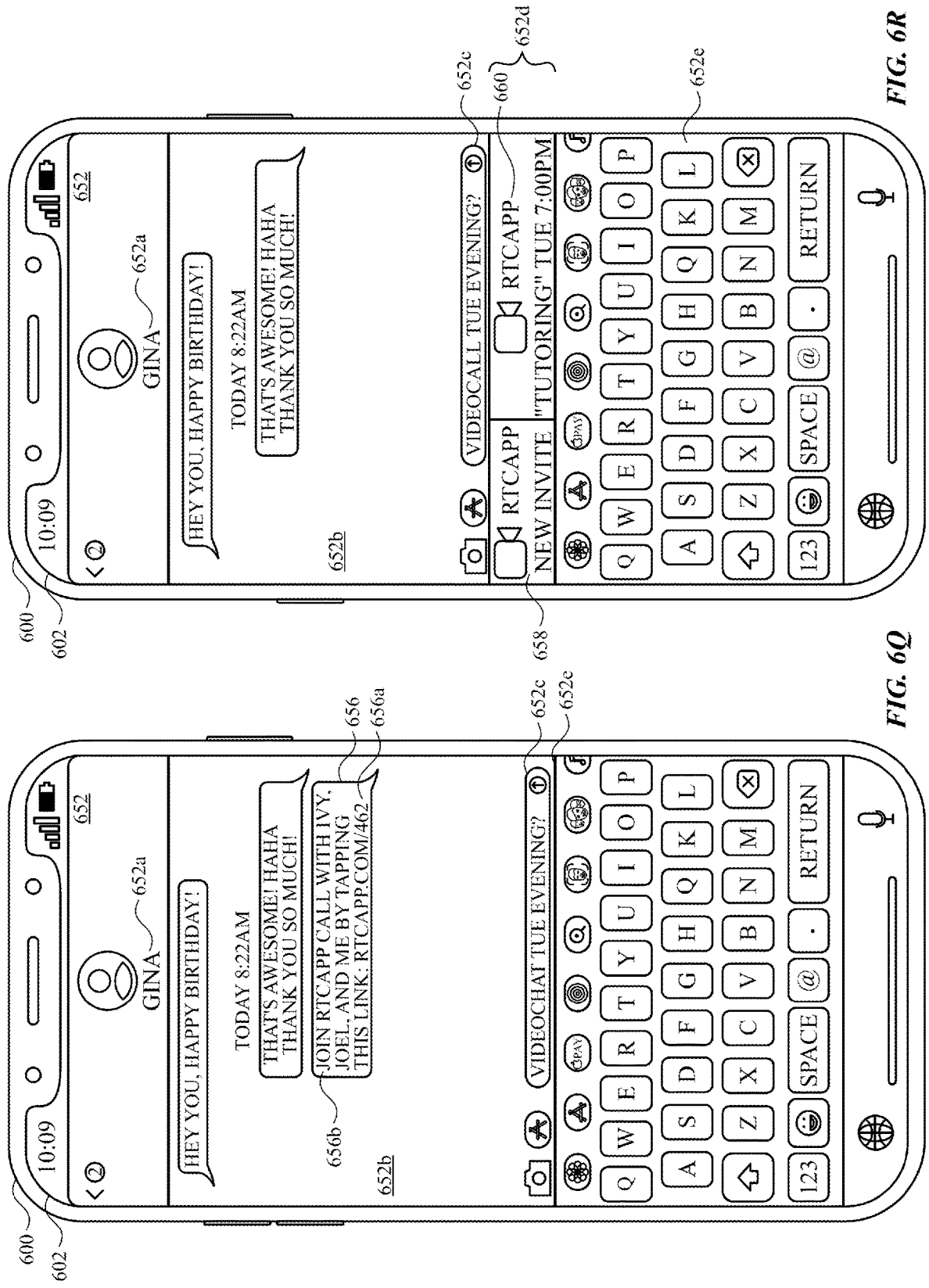

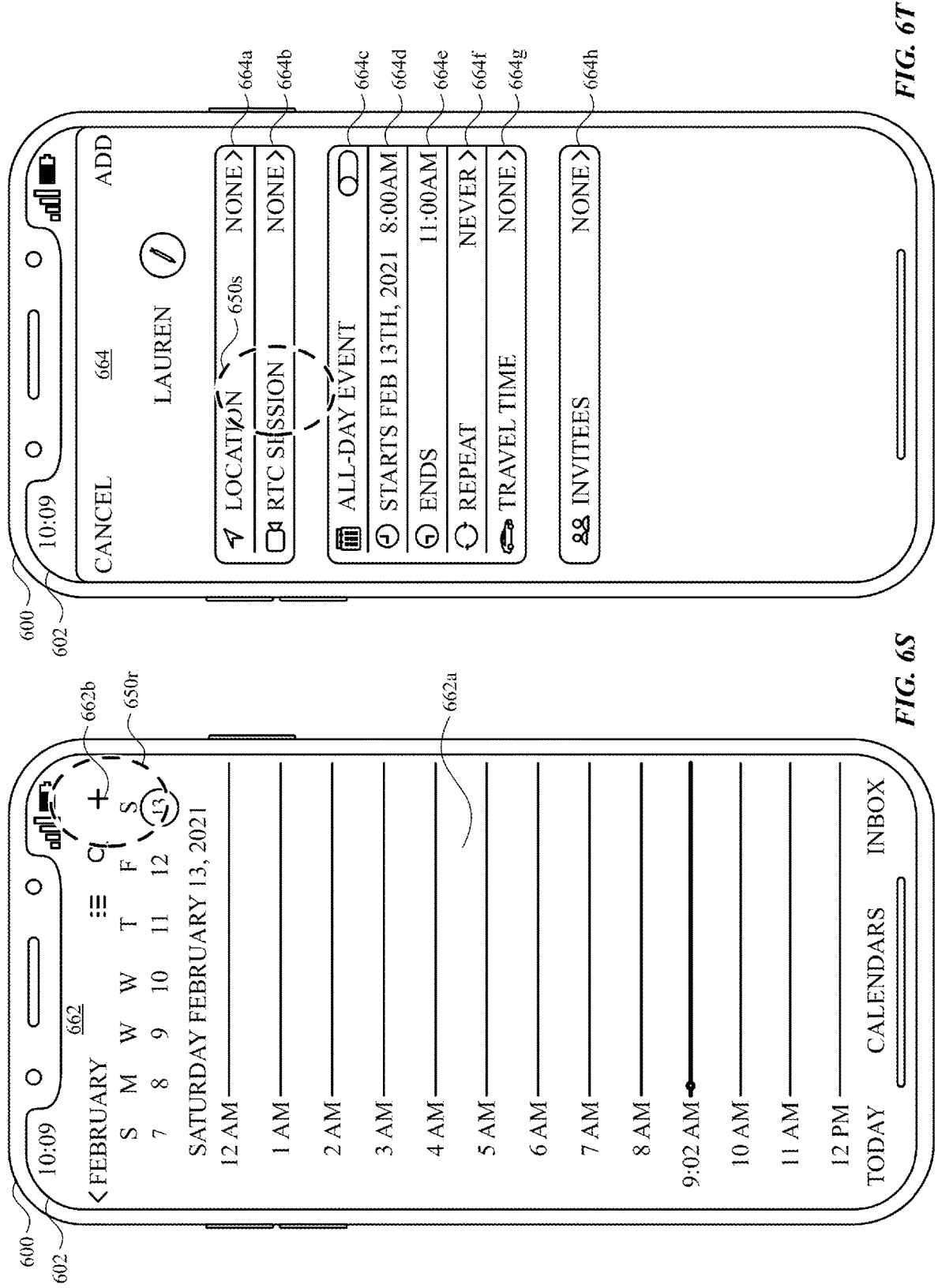

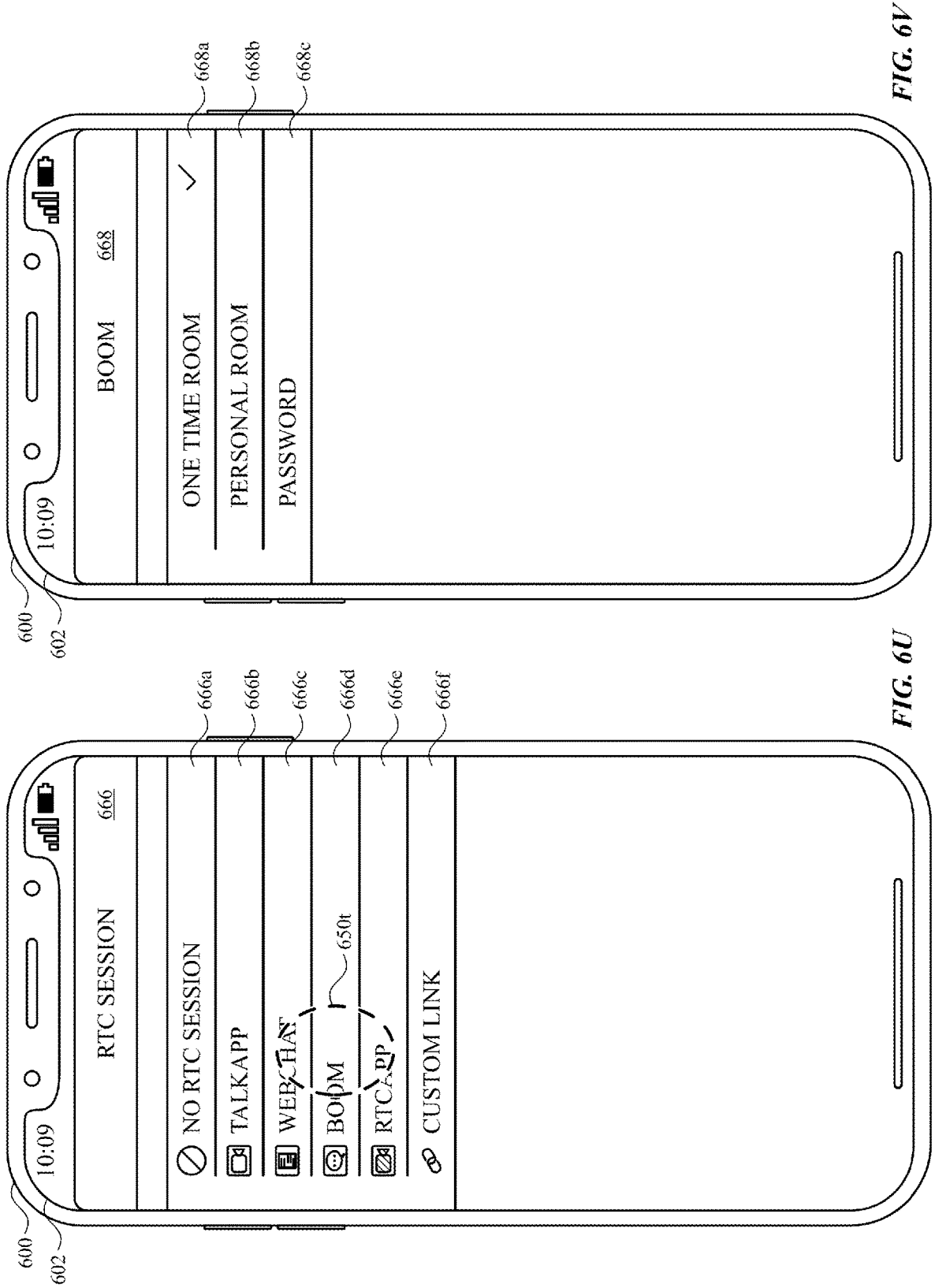

700 ↘

702
Display, via the display generation component, a user interface of a real-time communication application, the user interface including a user-interactive graphical user interface element corresponding to a link to a real-time communication session.

704
Receive, via the one or more input devices, user input corresponding to selection of the user-interactive graphical user interface element.

706
In response to receiving the user input, initiate a process to share the link to the real-time communication session, wherein the process to share the link to the real-time communication session includes displaying, via the display generation component, a sharing user interface including a plurality of selectable options for sharing the link to the real-time communication session, including concurrently displaying:

708
A first selectable option for sharing the link to the real-time communication session via a first communication protocol.

710
A second selectable option for sharing the link to the real-time communication session via a second communication protocol that is different from the first communication protocol.

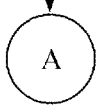

*FIG. 7A*

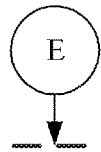

756
After receiving the fifth user input corresponding to selection of the selectable user interface object, display, via the display generation component, a fourth user interface of the real-time communication application, where the fourth user interface of the real-time communication application includes a third user interface object corresponding to the second link to the second real-time communication session.

758
In response to detecting the one or more user inputs corresponding to content of the message configured to be sent via the messaging application to one or more participants in a message conversation, concurrently display, via the display generation component:

760
The selectable user interface object that, when selected via user input, is configured to initiate a process for sending the second link to the second real-time communication session.

762
A second selectable user interface object that, when selected via user input, is configured to generate a third link to a third real-time communication session, where the third link to the third real-time communication session corresponds to a new real-time communication session that does not correspond to a previously scheduled real-time communication session.

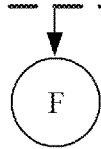

802
Detect, via the one or more input devices, one or more first user inputs corresponding to selection of a user to invite to a real-time communication session.

804
After detecting the one or more first user inputs, concurrently display, via the display generation component:

806
A selectable user interface element corresponding to a link to the real-time communication session.

808
A visual indication of the user.

810
While concurrently displaying the selectable user interface element and the visual indication of the user, detect, via the one or more input devices, a second user input corresponding to selection of the selectable user interface element.

812
In response to detecting the second user input:

814
Initiate a process to send the link to the user.

816
Display a user interface for participating in the real-time communication session with the user.

818
Prior to concurrently displaying the selectable user interface element and the visual indication of the user, display, via the display generation component a user selection user interface, where:

820
In accordance with a determination that no user that is selected as an invitee to the real-time communication session satisfies a first set of criteria, the user selection user interface includes an initiation user interface object that, when selected via user input, is configured to initiate the real-time communication session.

822
In accordance with a determination that at least one user that is selected as an invitee to the real-time communication session satisfies the first set of criteria, the user selection user interface includes a link sharing user interface object that, when selected via user input, is configured to initiate a process for sharing a link to the real-time communication session with one or more other users.

824
While displaying the user selection user interface that includes the initiation user interface object, detect one or more third user inputs corresponding to selection of a second user to invite to the real-time communication session, where the second user satisfies the first set of criteria.

826
In response to detecting the one or more third user inputs, cease display of the initiation user interface object and display the link sharing user interface object.

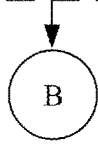

*FIG. 8B*

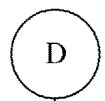

856
Prior to concurrently displaying the selectable user interface element and the visual indication of the user, display, via the display generation component, a list of users, wherein:

858
In accordance with a determination that the user to invite to the real-time communication session satisfies a third set of criteria, the list of users includes a fourth visual indication of the user having a third visual characteristic.

860
In accordance with a determination that the user to invite to the real-time communication session does not satisfy the third set of criteria, the list of users includes the fourth visual indication of the user having a fourth visual characteristic, different from the third visual characteristic.

862
Prior to concurrently displaying the selectable user interface element and the visual indication of the user, display, via the display generation component, a second list of users, wherein:

864
In accordance with a determination that the user to invite to the real-time communication session satisfies a fourth set of criteria, the second list of users includes a fifth visual indication of the user having a fifth visual characteristic.

866
In accordance with a determination that the user to invite to the real-time communication session does not satisfy the fourth set of criteria, the second list of users includes the fifth visual indication of the user having a sixth visual characteristic, different from the fifth visual characteristic.

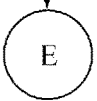

*FIG. 8E*

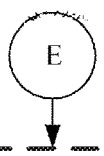

868
Prior to concurrently displaying the selectable user interface element and the visual indication of the user, display, via the display generation component, a third list of users, where displaying the third list of users includes concurrently displaying:

870
A representation of a third user in a first region of the third list of users, where the first region of the third list of users corresponds to users who are contactable via a first communication protocol.

872
A representation of a fourth user in a second region of the third list of users, where the second region of the third list of users corresponds to users who are not contactable via the first communication protocol but are contactable via a second communication protocol, different from the first communication protocol.

874
While displaying the user interface for participating in the real-time communication session with the user, detect that the user has not joined the real-time communication session.

876
In response to detecting that the user has not joined the real-time communication session:

878
In accordance with a determination that the user satisfies a fifth set of criteria, display, via the display generation component, a first status indicator for the user on the user interface for participating in the real-time communication session with the user.

880
In accordance with a determination that the user does not satisfy the fifth set of criteria, display, via the display generation component, a second status indicator, different from the first status indicator, for the user on the user interface for participating in the real-time communication session with the user.

*FIG. 8F*

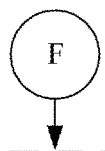

882
While displaying the first status indicator for the user on the user interface for participating in the real-time communication session with the user, detect a sixth user input corresponding to selection of the first status indicator.

884
In response to detecting the sixth user input corresponding to selection of the first status indicator, cause delivery of a real-time communication alert via an external computer system associated with the user corresponding to the first status indicator.

886
While displaying the user interface for participating in the real-time communication session with the user that includes the messaging user interface object, detect that the user has joined the real-time communication session.

888
In response to detecting that the user has joined the real-time communication session, cease display of the messaging user interface object.

890
Prior to concurrently displaying the selectable user interface element and the visual indication of the user, display an invitation user interface.

892
While displaying the invitation user interface, display a list of users including the user, where the list of users includes a plurality of user interface objects.

894
While displaying the list of users, detect a seventh user input corresponding to a respective user interface object associated with the user.

896
In response to detecting the seventh user input, display a visual indication of the user in an invitees region of the invitation user interface.

1002
While the computer system displays, via the display generation component, a user interface that includes a visual representation of an active real-time communication session for a first user, a second user different from the first user attempts to join the real-time communication.

1004
After the second user attempts to join the real-time communication session, display in the user interface a visual representation of the attempt of the second user to join the real-time communication session, wherein displaying the visual representation of the attempt of the second user to join the real-time communication session includes:

1006
In accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session.

1008
In accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

1010
While displaying the representation of the second user in the user interface, receive data that indicates that a third user participating in the real-time communication session removed the second user from the real-time communication session.

1012
In response to receiving the data that indicates that the third user participating in the real-time communication session removed the second user from the real-time communication session, cease display of the representation of the second user.

*FIG. 10*

REAL-TIME COMMUNICATION USER INTERFACE

CROSS-REFERENCE TO RELATED APPLICATION

This application claims priority to U.S. Provisional Patent Application Ser. No. 63/189,081, entitled "REAL-TIME COMMUNICATION USER INTERFACE," filed on May 15, 2021, the content of which is hereby incorporated by reference in its entirety.

FIELD

The present disclosure relates generally to computer user interfaces, and more specifically to techniques for managing a real-time communication session.

BACKGROUND

Electronic devices include cameras and microphones that enable users to communicate with each other in real-time via audio and/or video. In addition, electronic devices display user interfaces that enable users to select one or more participants to engage in the real-time communication.

BRIEF SUMMARY

Some techniques for managing a real-time communication session using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing a real-time communication session. Such methods and interfaces optionally complement or replace other methods for managing a real-time communication session. Such methods and interfaces reduce the cognitive burden on a user and produce a more efficient human-machine interface. Such methods and interfaces enable a user to invite participants to a real-time communication session via multiple communication protocols. In addition, such methods and interfaces facilitate creating and joining a real-time communication session. Further, such method and interfaces increase a security of electronic devices by limiting access and/or functions for certain users. For battery-operated computing devices, such methods and interfaces conserve power and increase the time between battery charges.

In accordance with some embodiments, a method is described. The method is performed at a computer system that is in communication with a display generation component and one or more input devices. The method comprises: displaying, via the display generation component, a user interface of a real-time communication application, the user interface including a user-interactive graphical user interface element corresponding to a link to a real-time communication session; receiving, via the one or more input devices, user input corresponding to selection of the user-interactive graphical user interface element; and in response to receiving the user input: initiating a process to share the link to the real-time communication session, wherein the process to share the link to the real-time communication session includes displaying, via the display generation component, a sharing user interface including a plurality of selectable options for sharing the link to the real-time communication session, including concurrently displaying: a first selectable option for sharing the link to the real-time communication session via a first communication protocol; and a second selectable option for sharing the link to the real-time communication session via a second communication protocol that is different from the first communication protocol.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a user interface of a real-time communication application, the user interface including a user-interactive graphical user interface element corresponding to a link to a real-time communication session; receiving, via the one or more input devices, user input corresponding to selection of the user-interactive graphical user interface element; and in response to receiving the user input: initiating a process to share the link to the real-time communication session, wherein the process to share the link to the real-time communication session includes displaying, via the display generation component, a sharing user interface including a plurality of selectable options for sharing the link to the real-time communication session, including concurrently displaying: a first selectable option for sharing the link to the real-time communication session via a first communication protocol; and a second selectable option for sharing the link to the real-time communication session via a second communication protocol that is different from the first communication protocol.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a user interface of a real-time communication application, the user interface including a user-interactive graphical user interface element corresponding to a link to a real-time communication session; receiving, via the one or more input devices, user input corresponding to selection of the user-interactive graphical user interface element; and in response to receiving the user input: initiating a process to share the link to the real-time communication session, wherein the process to share the link to the real-time communication session includes displaying, via the display generation component, a sharing user interface including a plurality of selectable options for sharing the link to the real-time communication session, including concurrently displaying: a first selectable option for sharing the link to the real-time communication session via a first communication protocol; and a second selectable option for sharing the link to the real-time communication session via a second communication protocol that is different from the first communication protocol.

In accordance with some embodiments, a computer system is described. The computer system is in communication with a display generation component and one or more input devices. The computer system comprises: one or more processors; and memory storing one or more programs configured to be executed by the one or more processors, the one or more programs including instructions for: displaying, via the display generation component, a user interface of a real-time communication application, the user interface including a user-interactive graphical user interface element corresponding to a link to a real-time communication session; receiving, via the one or more input devices, user input corresponding to selection of the user-interactive graphical user interface element; and in response to receiving the user input: initiating a process to share the link to the real-time communication session, wherein the process to share the link to the real-time communication session includes displaying, via the display generation component, a sharing user interface including a plurality of selectable options for sharing the link to the real-time communication session, including concurrently displaying: a first selectable option for sharing the link to the real-time communication session via a first communication protocol; and a second selectable option for sharing the link to the real-time communication session via a second communication protocol that is different from the first communication protocol.

In accordance with some embodiments, a computer system is described. The computer system is in communication with a display generation component and one or more input devices. The computer system comprises: means for displaying, via the display generation component, a user interface of a real-time communication application, the user interface including a user-interactive graphical user interface element corresponding to a link to a real-time communication session; means for receiving, via the one or more input devices, user input corresponding to selection of the user-interactive graphical user interface element; and means for, in response to receiving the user input: initiating a process to share the link to the real-time communication session, wherein the process to share the link to the real-time communication session includes displaying, via the display generation component, a sharing user interface including a plurality of selectable options for sharing the link to the real-time communication session, including concurrently displaying: a first selectable option for sharing the link to the real-time communication session via a first communication protocol; and a second selectable option for sharing the link to the real-time communication session via a second communication protocol that is different from the first communication protocol.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a user interface of a real-time communication application, the user interface including a user-interactive graphical user interface element corresponding to a link to a real-time communication session; receiving, via the one or more input devices, user input corresponding to selection of the user-interactive graphical user interface element; and in response to receiving the user input: initiating a process to share the link to the real-time communication session, wherein the process to share the link to the real-time communication session includes displaying, via the display generation component, a sharing user interface including a plurality of selectable options for sharing the link to the real-time communication session, including concurrently displaying: a first selectable option for sharing the link to the real-time communication session via a first communication protocol; and a second selectable option for sharing the link to the real-time communication session via a second communication protocol that is different from the first communication protocol.

In accordance with some embodiments, a method is described. The method is performed at a computer system that is in communication with a display generation component and one or more input devices. The method comprises: detecting, via the one or more input devices, one or more first user inputs corresponding to selection of a user to invite to a real-time communication session; after detecting the one or more first user inputs, concurrently displaying, via the display generation component: a selectable user interface element corresponding to a link to the real-time communication session; and a visual indication of the user; while concurrently displaying the selectable user interface element and the visual indication of the user, detecting, via the one or more input devices, a second user input corresponding to selection of the selectable user interface element; and in response to detecting the second user input: initiating a process to send the link to the user; and displaying a user interface for participating in the real-time communication session with the user.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, one or more first user inputs corresponding to selection of a user to invite to a real-time communication session; after detecting the one or more first user inputs, concurrently displaying, via the display generation component: a selectable user interface element corresponding to a link to the real-time communication session; and a visual indication of the user; while concurrently displaying the selectable user interface element and the visual indication of the user, detecting, via the one or more input devices, a second user input corresponding to selection of the selectable user interface element; and in response to detecting the second user input: initiating a process to send the link to the user; and displaying a user interface for participating in the real-time communication session with the user.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, one or more first user inputs corresponding to selection of a user to invite to a real-time communication session; after detecting the one or more first user inputs, concurrently displaying, via the display generation component: a selectable user interface element corresponding to a link to the real-time communication session; and a visual indication of the user; while concurrently displaying the selectable user interface element and the visual indication of the user, detecting, via the one or more input devices, a second user input corresponding to selection of the selectable user interface element; and in response to detecting the second user input: initiating a process to send the link to the user; and displaying a user interface for participating in the real-time communication session with the user.

In accordance with some embodiments, a computer system is described. The computer system is in communication with a display generation component and one or more input devices. The computer system comprises: one or more processors; and memory storing one or more programs configured to be executed by the one or more processors, the one or more programs including instructions for: detecting, via the one or more input devices, one or more first user inputs corresponding to selection of a user to invite to a real-time communication session; after detecting the one or more first user inputs, concurrently displaying, via the display generation component: a selectable user interface element corresponding to a link to the real-time communication session; and a visual indication of the user; while concurrently displaying the selectable user interface element and the visual indication of the user, detecting, via the one or more input devices, a second user input corresponding to selection of the selectable user interface element; and in response to detecting the second user input: initiating a process to send the link to the user; and displaying a user interface for participating in the real-time communication session with the user.

In accordance with some embodiments, a computer system is described. The computer system is in communication with a display generation component and one or more input devices. The computer system comprises: means for detecting, via the one or more input devices, one or more first user inputs corresponding to selection of a user to invite to a real-time communication session; means for, after detecting the one or more first user inputs, concurrently displaying, via the display generation component: a selectable user interface element corresponding to a link to the real-time communication session; and a visual indication of the user; means for, while concurrently displaying the selectable user interface element and the visual indication of the user, detecting, via the one or more input devices, a second user input corresponding to selection of the selectable user interface element; and means for, in response to detecting the second user input: initiating a process to send the link to the user; and displaying a user interface for participating in the real-time communication session with the user.

In accordance with some embodiments, a computer program product is described. The computer program product comprises one or more programs configured to be executed by one or more processors of a computer system that is in communication with a display generation component and one or more input devices, the one or more programs including instructions for: detecting, via the one or more input devices, one or more first user inputs corresponding to selection of a user to invite to a real-time communication session; after detecting the one or more first user inputs, concurrently displaying, via the display generation component: a selectable user interface element corresponding to a link to the real-time communication session; and a visual indication of the user; while concurrently displaying the selectable user interface element and the visual indication of the user, detecting, via the one or more input devices, a second user input corresponding to selection of the selectable user interface element; and in response to detecting the second user input: initiating a process to send the link to the user; and displaying a user interface for participating in the real-time communication session with the user.

In accordance with some embodiments, a method is described. The method is performed at a computer system that is in communication with a display generation component and one or more input devices. The method comprises: while the computer system displays, via the display generation component, a user interface that includes a visual representation of an active real-time communication session for a first user, a second user different from the first user attempts to join the real-time communication; and after the second user attempts to join the real-time communication session, displaying in the user interface a visual representation of the attempt of the second user to join the real-time communication session, wherein displaying the visual representation of the attempt of the second user to join the real-time communication session includes: in accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session; and in accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while the computer system displays, via the display generation component, a user interface that includes a visual representation of an active real-time communication session for a first user, a second user different from the first user attempts to join the real-time communication; and after the second user attempts to join the real-time communication session, displaying in the user interface a visual representation of the attempt of the second user to join the real-time communication session, wherein displaying the visual representation of the attempt of the second user to join the real-time communication session includes: in accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session; and in accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while the computer system displays, via the display generation component, a user interface that includes a visual representation of an active real-time communication session for a first user, a second user different from the first user attempts to join the real-time communication; and after the second user attempts to join the real-time communication session, displaying in the user interface a visual representation of the attempt of the second user to join the real-time communication session, wherein displaying the visual representation of the attempt of the second user to join the real-time communication session includes: in accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session; and in accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

In accordance with some embodiments, a computer system is described. The computer system is in communication with a display generation component and one or more input devices. The computer system comprises: one or more processors; and memory storing one or more programs configured to be executed by the one or more processors, the one or more programs including instructions for: while the computer system displays, via the display generation component, a user interface that includes a visual representation of an active real-time communication session for a first user, a second user different from the first user attempts to join the real-time communication; and after the second user attempts to join the real-time communication session, displaying in the user interface a visual representation of the attempt of the second user to join the real-time communication session, wherein displaying the visual representation of the attempt of the second user to join the real-time communication session includes: in accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session; and in accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

In accordance with some embodiments, a computer system is described. The computer system is in communication with a display generation component and one or more input devices. The computer system comprises: means for, while the computer system displays, via the display generation component, a user interface that includes a visual representation of an active real-time communication session for a first user, a second user different from the first user attempts to join the real-time communication; and means for, after the second user attempts to join the real-time communication session, displaying in the user interface a visual representation of the attempt of the second user to join the real-time communication session, wherein displaying the visual representation of the attempt of the second user to join the real-time communication session includes: in accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session; and in accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

In accordance with some embodiments, a computer program product is described. The computer program product comprises one or more programs configured to be executed by one or more processors of a computer system that is in communication with a display generation component and one or more input devices, the one or more programs including instructions for: while the computer system displays, via the display generation component, a user interface that includes a visual representation of an active real-time communication session for a first user, a second user different from the first user attempts to join the real-time communication; and after the second user attempts to join the real-time communication session, displaying in the user interface a visual representation of the attempt of the second user to join the real-time communication session, wherein displaying the visual representation of the attempt of the second user to join the real-time communication session includes: in accordance with a determination that one or more criteria have been met, wherein the one or more criteria include a requirement that an identity of the second user has not been verified as an invitee to the real-time communication session in order for the one or more criteria to be met, the visual representation of the attempt of the second user to join the real-time communication session includes an option that is selectable to determine whether the second user is allowed to participate in the real-time communication session; and in accordance with a determination that the identity of the second user has been verified as an invitee to the real-time communication session, the visual representation of the attempt of the second user to join the real-time communication session includes a representation of the second user that is displayed without displaying the option that is selectable to determine whether the second user is allowed to participate in the real-time communication session.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a real-time communication session, thereby increasing the effectiveness, efficiency, and user satisfaction with such devices. Such methods and interfaces may complement or replace other methods for managing a real-time communication session.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7H are a flow diagram illustrating methods for sharing a link to a real-time communication session, in accordance with some embodiments.

FIGS. 8A-8G are a flow diagram illustrating methods for inviting a participant to a real-time communication session and joining the real-time communication session, in accordance with some embodiments.

FIG. 10 is a flow diagram illustrating methods for allowing a participant to join a real-time communication session, in accordance with some embodiments.

DESCRIPTION OF EMBODIMENTS

Figure 1A:
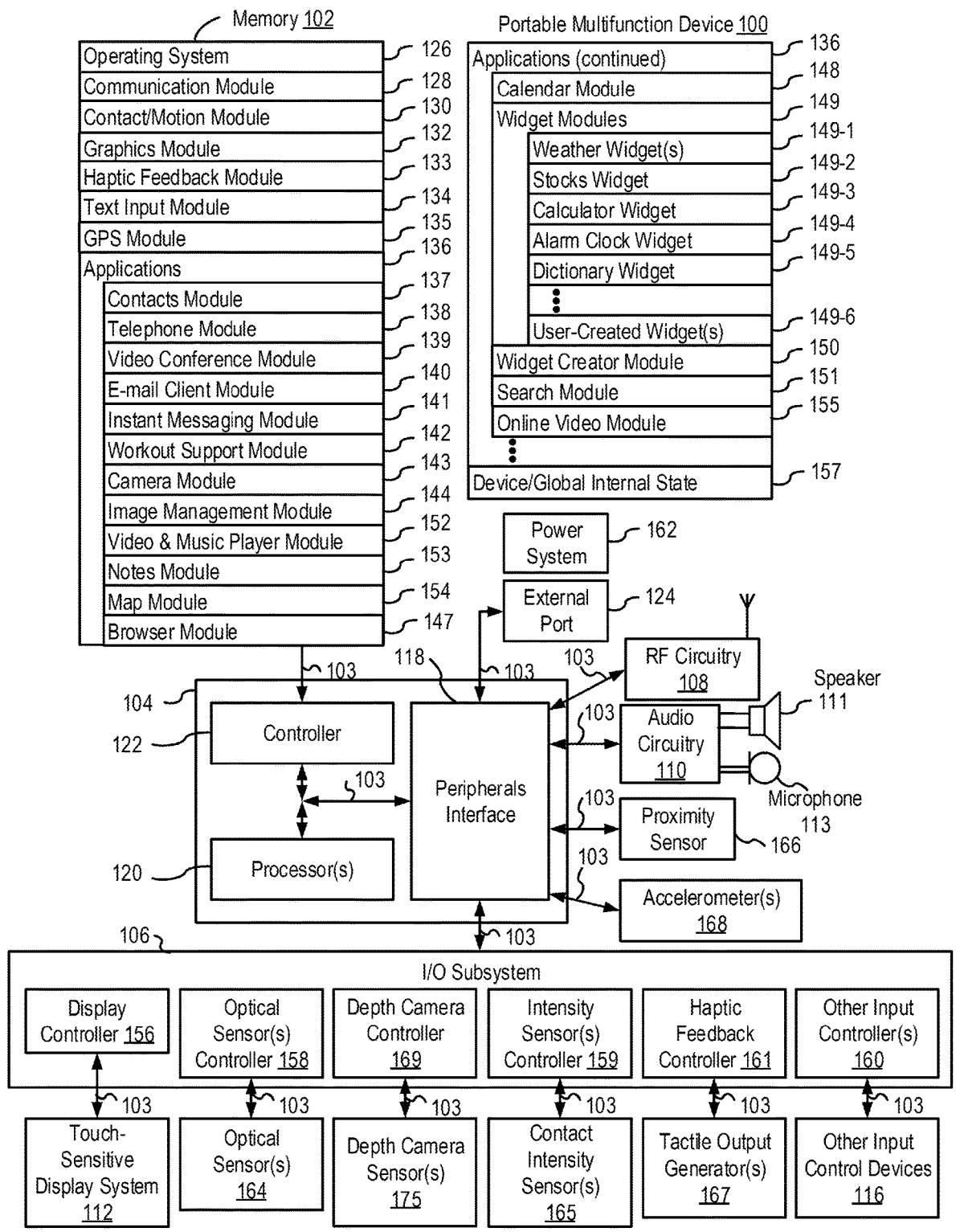
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a real-time communication session. For example, there is a need for electronic devices that facilitate creating a link to a real-time communication session and provide multiple sharing options for sharing the link to the real-time communication session. As another example, there is a need for electronic devices that facilitate a user's ability to invite participants to a real-time communication session. Further, there is a need for electronic devices that can limit certain users from joining a real-time communication session and provide an ability for users to authorize and/or deny admittance to a real-time communication session. Such techniques can reduce the cognitive burden on a user who participates in and/or hosts a real-time communication session, thereby enhancing productivity. Further, such techniques can reduce processor and battery power otherwise wasted on redundant user inputs.

Below, FIGS. 1A-1B, 2, 3, 4A-4B, and 5A-5C provide a description of exemplary devices for performing the techniques for managing event notifications. FIGS. 6A-6V illustrate exemplary user interfaces for creating and/or sharing a link to a real-time communication session. FIGS. 7A-7H are a flow diagram illustrating methods for sharing a link to a real-time communication session in accordance with some embodiments. FIGS. 8A-8G are a flow diagram illustrating methods for inviting a participant to a real-time communication session and joining the real-time communication session. The user interfaces in FIGS. 6A-6V are used to illustrate the processes described below, including the processes in FIGS. 7A-7H and FIGS. 8A-8G. FIGS. 9A-9H illustrate exemplary user interfaces for joining a real-time communication session. FIG. 10 is a flow diagram illustrating methods for allowing a participant to join a real-time communication session in accordance with some embodiments. The user interfaces in FIGS. 9A-9H are used to illustrate the processes described below, including the processes in FIG. 10.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
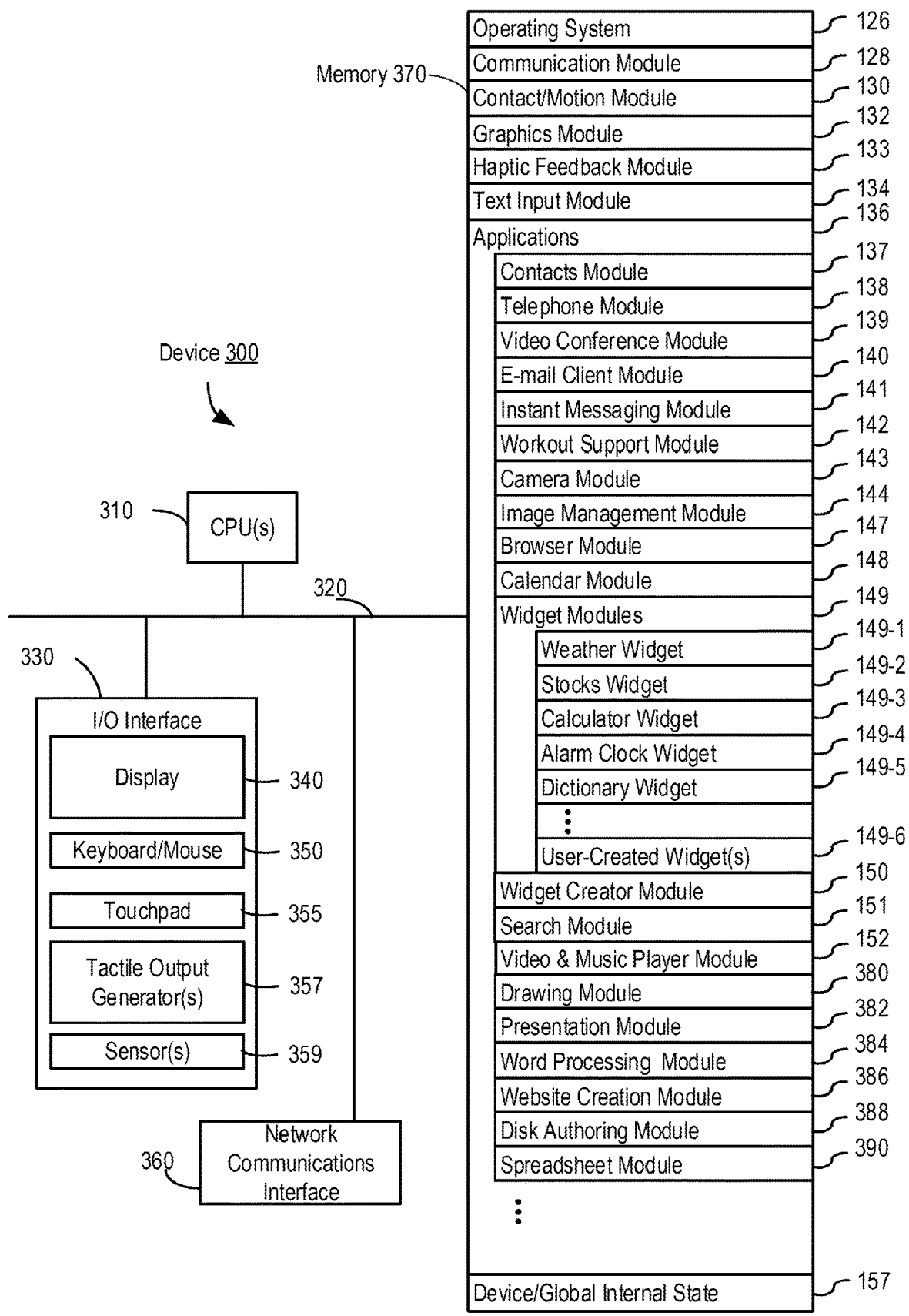
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
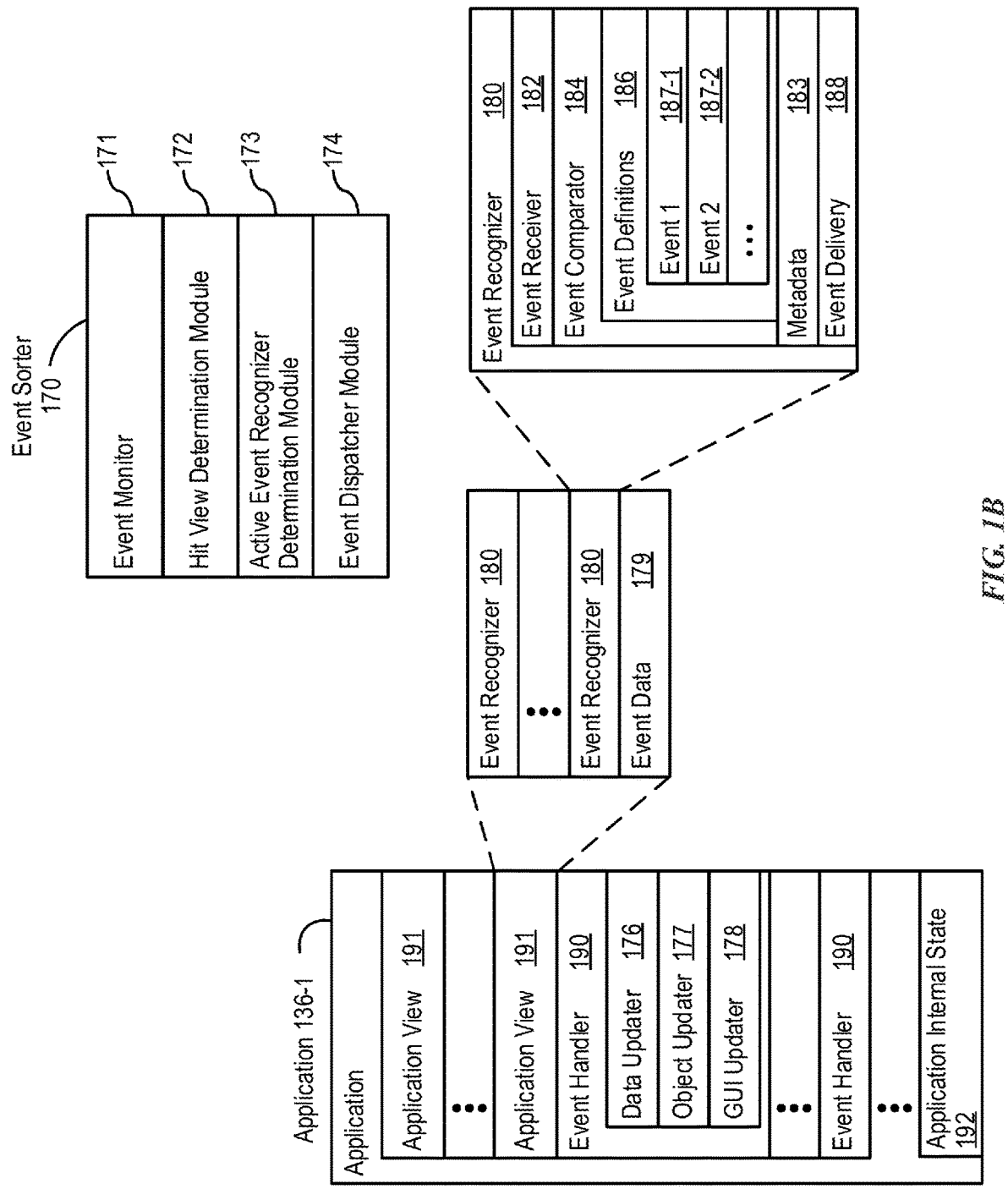
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192.

Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
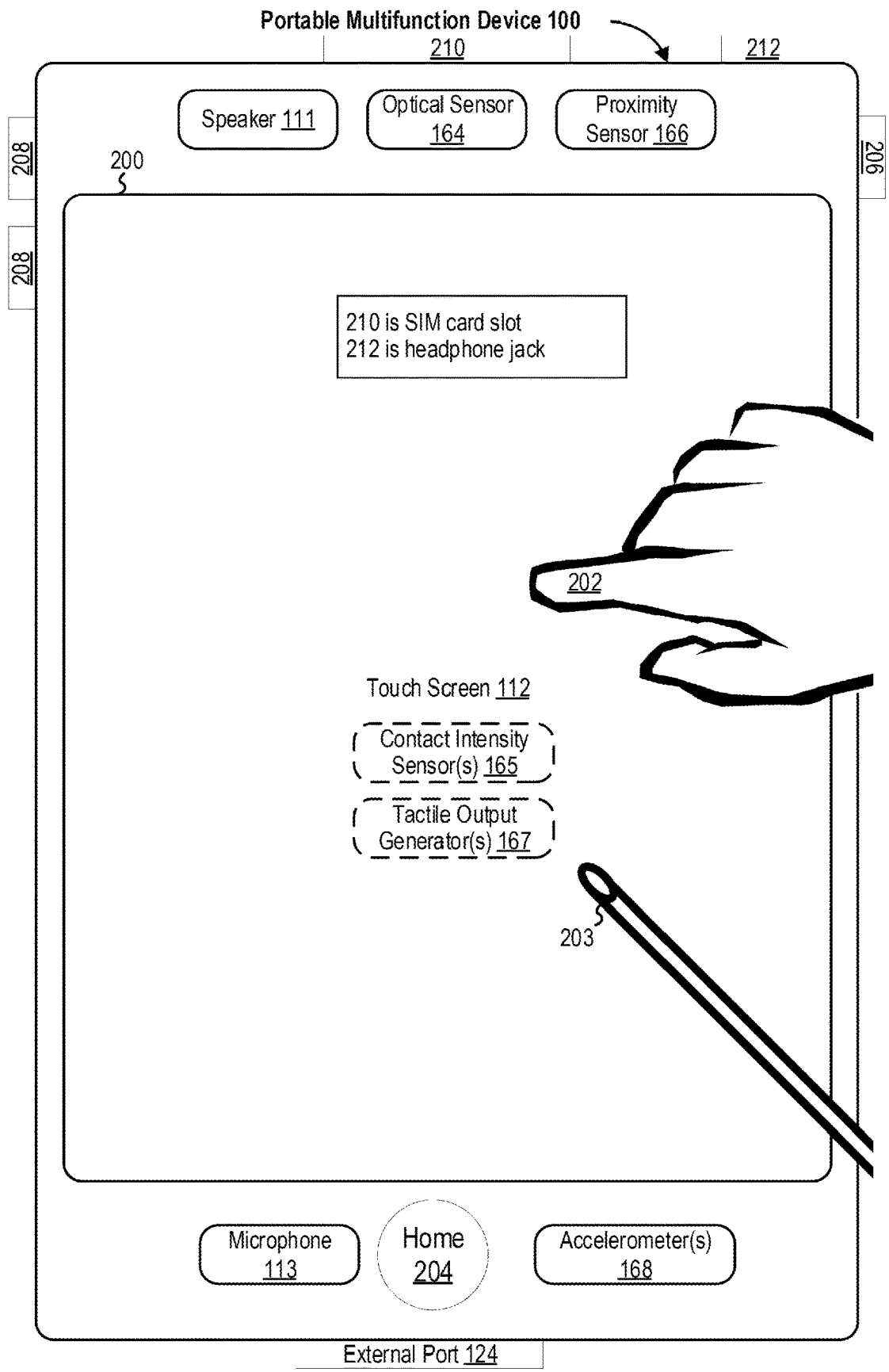
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
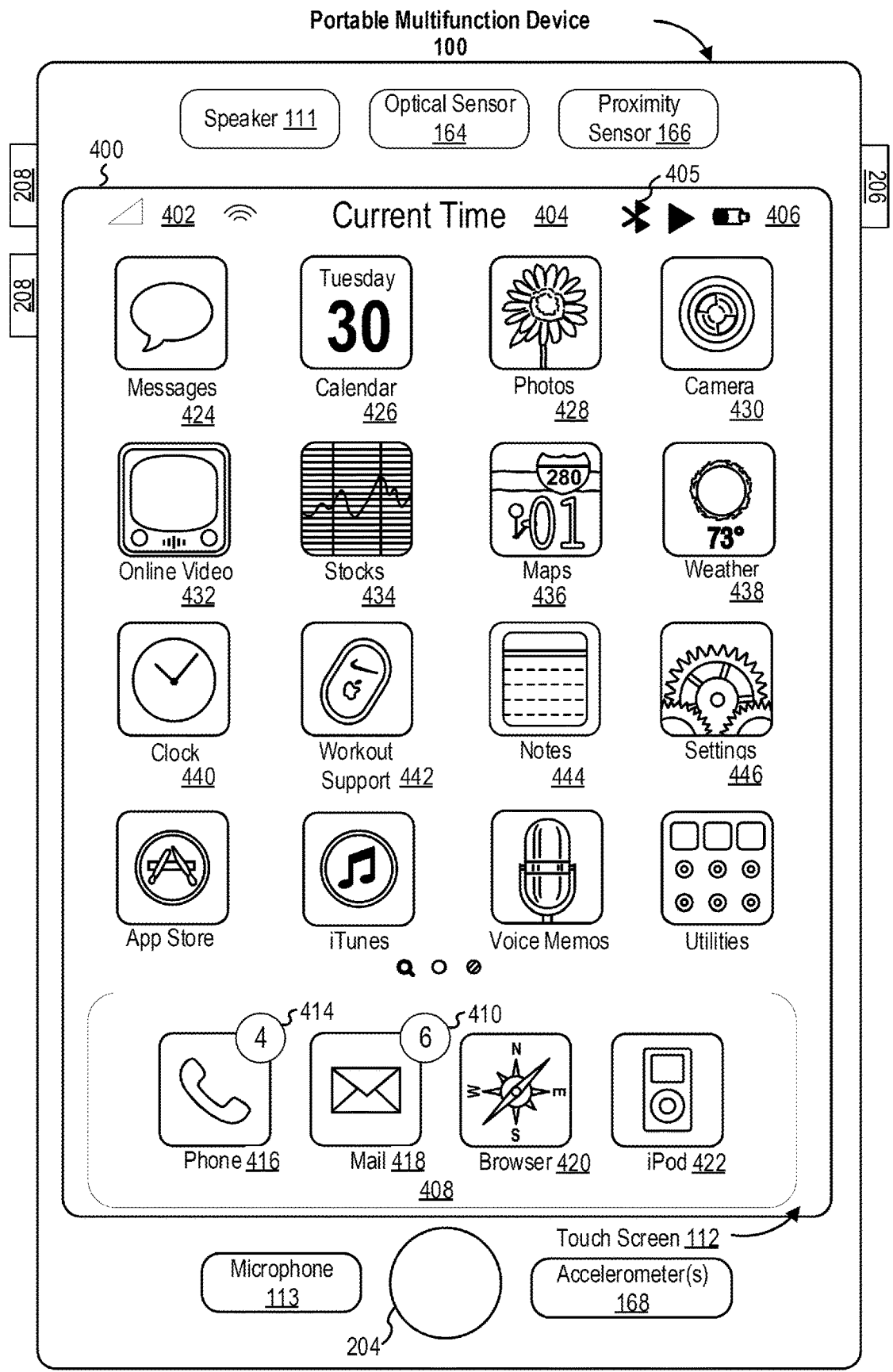
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
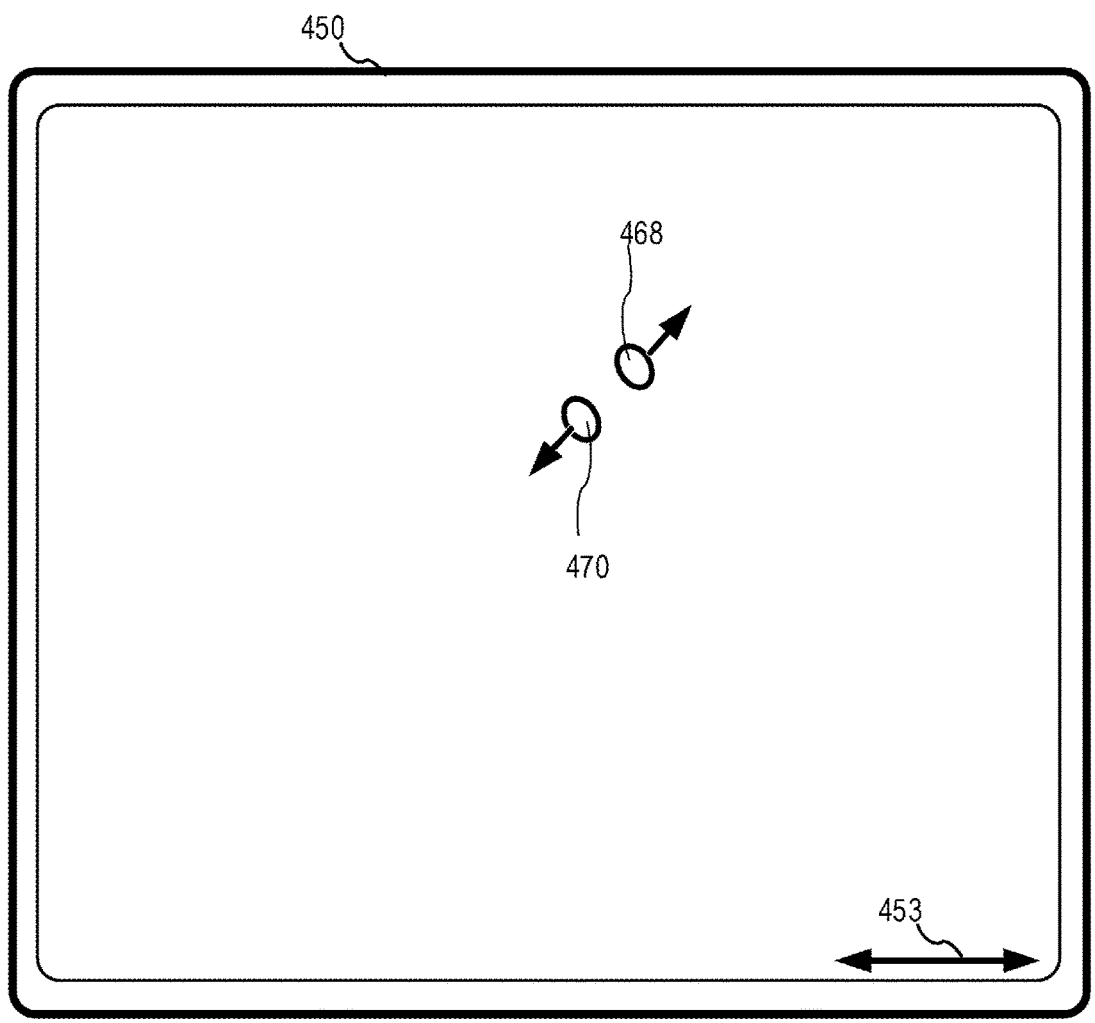
FIG. 4B illustrates an exemplary user interface for a multifunction device with a touch-sensitive surface that is separate from the display in accordance with some embodiments.
Figure 4B:
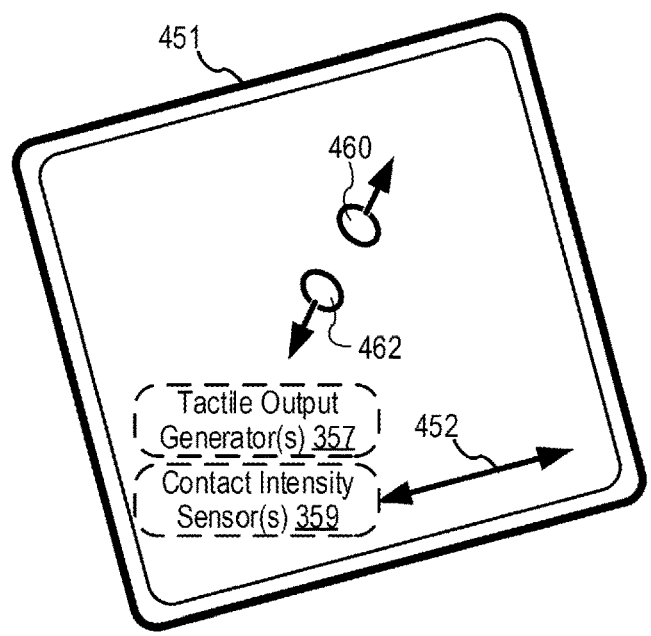

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
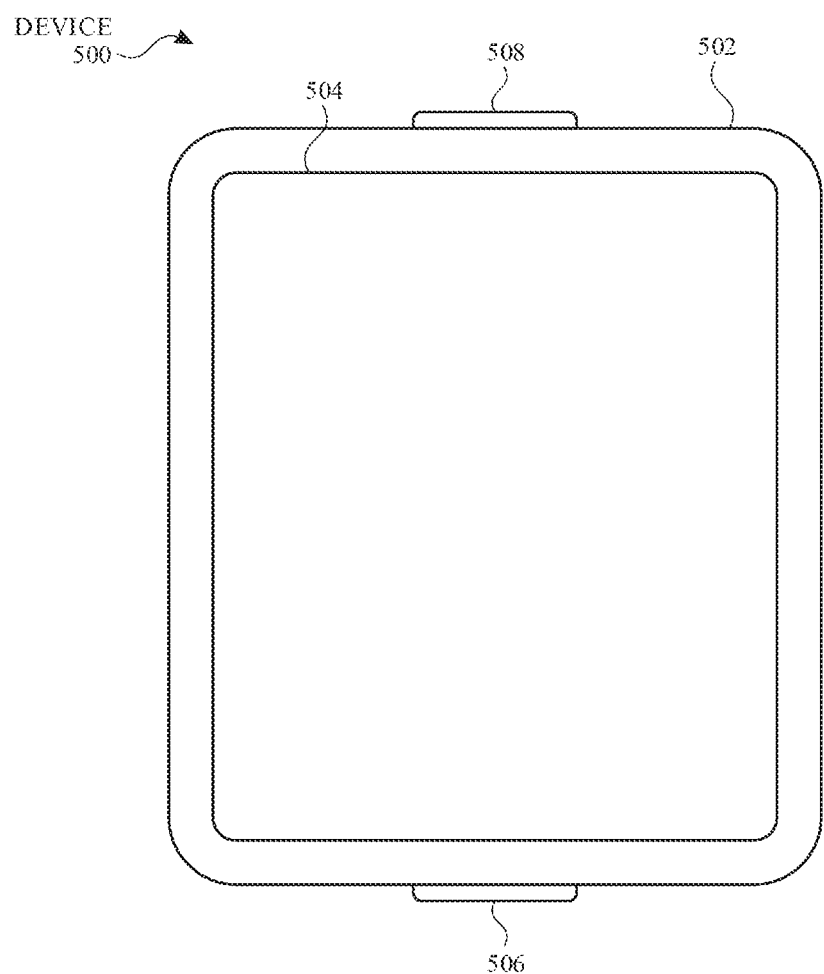
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
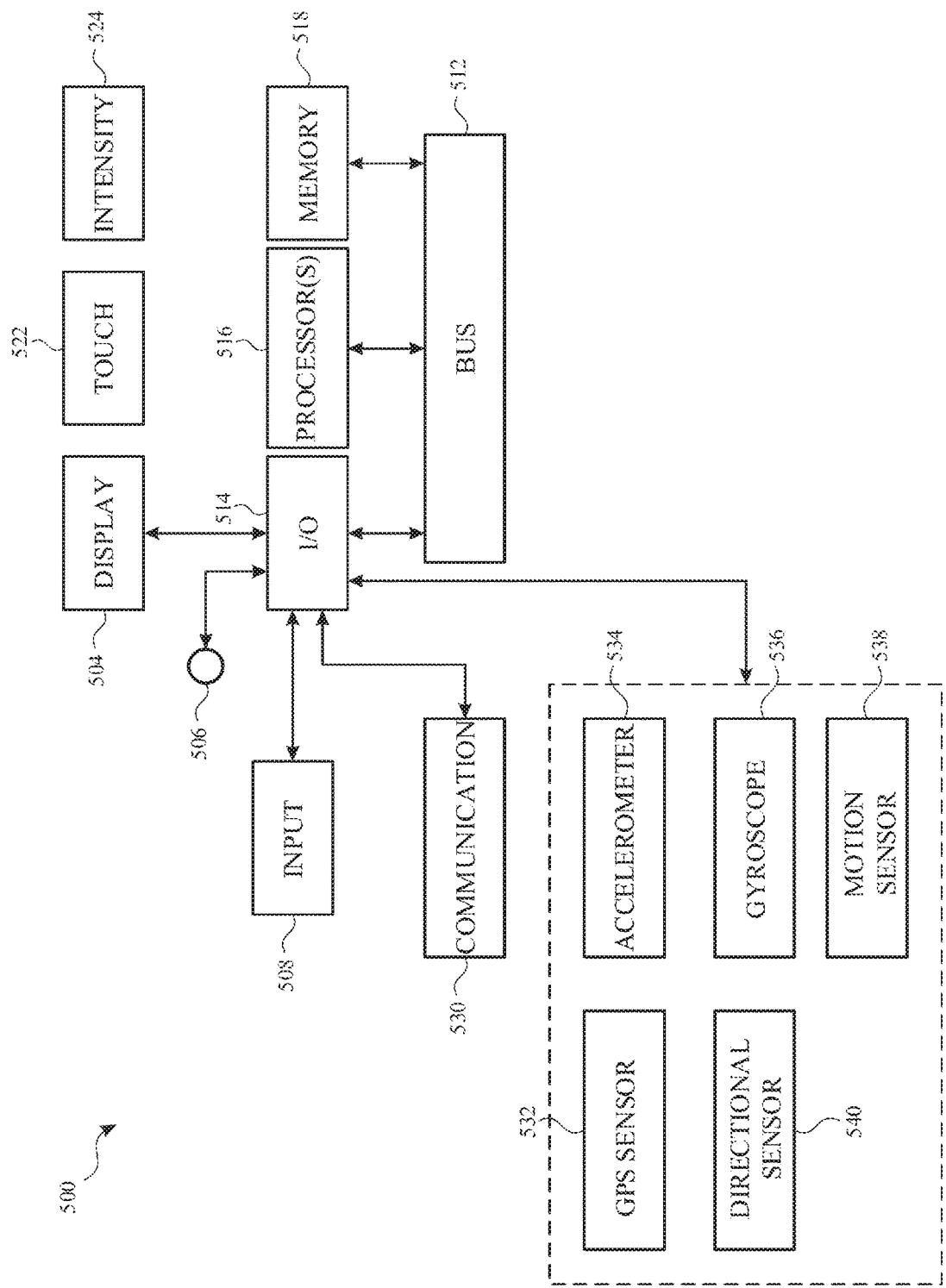
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 1000 (FIGS. 7A-7H, FIGS. 8A-8G, and FIG. 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5C). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
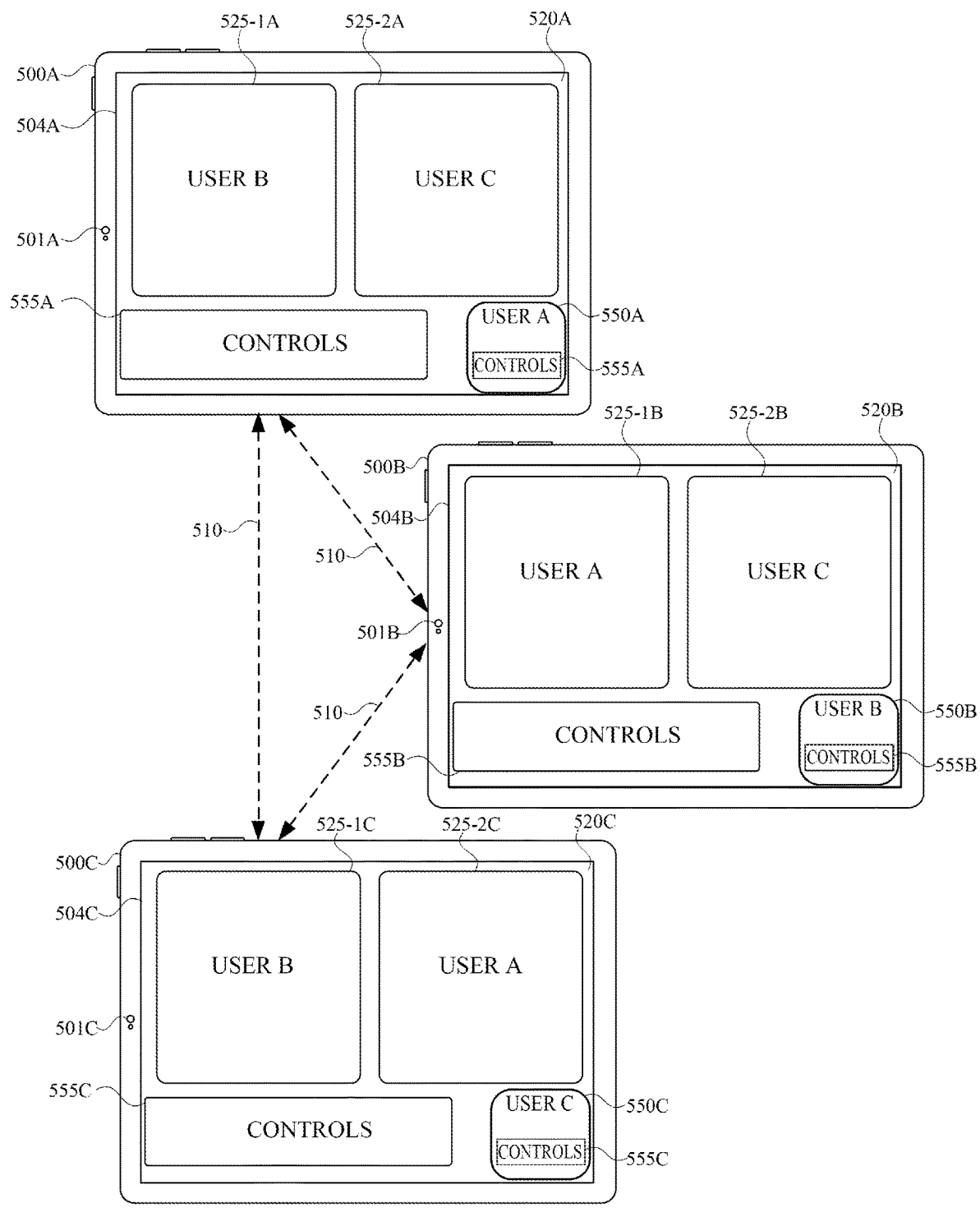
FIG. 5C illustrates an exemplary diagram of a communication session between electronic devices, in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6V and 9A-9H. In some embodiments, the communication session depicted in FIGS. 6A-6V and 9A-9H includes two or more electronic devices, even if the other electronic devices participating in the communication session are not depicted in the figures.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for a real-time communication session (e.g., an audio communication session and/or a video communication session), in accordance with some embodiments. The user interfaces in these figures are used to illustrate the processes described below, including the processes in FIGS. 7A-7H and FIGS. 8A-8G.

FIG. 6A illustrates electronic device 600 displaying, via display 602, a first user interface 604 of a real-time communication application (e.g., "RTCApp") of electronic device 600. First user interface 604 includes a list and/or schedule of real-time communication sessions for which a user of electronic device participated (e.g., previously or currently), was invited to participate (e.g., the user was invited to participate but did not or has yet to join the real-time communication session), and/or is invited to participate (e.g., the real-time communication session is ongoing and/or scheduled for a time later than the current time). At FIG. 6A, first user interface 604 arranges user interface objects 606a-606g into regions 604a, 604b, and 604c of first user interface 604 that correspond to different periods of time. First region 604a includes user interface objects 606a-606c, which correspond to real-time communication sessions that took place and/or are scheduled for a current day (e.g., today). Second region 604b includes user interface objects 604d-604f corresponding to real-time communication sessions that took place and/or were scheduled for the current week, but not the current day. Third region 604c includes user interface object 606g corresponding to a real-time communication session that took place and/or was scheduled for a previous week (e.g., the week before the current week). As such, a user of electronic device 600 can quickly view and/or find a real-time communication session based on the time at which the real-time communication session occurred, was scheduled, and/or is scheduled.

In some embodiments, first user interface 604 includes user interface objects corresponding to real-time communication sessions for which the user of electronic device 600 was invited, but did not participate. For example, electronic device 600 received an invitation and/or request (e.g., a call, a text, a link, and/or a calendar invitation) to join a real-time communication session, but electronic device 600 did not detect user input corresponding to an acceptance of the invitation and/or a request to initiate the real-time communication session (e.g., the user declined the call, the user did not answer the call, the user did not select the link and/or another user interface object that would initiate the real-time communication session).

At FIG. 6A, first user interface 604 also includes link sharing user interface object 608 and add participants user interface object 610. As set forth below, electronic device 600 initiates a process to share a link to a real-time communication session in response to detecting user input corresponding to selection of link sharing user interface object 608. In some embodiments, the process to share a link to a real-time communication session includes, for example, creating a link to a real-time communication session and/or displaying a user interface that enables electronic device 600 to share the link. In addition, electronic device 600 displays a second user interface 612 that enables a user to add invitees to a real-time communication session in response to detecting selection of add participants user interface object 610. At FIG. 6A, electronic device 600 detects user input 650a corresponding to selection of add participants user interface object 610. In response to detecting user input 650a, electronic device 600 displays second user interface 612, as shown at FIG. 6B. Alternatively, at FIG. 6A, electronic device 600 detects user input 650b corresponding to selection of link sharing user interface object 608. In response to detecting user input 650b, electronic device 600 displays sharing user interface 626, as shown at FIG. 6I.

At FIG. 6B, second user interface 612 includes invitees region 612a, suggested invitees region 612b, audio user interface object 612c, real-time communication user interface object 612d, and keyboard 612e (e.g., a graphical and/or virtual keyboard). In FIG. 6B, invitees region 612a is currently blank, indicating that electronic device 600 has not detected user input corresponding to selection and/or identification of an invitee to a real-time communication session. Electronic device 600 displays audio user interface object 612c and real-time communication user interface object 612d with an inactive appearance, such as a reduced brightness, a gray-scale color scheme, and/or a reduced size. For example, because electronic device 600 has not detected user input corresponding to selection of a contactable user to invite to a real-time communication session, electronic device 600 displays audio user interface object 612c and real-time communication user interface object 612d with an inactive appearance to indicate that a user cannot initiate a real-time communication session without selecting an invitee.

Suggested invitees region 612b includes contact user interface objects 614a-614h corresponding to contactable users stored in electronic device 600 or an account associated with electronic device 600. Contact user interface objects 614a-614h can include information such as, e.g., a phone number, email address, and/or user name associated with an identifier of an entity, such as a person, a group of persons, and/or a business. In some embodiments, suggested invitees region 612b displays contact user interface objects 614a-614h corresponding to users that are most frequently contacted (e.g., messaged, called, and/or otherwise interacted with via electronic device 600), most recently contacted, and/or most likely to be contacted based on usage patterns of electronic device 600. Usage patterns can include, e.g., users that are frequently contacted at a particular time of day, a particular time of week, a particular time of the month. At FIG. 6B, second user interface 612 includes eight contact user interface objects 614a-614h. In some embodiments, second user interface 612 includes more than eight or less than eight contact user interface objects based on a number of contactable users stored by electronic device 600 and/or based on a number of suggested contactable users determined by electronic device 600.

Figure 6C:
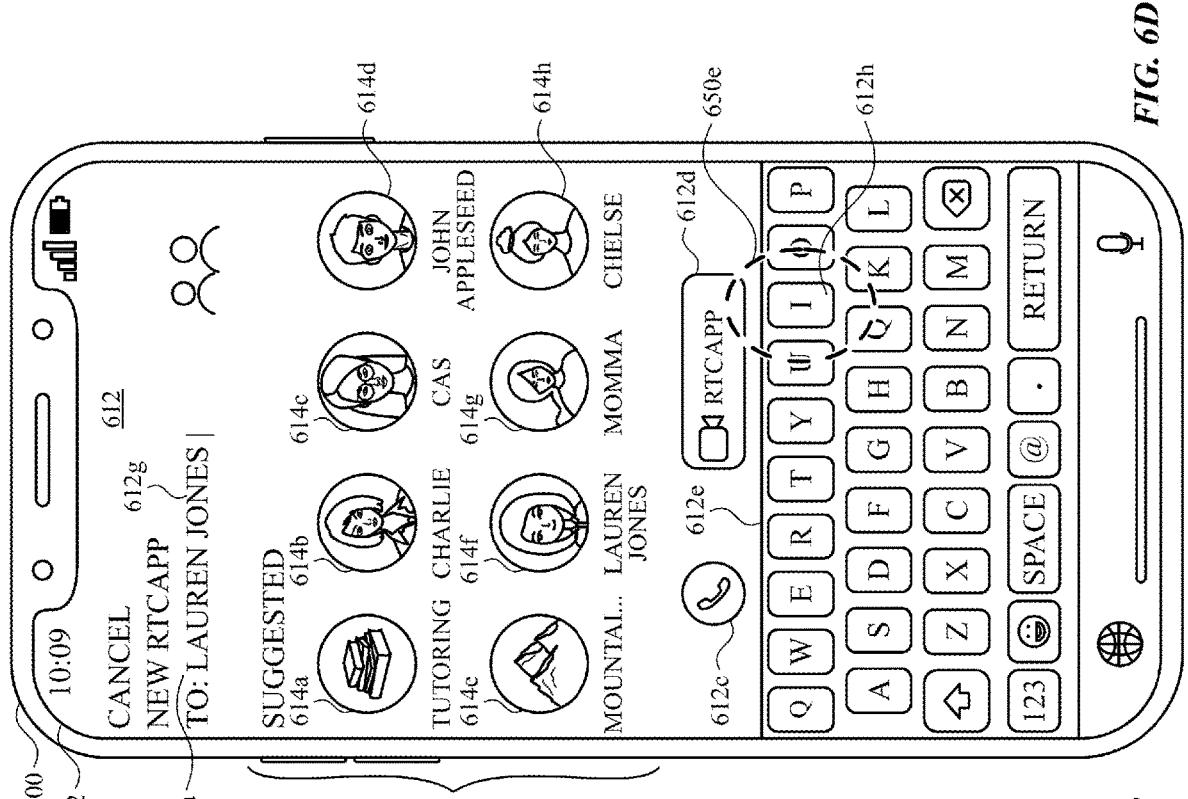
FIGS. 6A-6V illustrate exemplary user interfaces for creating and/or sharing a link to a real-time communication session, in accordance with some embodiments.

At FIG. 6B, electronic device 600 detects user input 650c selecting key 612f (e.g., the letter "l") of keyboard 612e. After detecting user input 650c, electronic device 600 displays contactable user list 618, as shown at FIG. 6C.

At FIG. 6C, electronic device 600 has detected additional user input (e.g., user inputs corresponding to the "a" and "u" keys of keyboard 612e) and displays contactable user list 618 based on user input 650c as well as the additional user input. Electronic device 600 displays contactable user list 618 as an overlay on second user interface 612, and specifically, an overlay that covers (e.g., is displayed on top of) suggested invitees region 612b, audio user interface object 612c, and real-time communication user interface object 612d. Contactable user list 618 includes stored contactable users of electronic device 600 that are based on user input 650c and the additional user inputs corresponding to input indicator 619 (e.g., the characters "lau"). For example, electronic device 600 performs a search of a contactable user database of electronic device 600 (and/or a contactable user database associated with an account logged into electronic device 600) using user input 650c and the additional user input as a search term (e.g., a search term corresponding to alphanumeric and/or emoji characters received via user input). Accordingly, contactable user list 618 includes contact user interface objects 618a-618e corresponding to identifiers of contactable users stored in the contactable user database that match and/or partially match the search term.

In some embodiments, electronic device 600 arranges contact user interface objects 618a-618e of contactable user list 618 based on one or more criteria. For instance, in some embodiments, electronic device 600 arranges contact user interface objects 618a-618e based on a comparison of the search term to an identifier (e.g., a name, a user name, an email address, and/or another identifier) of a contactable user stored in the contactable user database. For example, a first contact user interface object representing a first contactable user that includes an identifier that fully matches the search term is listed before (e.g., above) a second contact user interface object representing a second contactable user that includes an identifier that partially matches the search term.

In some embodiments, electronic device 600 arranges contact user interface objects 618a-618e based on the comparison between the search term and the identifier of the contactable user, as well as based on information associated with a contactable user. In some such embodiments, electronic device 600 determines a subset of contact user interface objects to display based on the comparison between the search term and the identifiers of contactable users stored in the contactable user database. In addition, electronic device 600 arranges the subset of contact user interface objects based on the information associated with the respective contactable users of the subset of contact user interface objects. For example, in some embodiments, the information associated with the respective contactable users includes a type of communication address, such as available modes of communication associated with a phone number, an email address, and/or a user name of an account. In some such embodiments, contact user interface objects associated with a contactable user having a first type of communication address, such as a phone number and/or an account of a messaging/chat application, are listed before (e.g., above) contact user interface objects associated with a contactable user having a second type of communication address, such as an email address and/or an account of a non-messaging/non-chat application, different from the first type of communication address. In some embodiments, the information associated with the respective contactable users includes an operating system of the device associated with the communication address, an application installed on the device associated with the communication address, and/or an account signed into on the device associated with the communication address. In some embodiments, electronic device 600 displays contactable users that are associated with a device having a first operating system, a first application, and/or signed into a first type of account before (e.g., above) contactable users that are not associated with a device having the first operating system, the first application, and/or signed into the first type of account. In some embodiments, the information associated with the respective contactable users includes any combination of the type of communication address, the operating system of the device associated with the communication address, the application installed on the device associated with the communication address, and/or an account signed into the device associated with the communication address.

At FIG. 6C, contact user interface object 618a corresponding to Lauren Jones is listed above contact user interface object 618e corresponding to Bruno Lars because electronic device 600 determines that information associated with Lauren Jones includes a phone number and that information associated with Bruno Lars includes an email address. In some embodiments, electronic device 600 displays contact user interface objects associated with phone numbers before contact user interface objects associated with email addresses (and without a phone number) because electronic device 600 can initiate communication with a phone number via multiple different communication protocols, such as a phone call and an electronic message, whereas electronic device 600 can typically initiate communication with an email address via one communication protocol. In some embodiments, even when electronic device 600 detects one or more user inputs corresponding to the letters "lar" (instead of "lau"), electronic device 600 displays contact user interface object 618a before (e.g., above) contact user interface object 618e because electronic device 600 has access to a phone number for Lauren Jones and does not have access to a phone number for Bruno Lars. Thus, while contactable user list 618 is based on a comparison between the search term and identifiers of contactable users of a contactable user database, contactable user list 618 arranges contact user interface objects 618a-618e based on available modes of communication and/or types of devices associated with the respective contactable users.

At FIG. 6C, electronic device 600 detects user input 650d (e.g., a tap gesture and/or user input selecting a contactable user as an invitee to a real-time communication session) corresponding to contact user interface object 618a. In response to detecting user input 650d, electronic device 600 displays second user interface 612, as shown at FIG. 6D.

Figure 6D:
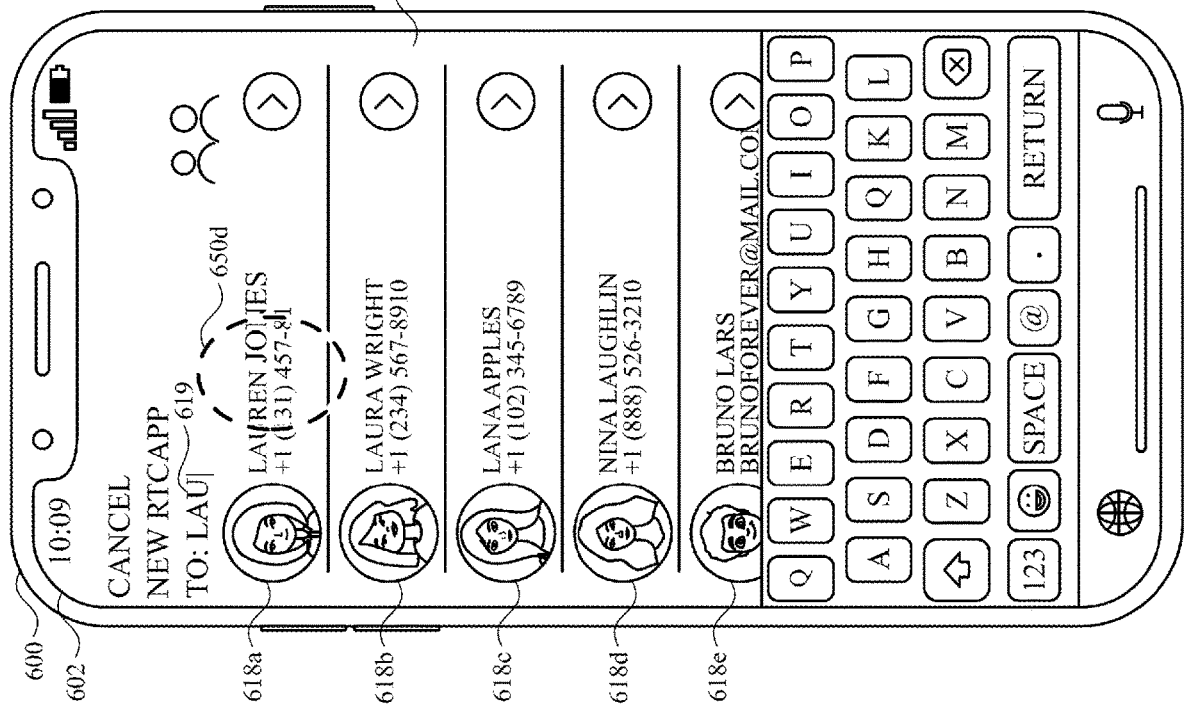

At FIG. 6D, electronic device 600 displays first contactable user indicator 612g in invitee region 612a of second user interface 612. First contactable user indicator 612g corresponds to the contactable user associated with contact user interface object 618a, which is Lauren Jones. First contactable user indicator 612g includes a first appearance (e.g., a bold appearance and/or text of contact user interface object 620a having a first color, such as blue). In some embodiments, electronic device 600 displays first contactable user indicator 612g as having the first appearance when electronic device 600 determines that information associated with the contactable user represented by first contactable user indicator 612g indicates that a device associated with the contactable user includes the real-time communication application (e.g., the particular real-time communication application that is associated with first user interface 604 and/or second user interface 612). In some embodiments, electronic device 600 displays first contactable user indicator 612g as having the first appearance when electronic device 600 determines that information associated with the contactable user represented by first contactable user indicator 612g indicates that a device associated with the contactable user includes a particular operating system software.

At FIG. 6D, electronic device 600 displays suggested invitees region 612b, audio user interface object 612c, and real-time communication user interface object 612d. In response to detecting user input 650d, electronic device 600 displays audio user interface object 612c and real-time communication user interface object 612d with an active appearance, such as a normal brightness, a non-gray scale color scheme, and/or an increased size. In this way, electronic device 600 indicates that a real-time communication session can be initiated with Lauren Jones because Lauren Jones has been added as an invitee. As set forth below, electronic device 600 displays audio user interface object 612c and real-time communication user interface object 612d based on a determination that information associated with Lauren Jones meets a first set of criteria. The first set of criteria includes a criterion that a device associated with Lauren Jones includes a particular real-time communication application (e.g., RTCApp). For example, information accessible by electronic device 600 indicates that a real-time communication session can be initiated with Lauren Jones via the particular real-time communication application because a device associated with Lauren Jones has the same particular real-time communication application.

In some instances, a user can invite multiple contactable users to the real-time communication session. At FIG. 6D, electronic device 600 detects user input 650e corresponding to key 612h (e.g., the letter "i") of keyboard 612e. After detecting user input 650e, electronic device 600 displays contactable user list 620, as shown at FIG. 6E.

At FIG. 6E, electronic device 600 has detected additional user input (e.g., user inputs corresponding to the "v" and "y" keys of keyboard 612e) and displays contactable user list 620 based on user input 650e as well as the additional user input. Electronic device 600 displays contactable user list 620 as an overlay on second user interface 612, and specifically, an overlay that covers (e.g., is displayed on top of) suggested invitees region 612b, audio user interface object 612c, and real-time communication user interface object 612d. Contactable user list 620 includes stored contactable users of electronic device 600 that are based on user input 650e and the additional user inputs that correspond to input indicator 621 (e.g., the characters "ivy"). For example, electronic device 600 performs a search of the contactable user database of electronic device 600 using user input 650e and the additional user input (e.g., displayed as input indicator 621) as a search term. Accordingly, contactable user list 620 includes contact user interface objects 620a-620c corresponding to identifiers of contactable users stored in the contactable user database that match or partially match the search term.

As set forth above, electronic device 600 arranges contact user interface objects 620a-620c of contactable user list 620 based on information associated with a contactable user. For instance, at FIG. 6E, electronic device 600 displays contact user interface object 620a corresponding to Evan Ivor before (e.g., above) contact user interface object 620c corresponding to Ivy Smith even though Ivy Smith includes an identifier (e.g., the first name "Ivy") that fully matches the search term "ivy" and Evan Ivor (e.g., the last name "Ivor") includes an identifier that only partially matches the search term. In the embodiment of FIG. 6E, contact user interface object 620a is displayed before contact user interface object 620c because electronic device 600 has access to information indicating that a device associated with the contactable user, Evan Ivor, includes a particular real-time communication application (e.g., a real-time communication application associated with first user interface 604 and second user interface 612).

Further, at FIG. 6E, electronic device 600 displays contact user interface object 620a with a first appearance (e.g., a bold appearance and/or text of contact user interface object 620a having a first color, such as blue) and displays contact user interface objects 620b and 620c with a second appearance (e.g., a non-bold appearance and/or text of contact user interface objects 620b and 620c having a second color, such as green) that is different from the first appearance. As such, electronic device 600 displays contact user interface objects 620a-620c with the first appearance and/or the second appearance to indicate information about a particular contactable user represented by contact user interface objects 620a-620c.

In some embodiments, electronic device 600 displays a contact user interface object (e.g., contact user interface object 620a) with the first appearance when electronic device 600 determines that information associated with the contactable user represented by the contact user interface object indicates that a device associated with the contactable user includes the real-time communication application (e.g., the particular real-time communication application that is associated with first user interface 604 and second user interface 612). Similarly, electronic device 600 displays a contact user interface object (e.g., contact user interface objects 620b and 620c) with the second appearance when electronic device 600 determines that information associated with the contactable user represented by the contact user interface object indicates that a device associated with the contactable user does not include the real-time communication application (e.g., the particular real-time communication application that is associated with first user interface 604 and second user interface 612).

In some embodiments, electronic device 600 displays a contact user interface object (e.g., contact user interface object 620a) with the first appearance when electronic device 600 determines that information associated with the contactable user represented by the contact user interface object indicates that a device associated with the contactable user includes a particular operating system software. Similarly, electronic device 600 displays a contact user interface object (e.g., contact user interface objects 620b and 620c) with the second appearance when electronic device 600 determines that information associated with the contactable user represented by the contact user interface object indicates that a device associated with the contact does not include the particular operating system software.

In some embodiments, electronic device 600 displays a contact user interface object (e.g., contact user interface object 620a) with the first appearance when electronic device 600 determines that information associated with the contactable user represented by the contact user interface object indicates that the contactable user has and/or is signed into a particular account (e.g., an account associated with the particular real-time communication application). Similarly, electronic device 600 displays a contact user interface object (e.g., contact user interface objects 620b and 620c) with the second appearance when electronic device 600 determines that information associated with the contactable user represented by the contact user interface object indicates that the contactable user does not have and/or is not signed into the particular account.

At FIG. 6E, electronic device 600 detects user input 650f corresponding to selection of contact user interface object 620c. In response to detecting user input 650f, electronic device 600 displays second user interface 612, as shown at FIG. 6F.

At FIG. 6F, electronic device 600 displays second user interface 612 having second contactable user indicator 612i in invitee region 612a. Second contactable user indicator 612i corresponds to the contactable user associated with contact user interface object 620c, which is Ivy Smith. At FIG. 6F, electronic device 600 displays first contactable user indicator 612g with a second appearance (e.g., a non-bold appearance and/or text of contact user interface object 620a having a first color, such as green), different from the first appearance (e.g., as shown at FIG. 6D), and displays second contactable user indicator 612i with the second appearance. In some embodiments, electronic device 600 displays each contactable user indicator as having the second appearance (e.g., instead of the first appearance) when electronic device 600 determines that information associated with at least one contactable user represented by a displayed contactable user indicator indicates that a device associated with the contactable user does not include the real-time communication application (e.g., the particular real-time communication application that is associated with first user interface 604 and second user interface 612). In some embodiments, electronic device 600 displays each contactable user indicator as having the second appearance (e.g., instead of the first appearance) when electronic device 600 determines that information associated with at least one contactable user represented by a displayed contactable user indicator indicates that a device associated with the contactable user does not include a particular operating system software.

At FIG. 6F, electronic device 600 displays (e.g., re-displays) suggested invitees region 612b, but does not display audio user interface object 612c and real-time communication user interface object 612d. Instead, electronic device 600 displays continue user interface object 612j. Electronic device 600 does not display audio user interface object 612c and real-time communication user interface object 612d because electronic device 600 determined that information associated with the contactable user represented by second contactable user indicator 612i indicates that the a device of the contactable user does not include the real-time communication application (and, optionally, does not include an account (or a particular account) associated with the real-time communication application). Even though electronic device 600 determined that information associated with the contactable user represented by first contactable user indicator 612g indicates that a device of the contactable user includes the real-time communication application, because a device of one of the contactable users included in invitees region 612a does not include the real-time communication application, electronic device 600 does not display audio user interface object 610c and real-time communication user interface object 612d (e.g., electronic device 600 cannot initiate a real-time communication session with both invitees included in invitee region 612a because at least one invitee does not include the real-time communication application).

For example, a device associated with Ivy Smith does not include the real-time communication application, and thus, electronic device 600 cannot initiate a real-time communication with Ivy Smith via the real-time communication application (e.g., electronic device 600 cannot send and/or transmit data causing a device associated with Ivy Smith to output a notification via the real-time communication application). Instead, electronic device 600 displays continue user interface object 610j, which when selected via user input, causes electronic device 600 to generate and/or receive a link to a real-time communication session. The link to the real-time communication session enables Ivy Smith to join the real-time communication session without using a device that includes the real-time communication application (e.g., Ivy Smith can join the real-time communication session via a web browser on the device that does not include the real-time communication application).

Figure 6G:
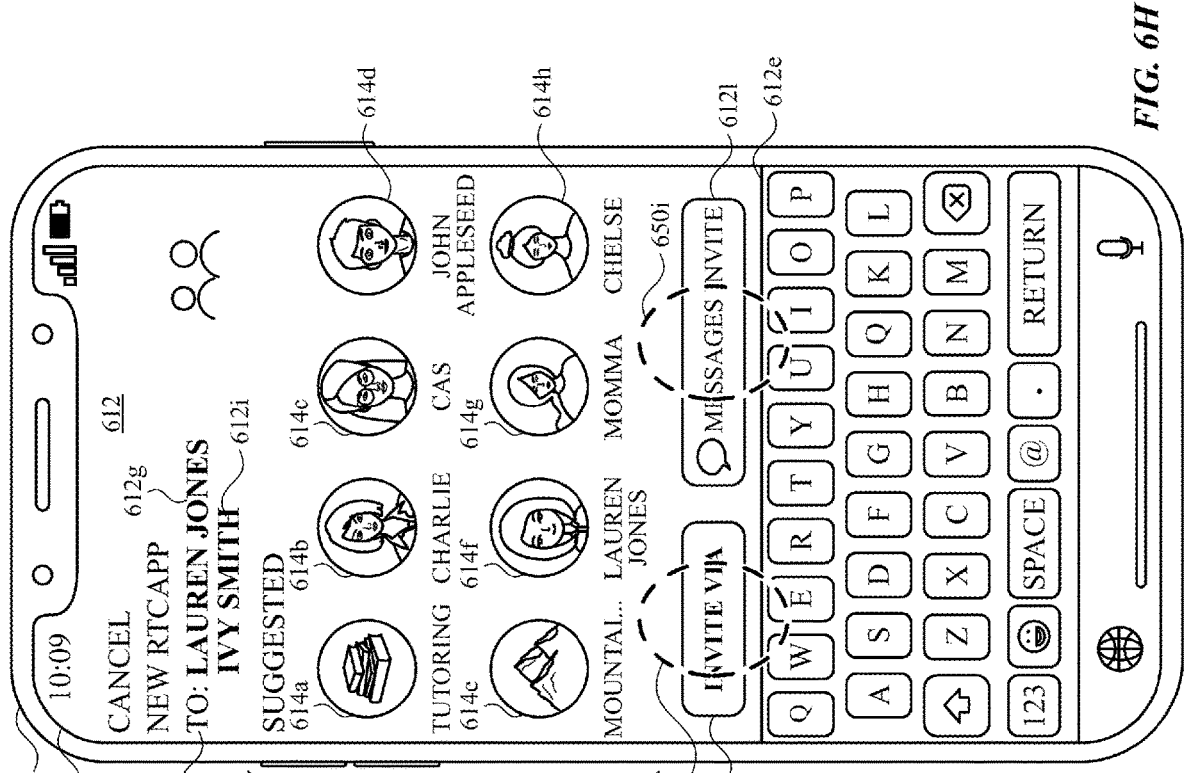

At FIG. 6F, electronic device 600 detects user input 650g corresponding to selection of continue user interface object 612j. In response to detecting user input 650g, electronic device 600 displays messaging user interface 622, as shown at FIG. 6G. In response to detecting user input 650g, electronic device 600 generates and/or receives a link to a real-time communication session that can be utilized by a device without the real-time communication application to join the real-time communication session.

At FIG. 6F, messaging user interface 622 includes recipient region 622a, messages region 622b, composition region 622c, send user interface object 622d, and keyboard 622e. At FIG. 6F, electronic device 600 displays messaging user interface 622 as an overlay on second user interface 612. In some embodiments, electronic device 600 launches a messaging application associated with messaging user interface 622 and replaces display of second user interface 612 with messaging user interface 622.

In response to detecting user input 650g, electronic device 600 auto-populates recipient region 622a with first contactable user indicator 622f corresponding to first contactable user indicator 612g (e.g., Lauren Jones) and second contactable user indicator 622g corresponding to second contactable user indicator 622i (e.g., Ivy Smith). For example, a user of electronic device 600 does not need to provide additional user input to add recipients that will receive a message sent via messaging user interface 622. In addition, electronic device 600 auto-populates composition region 622c with link user interface object 624a and draft message 624b. Composition region 622c of messaging user interface 622 displays characters and/or graphical user interface objects that correspond to detected user input, but have not been sent via electronic device 600 to one or more recipient devices. For example, composition region 622c displays a draft of a message that can ultimately be sent to recipients by electronic device 600 in response to detecting user input corresponding to send user interface object 622d. Thus, electronic device 600 auto-populates composition region 622c with link user interface object 624a and draft message 624b so that a user can review recipient region 622a, review composition region 622c, and/or edit draft message 624b (e.g., via one or more user inputs corresponding to keyboard 622e) prior to causing electronic device 600 to send the message. In some embodiments, link user interface object 624a is a hyperlink to a unique uniform resource locator for a real-time communication session. Link user interface object 624a enables users that select link user interface object 624a to participate in a real-time communication session with other users that have access to the unique uniform resource locater associated with link user interface object 624a.

At FIG. 6F, messages region 622b is blank indicating that a message has not been sent from electronic device 600 to a first electronic device (a device different from electronic device 600) associated with Lauren Jones and/or to a second electronic device (a device different from electronic device 600) associated with Ivy Smith. In some embodiments, electronic device 600 displays previously sent and/or received messages between electronic device 600, the first electronic device, and the second electronic device in messages region 622b.

At FIG. 6F, electronic device 600 detects user input 650h corresponding to send user interface object 622d. In response to detecting user input 650h, electronic device 600 initiates a process to send a message that includes link user interface object 624a and draft message 624b to the recipients corresponding to first contactable user indicator 622f and second contactable user indicator 622g (e.g., Lauren Jones and Ivy Smith). In addition, in response to detecting user input 650h, electronic device 600 displays a message in messages region 622b that includes link user interface object 624a and draft message 624b. As set forth below, after detecting user input 650h, electronic device 600 displays user interface object 606h on first user interface 604, as shown at FIG. 6L.

In some embodiments, in response to detecting user input 650f (as shown at FIG. 6E), electronic device 600 displays second user interface 612 that includes share user interface object 612k and messages user interface object 612l instead of including continue user interface object 612j (as shown at FIG. 6F). For instance, at FIG. 6H, electronic device 600 displays second contactable user indicator 612i in invitees region 612a of second user interface 612. Electronic device 600 displays first contactable user indicator 612g and second contactable user indicator 612i with the second appearance (e.g., a non-bold appearance and/or text of contact user interface object 620a having a first color, such as green) indicating that at least one contactable user associated with first contactable user indicator 612g and/or second contactable user indicator 612i is associated with a device that does not include the real-time communication application.

In addition, electronic device 600 does not display audio user interface object 612c and real-time communication user interface object 612d. Instead, electronic device 600 displays share user interface object 612k and messages user interface object 612l (e.g., in the same area and/or the same positions as audio user interface object 612c and real-time communication user interface object 612d of second user interface 612). Electronic device 600 does not display audio user interface object 612c and real-time communication user interface object 612d because electronic device 600 determined that information associated with the contactable user represented by second contactable user indicator 612i indicates that a device of the contactable user does not include the real-time communication application (and, optionally, does not include an account associated with the real-time communication application). Even though electronic device 600 determined that information associated with the contactable user represented by first contactable user indicator 612g indicates that a device of the contactable user includes the real-time communication application, because a device of one of the contactable users included in invitees region 612a does not include the real-time communication application, electronic device 600 does not display audio user interface object 610c and real-time communication user interface object 612d.

Figure 6H:
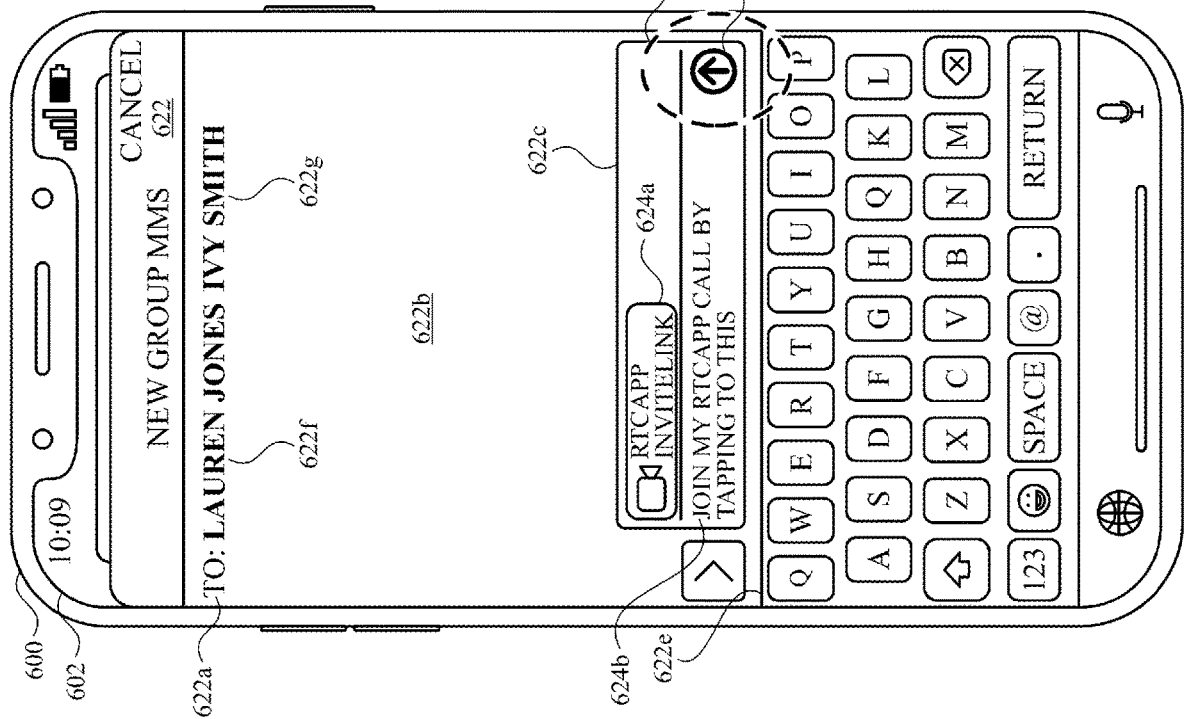
Figures 6I, 6J:
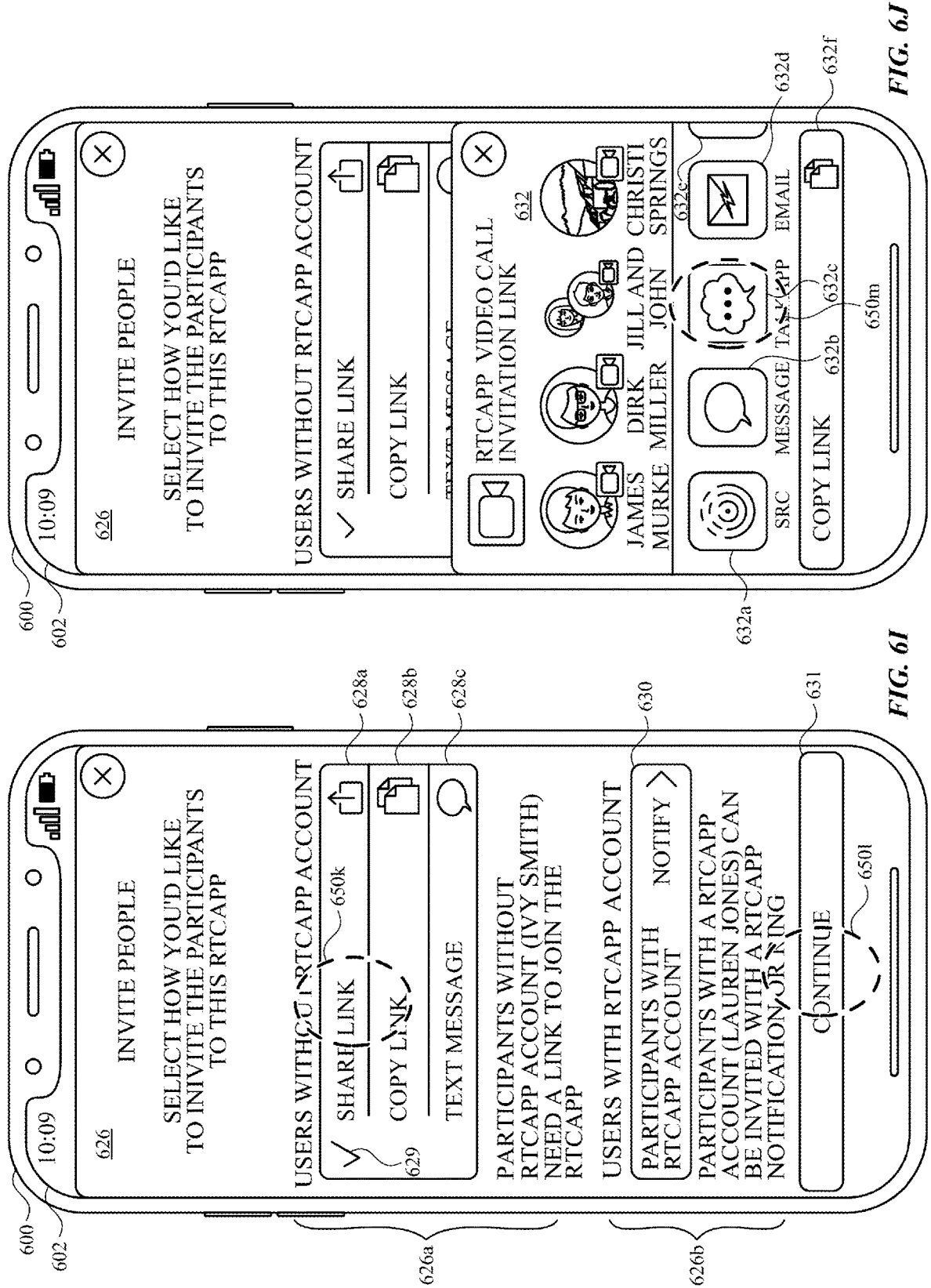

At FIG. 6H, electronic device 600 detects user input 650i corresponding to selection of messages user interface object 612l. In response to detecting user input 650i, electronic device 600 displays messaging user interface 622, as shown at FIG. 6G. Alternatively, electronic device 600 detects user input 650j corresponding to selection of share user interface object 612k. In response to detecting user input 650j, electronic device 600 displays sharing user interface 626, as shown at FIG. 6I. Alternatively, as set forth above, electronic device 600 displays sharing user interface 626 in response to detecting user input 650b corresponding to selection of link sharing user interface object 608, as shown at FIG. 6A.

At FIG. 6I, sharing user interface 626 includes first sharing region 626a, which provides one or more sharing options for a first set of invitees and second sharing region 626b, which provides one or more sharing options for a second set of invitees, different from the first set of invitees. For example, first sharing region 626a includes different sharing options for sharing a link to the real-time communication session with invitees (e.g., selected users represented by first contactable user indicator 612g and/or second contactable user indicator 612i of invitees region 612a) that are associated with a device that does not include the real-time communication application and/or a device that does not include a particular operating system software. Second sharing region 626b includes one or more sharing options (e.g., one or more sharing options that are selectable in response to detecting user input corresponding to third sharing user interface object 630) for sharing the link to the real-time communication session (or, in some embodiments, sharing an invitation and/or notification associated with the link to the real-time communication session) with invitees that are associated with devices that include the real-time communication application and/or devices that include the particular operating system software.

At FIG. 6I, first sharing region 626a includes second sharing user interface object 628a, copy user interface object 628b, and second messaging user interface object 628c. At FIG. 6I, electronic device 600 detects user input 650k selecting second sharing user interface object 628a. In response to detecting user input 650k, electronic device displays indicator 629 adjacent to and/or on second sharing user interface object 628a indicating that second sharing user interface object has been selected. When second sharing user interface object 628a is selected and electronic device 600a detects user input corresponding to continue user interface object 631, electronic device 600 displays second sharing user interface 632, as shown at FIG. 6J.

When copy user interface object 628b is selected and electronic device 600 detects user input corresponding to continue user interface object 631, electronic device 600 copies and/or stores (e.g., temporarily stores) data associated with the link to the real-time communication session. After electronic device 600 copies the data associated with the link to the real-time communication session, electronic device 600 can paste the link to the real-time communication session in response to detecting further user input (e.g., a touch and hold gesture). For example, electronic device 600 can paste the link to the real-time communication session by displaying text and/or a user interface object in a composition area for drafting a message. When second messaging user interface object 628c is selected and electronic device 600 detects user input corresponding to continue user interface object 631, electronic device 600 displays messaging user interface 622, as shown at FIG. 6G.

Second sharing region 626b includes third sharing user interface object 630 that indicates a sharing option for sending an invitation (e.g., a notification and/or the link to the real-time communication session) to the second set of invitees, but not the first set of invitees. The second set of invitees includes contactable users that are associated with devices that include the real-time communication application and/or devices that include a particular operating system software that enables the device to receive an invitation to the real-time communication session that does not necessarily include the link (e.g., a uniform resource locator). For instance, in response to detecting user input corresponding to third sharing user interface object 630, electronic device 600 displays sharing options for sending the invitation to the second set of invitees, which may include different sharing options than those available via first sharing region 626*a* and/or second sharing user interface 632. In some embodiments, electronic device 600 shares an invitation to the second set of invitees via a notification of the real-time communication application (e.g., devices of the invitees output a notification that is associated with the real-time communication application). In some embodiments, electronic device 600 shares an invitation to the second set of invitees via calling the devices associated with the second set of invitees. For example, the electronic device can call the devices associated with the second set of invitees by communicating with the invitee devices over a network, such that the invitee devices ring and/or output a notification related to the communication from electronic device 600. In some embodiments, electronic device 600 shares an invitation to the second set of invitees using the same sharing option (e.g., communication protocol) as the first set of invitees.

At FIG. 6I, electronic device detects user input 650*l* corresponding to selection of continue user interface object 631. In response to detecting user input 650*l* and in accordance with a determination that second sharing user interface object 628*a* has been selected (e.g., via user input 650*k*), electronic device 600 displays second sharing user interface 632, as shown at FIG. 6J.

At FIG. 6J, electronic device 600 displays second sharing user interface 632 as an overlay on sharing user interface 626. In some embodiments, electronic device 600 replaces display of sharing user interface 626 with display of second sharing user interface 632. At FIG. 6J, second sharing user interface 632 includes sharing option user interface objects 632*a*-632*e*, as well as copy user interface object 632*f*. Sharing option user interface objects 632*a*-632*e* correspond to different sharing techniques, applications, and/or modes of communication for sending the link to the real-time communication session to the first set of invitees (and, optionally, the second set of invitees). First sharing option user interface object 632*a* corresponds to an option for sharing the link to the real-time communication session via a direct wireless communication (e.g., a short-range communication connection, such as Bluetooth, Wi-Fi, and/or Zigbee, that directly sends the link from electronic device 600 to one or more invitee devices without an intermediate device). For example, first sharing option user interface object 632*a* enables the link to the real-time communication session to be shared with an external device (e.g., an external device of a invitee) via a direct wireless communication protocol. Second sharing option user interface object 632*b* corresponds a first messaging application (e.g., a first chat and/or texting application) that is configured to share the link to the real-time communication session via an electronic message (e.g., an asynchronous message, such as a text message). In some embodiments, first messaging application is the messaging application associated with messaging user interface 622. Third sharing option user interface object 632*c* corresponds to a second messaging application (e.g., a second chat and/or texting application), different from the first messaging application, that is configured to share the link to the real-time communication session via an electronic message (e.g., an asynchronous message, such as a text message and/or a chat message). Fourth sharing option user interface object 632*d* corresponds to an electronic mail application that is configured to share the link to the real-time communication session via an e-mail.

At FIG. 6J, electronic device 600 partially displays fifth sharing option user interface object 632*e*. In response to detecting user input on second sharing user interface 632 (e.g., a left swipe gesture), electronic device 600 translates sharing option user interface objects 632*a*-632*e* to display (e.g., fully display) fifth sharing option user interface object 632*e* and/or display one or more additional sharing option user interface objects. In some embodiments, fifth sharing option user interface object 632*e* corresponds to another application that enables electronic device 600 to share the link to the real-time communication session via an electronic message, a short-range communication, an e-mail, a notification, and/or another suitable communication protocol.

At FIG. 6J, electronic device 600 detects user input 650*m* corresponding to selection of third sharing option user interface object 632*c*. In response to detecting user input 650*m*, electronic device 600 displays chat user interface 634 of the second messaging application, as shown at FIG. 6K.

At FIG. 6K, chat user interface 634 includes draft message 634*a*, link 634*b*, and send user interface object 634*c*. Draft message 634*a* is an auto-generated (e.g., generic) message that indicates that link 634*b* corresponds to a real-time communication session. Electronic device 600 can change the contents of draft message 634*a* in response to detecting one or more user inputs directed to keyboard 634*d* of chat user interface 634. For example, a user of electronic device 600 can draft a personalized message to send with link 634*b*. Link 634*b* is a unique uniform resource locator that corresponds to a virtual room for the real-time communication session. At FIG. 6K, electronic device 600 detects user input 650*n* corresponding to send user interface object 634*c*. In response to detecting user input 650*n*, electronic device 600 initiates a process to send a message via the second messaging application that includes draft message 634*a* and link 634*b*.

After sending the message via the second messaging application, as shown at FIG. 6K, and/or after sending the message via the messaging application, as shown at FIG. 6G, electronic device 600 displays first user interface 604, as shown at FIG. 6L. In some embodiments, in response to detecting user input 650*h* (as shown at FIG. 6G) and/or in response to detecting user input 650*n* (as shown at FIG. 6K), electronic device 600 displays real-time communication user interface 636, as shown at FIG. 6M. Accordingly, in such embodiments, electronic device 600 initiates the real-time communication session in response to detecting that a message including the link (e.g., link user interface object 624*a* and/or link 634*b*) to the real-time communication session has been sent (e.g., via electronic device 600).

At FIG. 6L, electronic device 600 displays first user interface 604 at a first time after sending the link to the real-time communication session. Electronic device 600 displays first user interface 604 having user interface object 606*h* corresponding to the sent link to the real-time communication session (e.g., link user interface object 624*a* and/or link 634*b*). In addition, electronic device 600 displays region 604*d* on first user interface 604 corresponding to the current time (e.g., 10:09). As shown at FIG. 6L, region 604*d* is displayed before (e.g., above) regions 604*a*-604*c* indicating that user interface object 606*h* corresponds to a real-time communication session that is closest to the current time and/or that the real-time communication session is ongoing. As set forth below, electronic device 600 can change and/or adjust an appearance of user interface object 606*h* (and, optionally, other user interface objects corresponding to ongoing real-time communication sessions) in response to detecting one or more events.

At FIG. 6L, electronic device 600 detects user input 650*o* corresponding to selection of user interface object 606*h*. In response to detecting user input 650*o*, electronic device 600 displays real-time communication user interface 636, as shown at FIG. 6M. In some embodiments, electronic device 600 displays real-time communication user interface 636 in response to detecting user input 650*o* corresponding to selection of user interface object 606*h* (e.g., while displaying first user interface 604), and in some embodiments, electronic device 600 displays real-time communication user interface 636 in response to detecting user input 650*h* and/or user input 650*n* corresponding to a request to send a message that includes the link to the real-time communication session.

At FIG. 6M, real-time communication user interface 636 includes first participant indicator 638 corresponding to a first invitee to the real-time communication session (e.g., the user associated with first contactable user indicator 612*g*; Lauren Jones), second participant indicator 640 corresponding to a second invitee to the real-time communication session (e.g., the user associated with second contactable user indicator 612*i*; Ivy Smith), and user indicator 642 corresponding to a field of view of a camera of electronic device 600, which is associated with a user of electronic device 600. At FIG. 6M, first participant indicator 638 includes visual indicator 638*a* (e.g., an avatar, a photo, and/or another visual representation) of the first invitee and identifier 638*b* (e.g., a name, nickname, user name, and/or email address) of the first invitee. Similarly, second participant indicator 640 includes visual indicator 640*a* (e.g., an avatar, a photo, and/or another visual representation) of the second invitee and identifier 640*b* (e.g., a name, nickname, user name, and/or email address) of the second invitee. Because the first invitee and the second invitee have not joined the real-time communication session, electronic device 600 displays visual indicator 638*a* and visual indicator 640*a*, respectively. As set forth below, when the first invitee and/or the second invitee joins the real-time communication session, electronic device 600 does not display (or removes display of) visual indicator 638*a* and/or visual indicator 640*a*, respectively, and instead displays real-time images (e.g., a snapshot and/or a video feed) of the first invitee and/or the second invitee.

In addition, first participant indicator 638 includes messaging user interface object 638*c* and second participant indicator 640 includes messaging user interface object 640*c*. In response to detecting user input corresponding to messaging user interface object 638*c* and/or messaging user interface object 640*c*, electronic device 600 displays a messaging user interface that enables electronic device 600 to send an electronic message (e.g., a text message) to the first invitee (e.g., a device associated with the first invitee) and/or the second invitee (e.g., a device associated with the second invitee).

Further still, at FIG. 6M, first participant indicator 638 includes call user interface object 638*d* (e.g., "Ring") and second participant indicator 640 includes status indicator 640*d* (e.g., "Invite Sent"). As set forth above, the first invitee (e.g., Lauren Jones) is a user that is associated with a device having the real-time communication application and/or a device having a particular operating system software. Accordingly, electronic device 600 displays call user interface object 638*d*, which, when selected via user input, causes electronic device 600 to call a device of the first invitee (e.g., initiate a real-time communication with the device of the first invitee). Because the second invitee (e.g., Ivy Smith) includes a user that is associated with a device that does not have the real-time communication application and/or a device that does not include the particular operating system software, electronic device 600 is not able to call the device of the second invitee via the real-time communication application. As such, electronic device 600 displays status indicator 640*d* indicating that electronic device 600 has sent (and/or initiated a process to send) the link to the real-time communication session to the second invitee (e.g., a device of the second invitee) without enabling electronic device 600 to call the second invitee via the real-time communication application.

At FIG. 6N, electronic device 600 displays first user interface 604 at a second time, after the first time, after sending the link to the real-time communication session. At FIG. 6N, electronic device 600 displays user interface object 606*h* with an updated appearance in response to detecting that the first invitee (e.g., Lauren Jones) and the second invitee (e.g., Ivy Smith) have joined the real-time communication session. For instance, user interface object 606*h* includes participant identifier 642*a* (e.g., a textual indication of participants that have joined the real-time communication session) and participant icon 642*b* (e.g., a visual indication of participants and/or a number of participants that have joined the real-time communication session). In response to detecting that one or more invitees have joined the real-time communication session, electronic device 600 displays user interface object 606*h* with identifiers of the invitees that have joined via participant identifier 642*a* and a visual indication as to the identity and/or number of participants that have joined via participant icon 642*b*. Therefore, a user of electronic device 600 can quickly and easily (e.g., without additional input) determine the participants currently participating in the real-time communication session without having to join the real-time communication session.

Figure 6P:
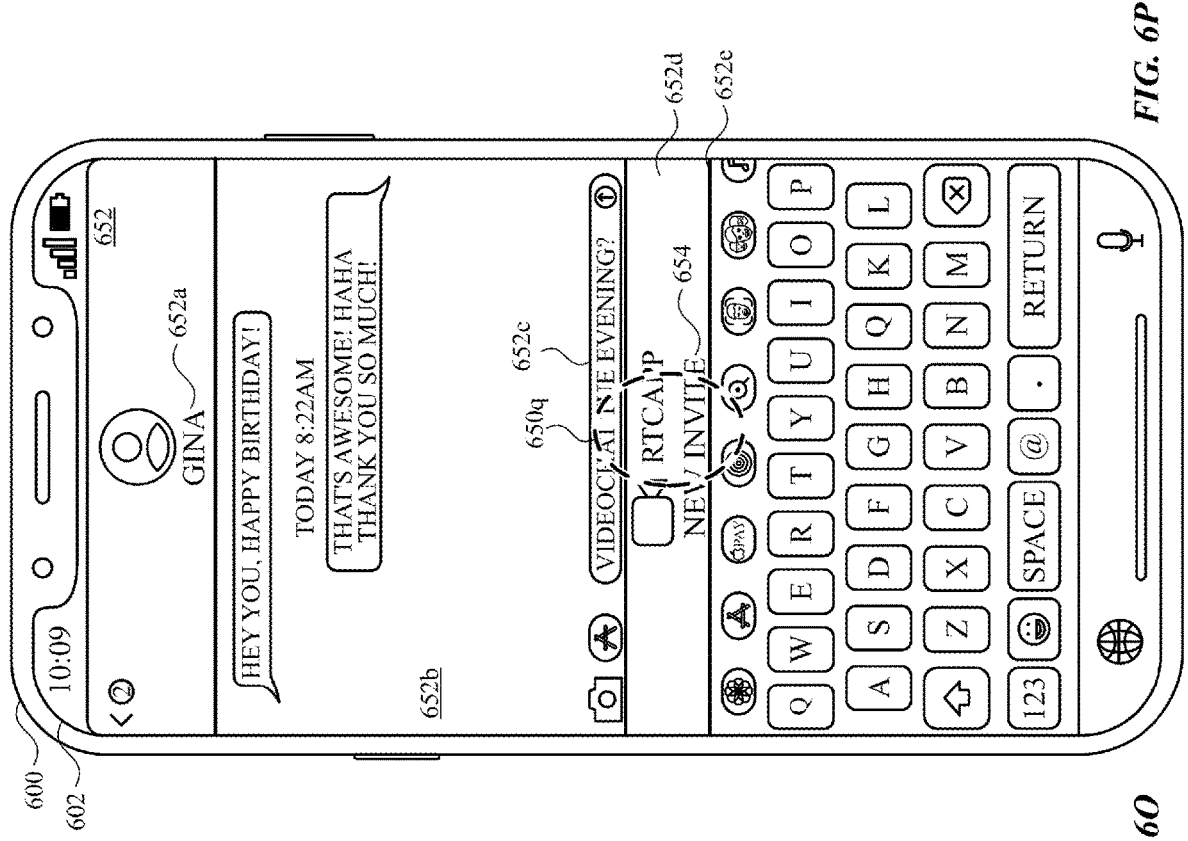
Figure 6O:
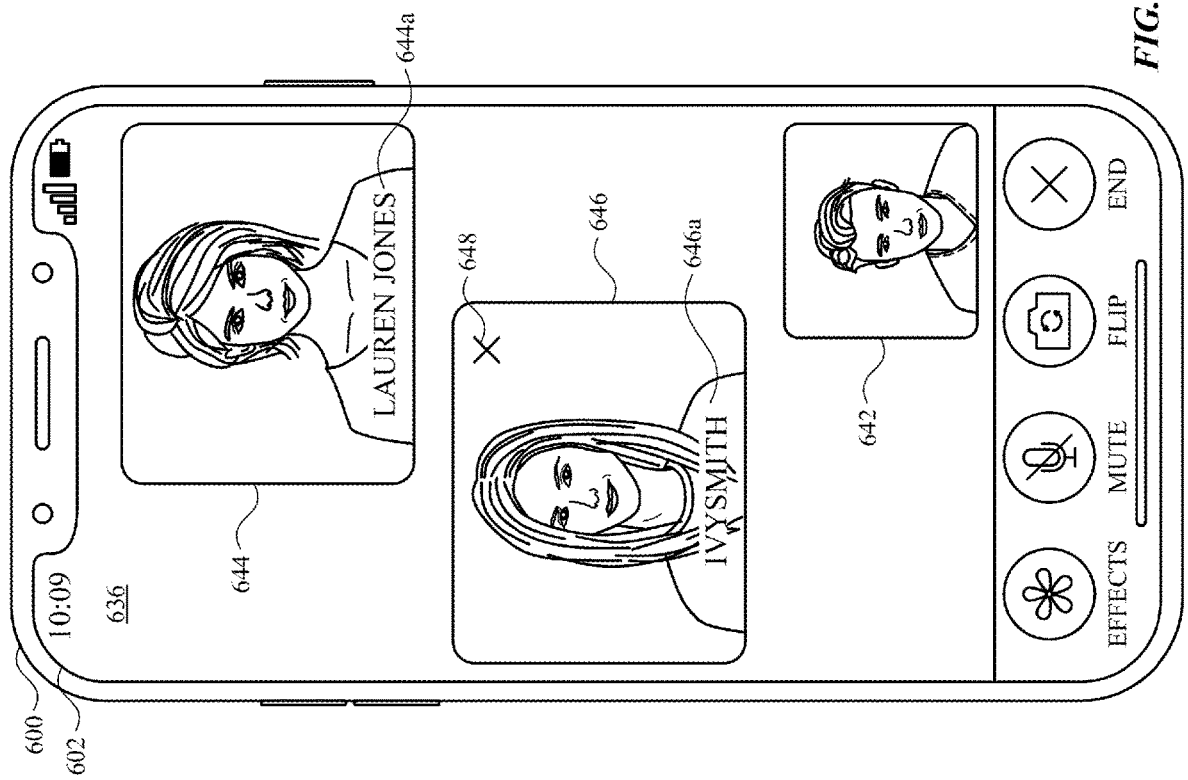
Figure 7B:
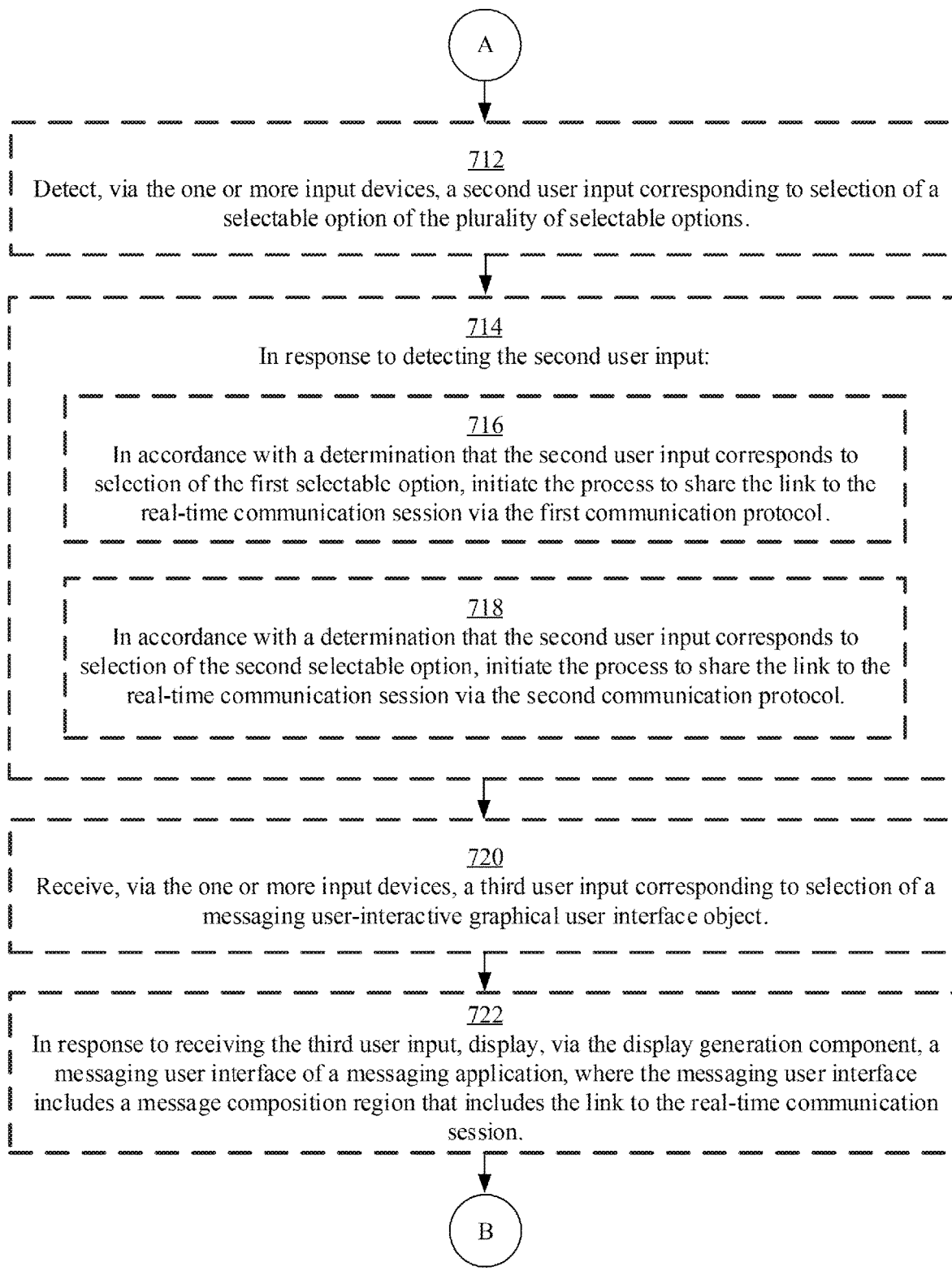
Figure 7C:
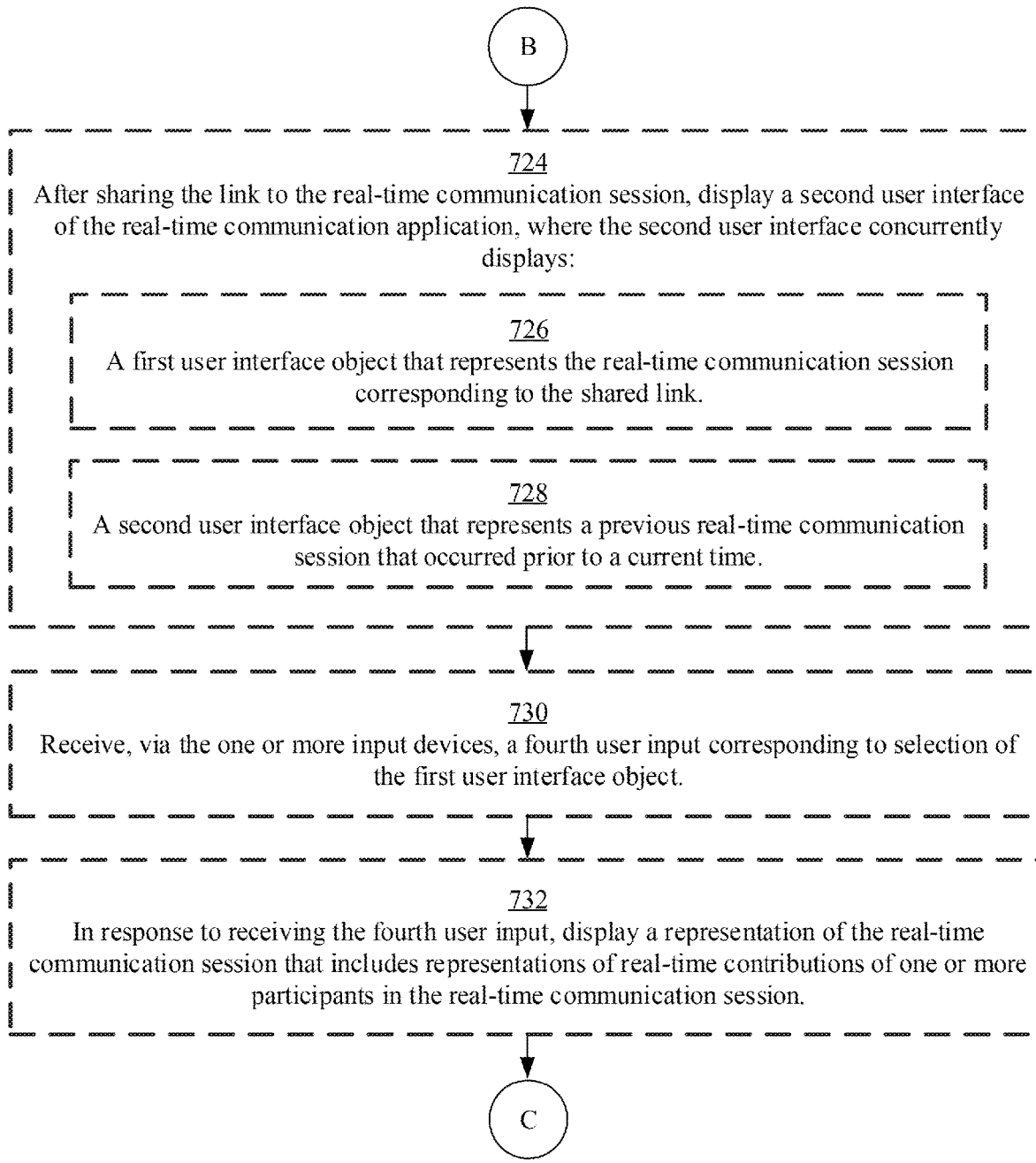
Figure 7D:
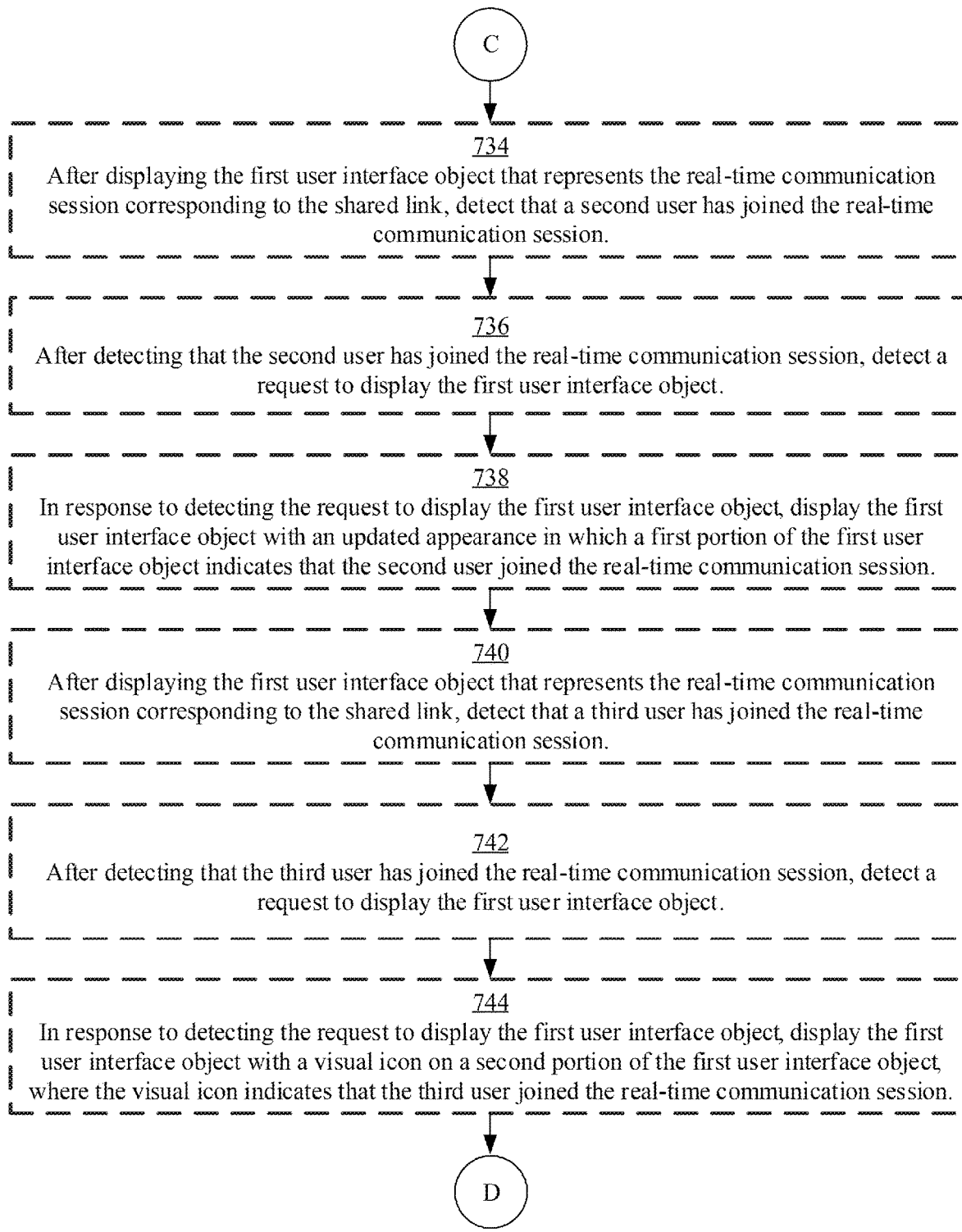
Figure 7E:
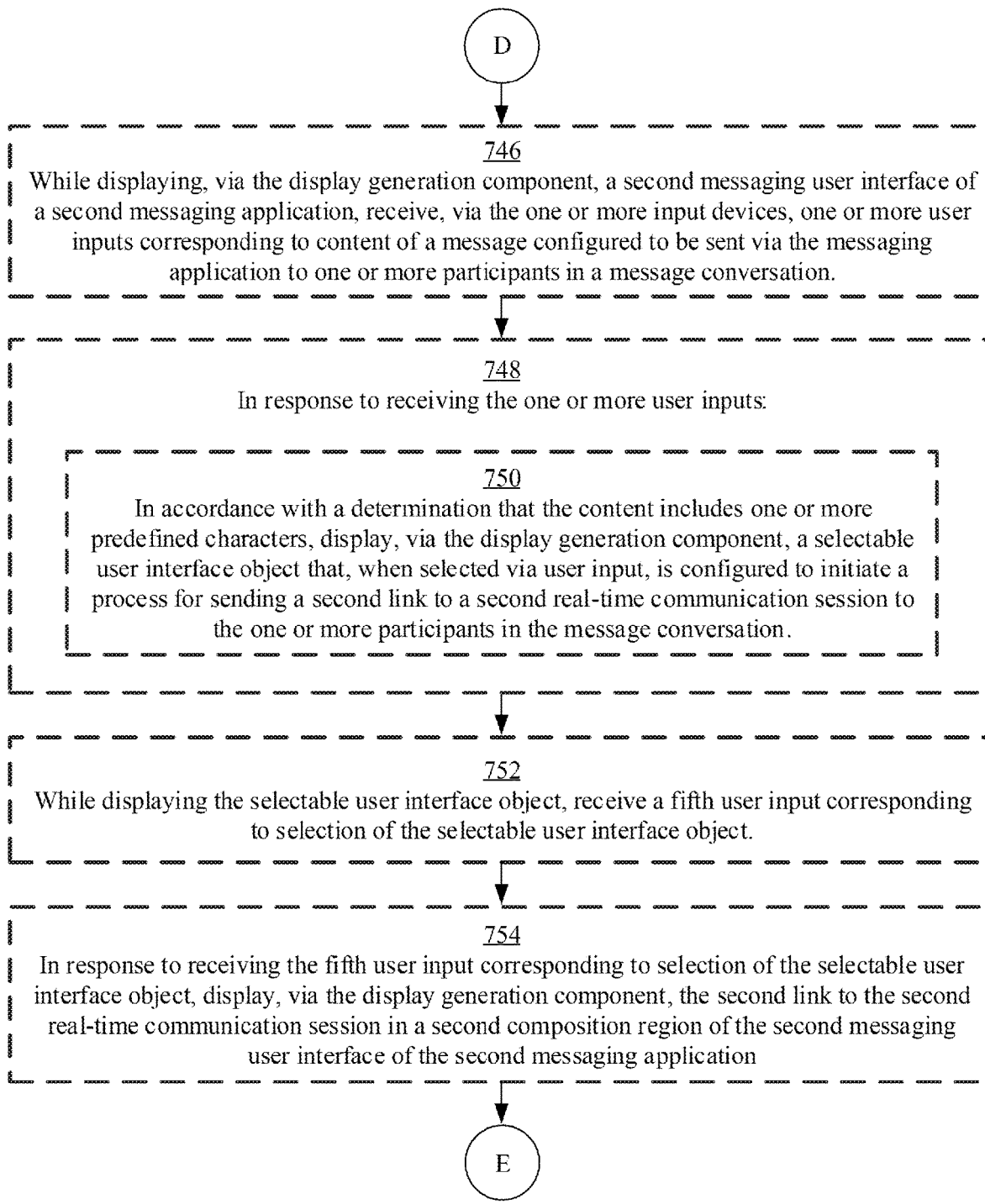
Figure 7G:
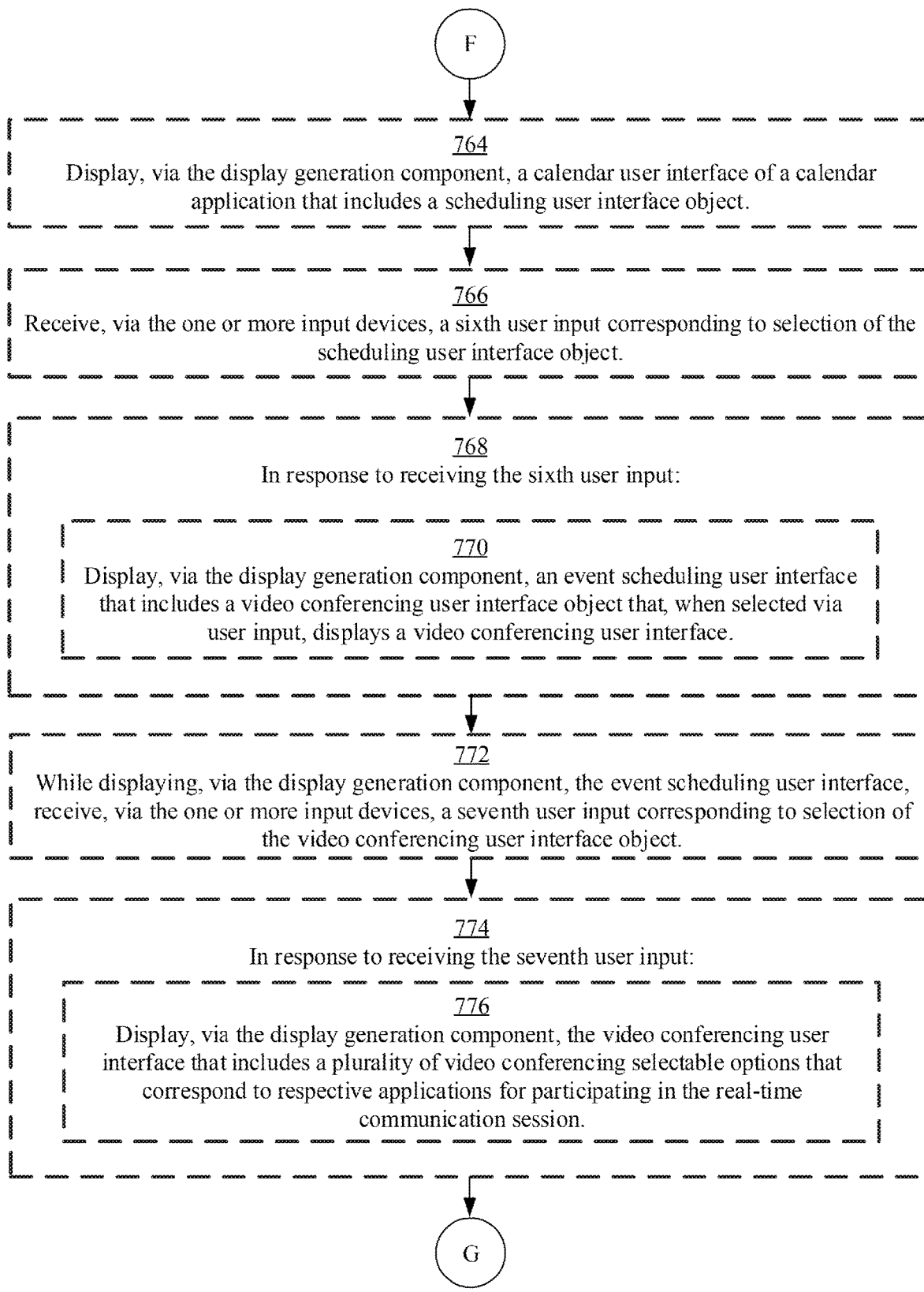
Figure 7H:
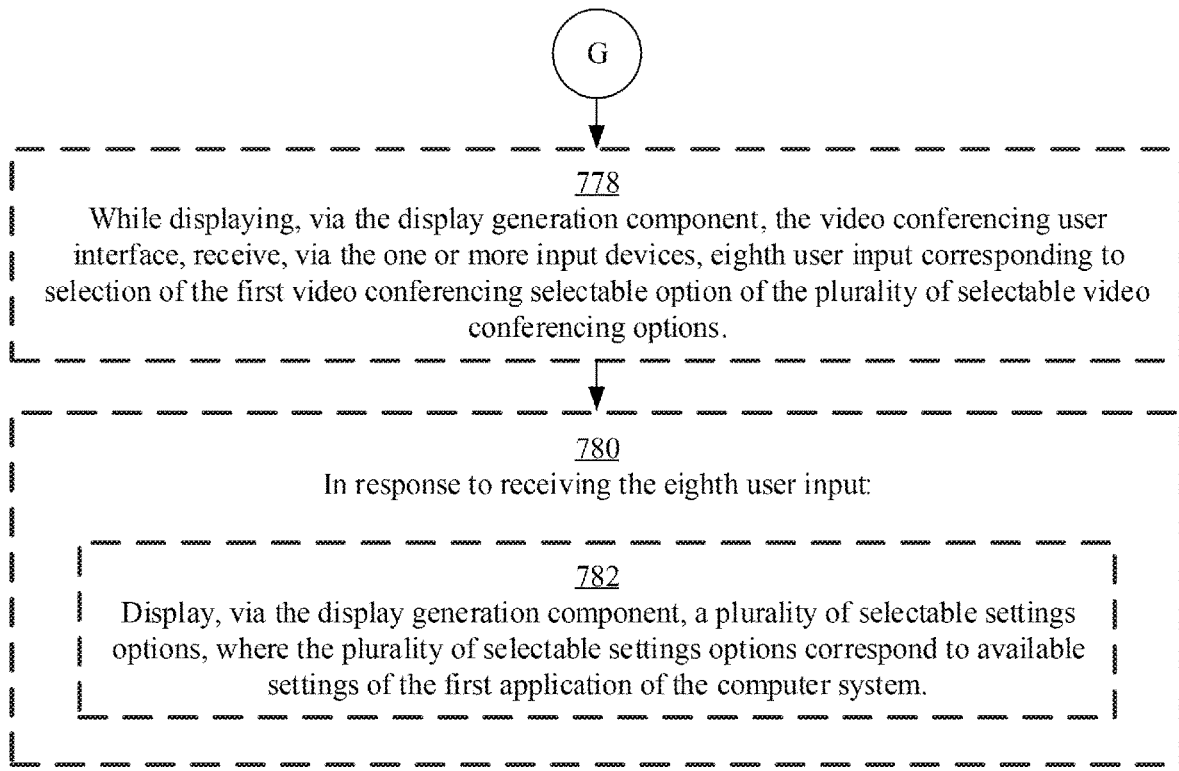
Figure 8C:
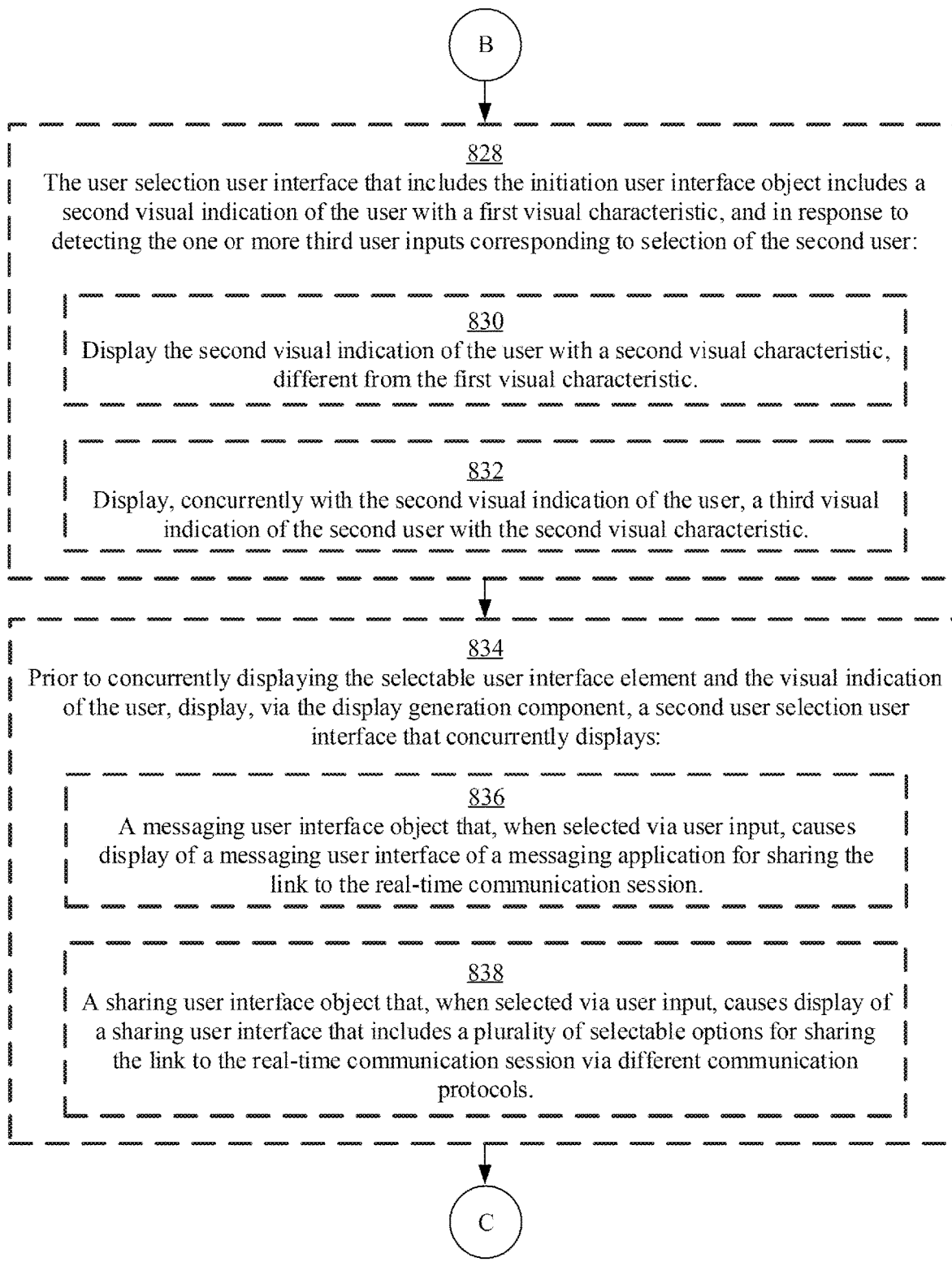
Figure 8D:
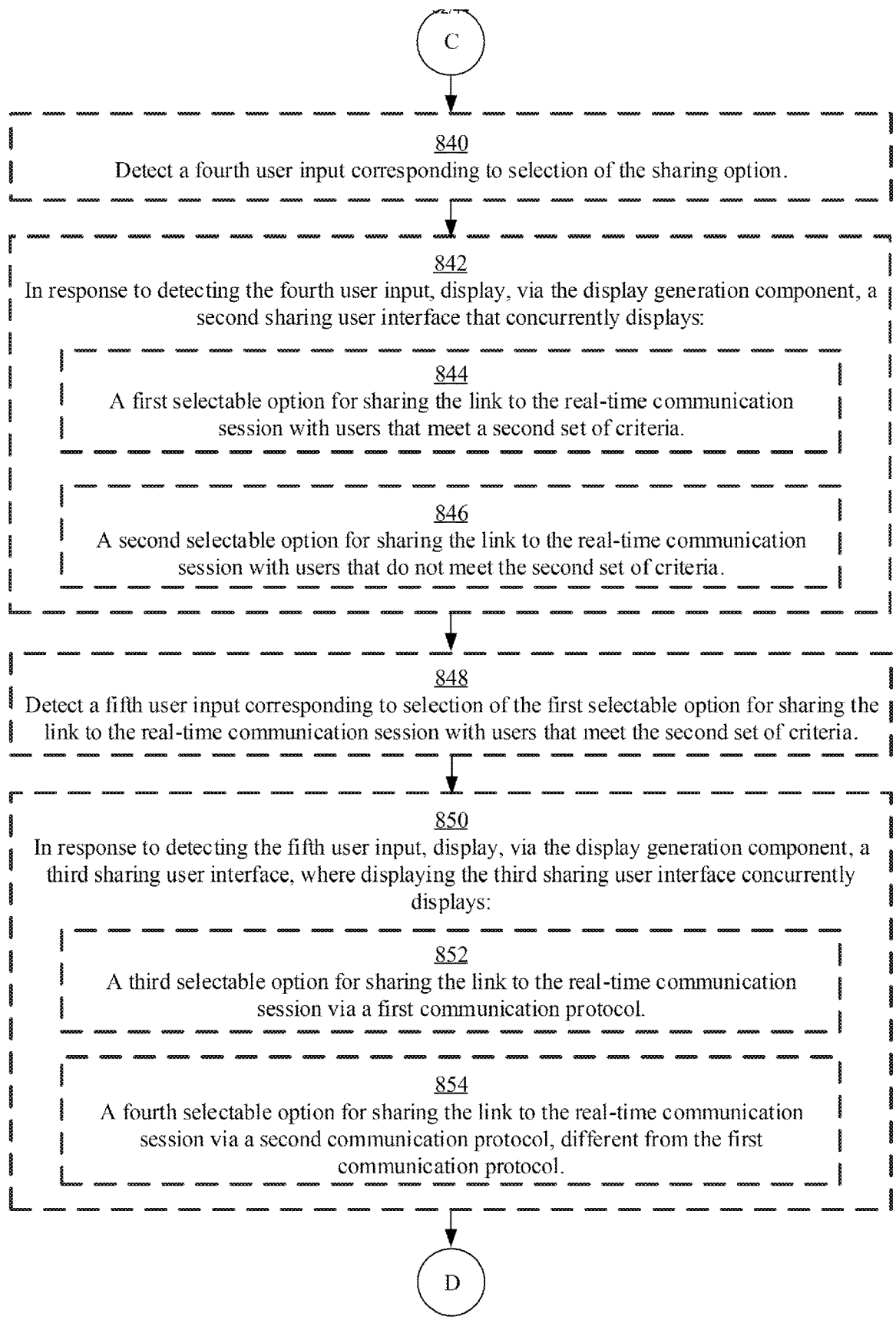

At FIG. 6N, electronic device 600 detects user input 650*p* corresponding to selection of user interface object 606*h*. In response to detecting user input 650*p*, electronic device 600 displays real-time communication user interface 636, as shown at FIG. 6O.

Because some invitees have already joined the real-time communication session, electronic device 600 displays real-time communication user interface 636 with first participant representation 644 and second participant representation 646. First participant representation 644 includes a real-time image and/or video feed captured via a device associated with the first invitee (e.g., Lauren Jones), as well as a first participant identifier 644*a* (e.g., a name, nickname, user name, and/or email address) of the first invitee. Similarly, second participant representation 646 includes a real-time image and/or video feed captured via a device associated with the second invitee (e.g., Ivy Smith), as well as second participant identifier 646*a* (e.g., a name, nickname, user name, and/or email address) of the second invitee.

As set forth above, electronic device 600 determines that the second invitee and/or participant (e.g., Ivy Smith) is not associated with a device that includes the real-time communication application and/or a particular operating system software. As such, electronic device 600 displays remove user interface object 648 on second participant representation 646. In response to detecting user input corresponding to remove user interface object 648, electronic device 600 causes the second invitee and/or participant to be removed from the real-time communication session (e.g., electronic device 600 causes a device of the second invitee and/or the second participant to be disconnected from the real-time communication session). In addition, electronic device 600 determines that the first invitee and/or participant (e.g., Lauren Jones) is associated with a device that includes the real-time communication application and/or the particular operating system software. As such, electronic device 600 does not display remove user interface object 648 on first participant representation 644. In some embodiments, electronic device 600 does not display remove user interface object 648 for any participants in the real-time communication session. In some embodiments, electronic device 600 displays remove user interface object 648 for all participants in the real-time communication session. Additional techniques related to an ability to remove users from and/or allow users into a real-time communication session are further described below with reference to FIGS. 9 and 10.

In some instances, a user may wish to send the link to the real-time communication session via a different method than with the real-time communication application, as set forth above with reference to FIGS. 6A-6K. FIGS. 6P-6R illustrate embodiments of electronic device 600 generating and/or sending the link to the real-time communication session via a messaging application. In addition, FIGS. 6R-6V illustrate embodiments of electronic device 600 generating the link to the real-time communication session via a calendar application.

At FIG. 6P, electronic device 600 displays messaging user interface 652 (e.g., the same messaging user interface as messaging user interface 622 and/or a different messaging user interface from messaging user interface 622). Messaging user interface 652 includes recipient indicator 652a, messages region 652b, composition region 652c, suggested content region 652d, and keyboard 652e. At FIG. 6P, recipient indicator 652a indicates that a message sent via the messaging application will be sent to a single recipient (e.g., Gina). In some embodiments, recipient indicator 652a can include more than one recipient. In addition, messages region 652b includes previously sent and received messages between the recipient(s) and a user of electronic device 600.

At FIG. 6P, electronic device 600 detects one or more user inputs corresponding to keyboard 652e and displays content (e.g., "VideoChat Tue Evening") of a draft message in composition region 652c. In response to detecting the one or more user inputs, electronic device 600 compares the content to one or more predefined characters that are indicative of user intent to schedule and/or initiate a real-time communication session. For instance, at FIG. 6P, the content of the draft message includes the word "VideoChat." Electronic device 600 determines that the word "VideoChat" matches the one or more predefined characters and displays real-time communication user interface object 654 in suggested content region 652d. Real-time communication user interface object 654 corresponds to a link to a real-time communication session generated by electronic device 600 and/or received via electronic device 600. In addition, real-time communication user interface object 654 corresponds to a link to a real-time communication session that is scheduled for a time corresponding to the content of draft message in composition region 652c. For instance, the content of draft message includes the words "Tue Evening" indicating an intent of the user to schedule the real-time communication session for the upcoming Tuesday in the evening. In some embodiments, electronic device 600 generates the link to schedule the real-time communication session for the upcoming Tuesday at a time that corresponds to the evening (e.g., the evening based on a current time zone of electronic device 600), such as 5 pm, 6 pm, and/or 7 pm. Therefore, a user of electronic device 600 can type a draft message with a reference to communicating and/or meeting (e.g., via a real-time communication session) at a particular time, and electronic device 600 displays real-time communication user interface object 654 suggesting to the user to schedule a real-time communication session at a time corresponding to the content of the draft message.

At FIG. 6P, electronic device 600 detects user input 650q corresponding to selection of real-time communication user interface object 654. In response to detecting user input 650q, electronic device 600 schedules the real-time communication session (e.g., adds and/or displays a user interface object corresponding to the scheduled real-time communication session on first user interface 604), sends a message with a link corresponding to real-time communication user interface object 654, and displays message 656 in messages region 652b of messaging user interface 652, as shown at FIG. 6Q.

At FIG. 6Q, message 656 includes link 656a and message portion 656b. Link 656a is a uniform resource locator that corresponds to the real-time communication session at the scheduled time (e.g., the upcoming Tuesday in the evening). A device of the recipient displays link 656a in a corresponding messaging application of the recipient device. In some embodiments, the recipient can select link 656a before the scheduled time, but the real-time communication session will not be initiated until the scheduled time. At FIG. 6P, message portion 656b of message 656 includes an auto-generated (e.g., a default) message. In some embodiments, in response to selecting real-time communication user interface object 654, electronic device 600 enables a user to change and/or modify the auto-generated message before sending message 656 to the recipient.

In some instances, the content of draft message in composition region 652c corresponds to an invitation to an already scheduled real-time communication session. For instance, at FIG. 6R, electronic device 600 detects one or more user inputs corresponding to keyboard 652e and displays content (e.g., "VideoCall Tue Evening") of a draft message in composition region 652c. In response to detecting the one or more user inputs, electronic device 600 compares the content to a set of criteria (e.g., one or more predefined characters that are indicative of user intent to schedule and/or initiate a real-time communication session). At FIG. 6R, the content of the draft message includes the word "VideoCall." Electronic device 600 determines that the word "VideoCall" matches one or more predefined characters and displays first real-time communication user interface object 658 and second real-time communication user interface object 660 in suggested content region 652d.

First real-time communication user interface object 658 corresponds to a link to a new real-time communication session generated by electronic device 600 and/or received via electronic device 600. At FIG. 6R, electronic device 600 determines that the content of the draft message indicates a time (e.g., "Tue Evening") that is at and/or near (e.g., within 30 minutes, within 1 hour, and/or within 2 hours) a previously scheduled real-time communication session. As such, electronic device 600 displays second real-time communication user interface object 660, which corresponds to a previously scheduled real-time communication session at and/or near the time indicated by the content of draft message. As such, a user of electronic device 600 can quickly and easily invite the recipient to the previously scheduled real-time communication session (e.g., via second real-time communication user interface object 660) and/or schedule a new real-time communication session with the recipient (e.g., via first real-time communication user interface object 658).

As mentioned above, FIGS. 6S-6V illustrate embodiments in which electronic device 600 generates the link to the real-time communication session via a calendar application. At FIG. 6S, electronic device 600 displays calendar user interface 662 including calendar 662*a* and new event user interface object 662*b*. At FIG. 6S, electronic device 600 detects user input 650*r* corresponding to selection of new event user interface object 662*b*. In response to detecting user input 650*r*, electronic device 600 displays scheduling user interface 664 of the calendar application, as shown at FIG. 6T.

Scheduling user interface 664 of the calendar application enables electronic device 600 to create a new event (e.g., an appointment, a meeting, and/or another scheduled event) that electronic device 600 adds to calendar 662*a* of calendar user interface 662 (e.g., a user interface object corresponding to the new event displayed on calendar 662*a*). Scheduling user interface 664 includes scheduling option user interface objects 664*a*-664*h* that, when selected via user input, enable a user of electronic device 600 to specify and/or customize details related to the new event, such as timing information related to the new event, a location of the new event, invitees to invite to the new event, and/or a communication mode of the new event (e.g., in-person, video conference, audio conference, and/or another communication mode).

At FIG. 6T, electronic device 600 detects user input 650*s* corresponding to selection of real-time communication session user interface object 664*b* (e.g., for a video conference or an audio conference or a video and/audio conference). In response to detecting user input 650*s*, electronic device 600 displays real-time communication session user interface 666, as shown at FIG. 6U.

At FIG. 6U, real-time communication session user interface 666 includes real-time communication session option user interface objects 666*a*-666*f*. First real-time communication session option user interface object 666*a* corresponds to a no real-time communication session option that, when selected via user input, causes the new event to be designated as a non-real-time communication session (e.g., an in-person meeting and/or appointment and/or an audio meeting and/or appointment). In addition, real-time communication session option user interface objects 666*b*-666*e* correspond to real-time communication session applications that can be used to conduct and/or initiate a real-time communication session for the new event. In some embodiments, real-time communication session one or more of option user interface objects 666*b*-666*e* correspond to real-time communication session applications that are installed on electronic device 600 (e.g., applications that have been downloaded and enabled for use on electronic device 600). In some embodiments, one or more of real-time communication session option user interface objects 666*b*-666*e* correspond to real-time communication session applications that are installed on electronic device 600 and for which a user of electronic device 600 has signed into (e.g., a user has logged into an account associated with the respective real-time communication session applications). Real-time communication session user interface object 666*f* corresponds to a custom link option for a real-time communication session. In response to detecting user input corresponding to real-time communication session user interface object 666*f*, electronic device 600 prompts a user to input a link to a real-time communication session (e.g., link user interface object 624*a* and/or link 634*b*). In some embodiments, the link to the real-time communication session corresponds to a real-time communication session application that is not represented by and/or associated with real-time communication session user interface objects 666*b*-666*e*.

At FIG. 6U, electronic device 600 detects user input 650*t* corresponding to selection of real-time communication session option user interface object 666*d* (e.g., corresponding to a real-time communication session application called "Boom" that is different from real-time communication application "RTCApp" discussed above). In response to detecting user input 650*t*, electronic device 600 displays real-time communication session details user interface 668, as shown at FIG. 6V.

At FIG. 6V, real-time communication session details user interface 668 includes user interface objects 668*a*-668*c* corresponding to various options and/or details for a real-time communication session configured to be performed via the real-time communication session application (e.g., "Boom") corresponding to real-time communication session option user interface object 666*d*. At FIG. 6V, user interface object 668*a* corresponds to a one-time room for the real-time communication session (e.g., video conference) associated with the new event. In response to detecting user input corresponding to user interface object 668*a*, electronic device 600 creates, schedules, and/or designates a new, one-time use virtual room for the real-time communication session associated with the new event. In some embodiments, the new, one-time use virtual room cannot be used for an additional real-time communication session that takes place after the real-time communication session associated with the new event.

At FIG. 6V, user interface object 668*b* corresponds to a personal room for the real-time communication session (e.g., video conference) associated with the new event. In response to detecting user input corresponding to user interface object 668*b*, electronic device 600 schedules and/or designates a virtual room associated with an account of a user of electronic device 600 (e.g., an account logged into the real-time communication session application associated with real-time communication session option user interface object 666*d* (e.g., "Boom")) for the real-time communication session associated with the new event. In some embodiments, the virtual room can be used for additional real-time communication sessions that take place after the real-time communication session associated with the new event.

Further, at FIG. 6V, user interface object 668*c* corresponds to a password for the real-time communication associated with the new event. In response to detecting user input corresponding to user interface object 668*c*, electronic device 600 generates a password and/or enables a user to input a password that limits access to the real-time communication session associated with the new event. For instance, when user interface object 668*c* is selected, invitees and/or users that attempt to join the real-time communication session will not be allowed to participate in the real-time communication session unless the invitees and/or users enter the correct password. In some embodiments, an invitation to the real-time communication session associated with the new event includes the password, such that invitees that are authorized by a user of electronic device 600 (e.g., selected via user input) can join the real-time communication session by entering the password. In addition, non-authorized invitees that do not have the password and/or enter an incorrect password are blocked from joining the real-time communication session.

While FIG. 6V illustrates real-time communication session details user interface 668 having user interface objects 668a-668c, in some embodiments, real-time communication session details user interface 668 includes more than three or fewer than three user interface objects. In some embodiments, real-time communication session details user interface 668 includes user interface objects that are specific and/or otherwise correspond to options that are particular to the respective real-time communication session application. Thus, real-time communication session details user interface 668 can include different user interface objects corresponding to different options and/or details for the real-time communication session depending on which real-time communication session user interface object 666b-666e is selected.

FIGS. 7A-7H are a flow diagram illustrating a method for sharing a link to a real-time communication session using a computer system in accordance with some embodiments.

Method 700 is performed at a at a computer system (e.g., 100, 300, 500, 600, 900, 902, 904, and/or 906) (e.g., an electronic device; a smart device, such as a smartphone or a smartwatch; a mobile device; a wearable device) that is in communication with a display generation component (e.g., 602) and one or more input devices (e.g., 602). Some operations in method 700 are, optionally, combined, the orders of some operations are, optionally, changed, and some operations are, optionally, omitted.

As described below, method 700 provides an intuitive way for sharing a link to a real-time communication session. The method reduces the cognitive burden on a user for sharing a link to a real-time communication session, thereby creating a more efficient human-machine interface. For battery-operated computing devices, enabling a user to share a link to a real-time communication session faster and more efficiently conserves power and increases the time between battery charges.

The computer system (e.g., 600) displays (702), via the display generation component (e.g., 603), a user interface (e.g., 604 and/or 612) (e.g., a home screen user interface of the video communication application, a user interface displayed in response to user input corresponding to a request to select a user associated with an external computer system (e.g., an external computer system that does not have a particular video communication application installed), and/or a user interface displayed in response to a request to initiate a video communication session) of a real-time communication application (e.g., an application of the computer system that enables voice and/or video conferencing between a user associated with the computer system and one or more users associated with respective external computer systems), the user interface including a user-interactive graphical user interface element (e.g., 608, 612j, and/or 612k) (e.g., a button and/or an affordance that is displayed in response to the user input corresponding to selection of the user associated with the external computer system) corresponding to a link (e.g., 624a, 634b, and/or 910a) (e.g., a link that, in response to user input corresponding to selection of the link, launches the real-time communication application and/or a different application (e.g., an application associated with a web browser) that enables a user associated with an external computer system to participate in a real-time communication session with the user associated with the computer system) to a real-time communication session (e.g., corresponding to initiating the creation of a link for a real-time communication session between the user associated with the computer system and one or more users associated with respective external computer systems that are selected via the user interface and/or another user interface).

The computer system (e.g., 600) receives (704), via the one or more input devices (e.g., 602), user input (e.g., 650b, 650g, and/or 650j) (e.g., a tap gesture) corresponding to selection of the user-interactive graphical user interface element (e.g., 608, 612j, and/or 612k).

In response to receiving the user input, the computer system (e.g., 600) initiates (706) a process to share the link (e.g., 624a, 634b, and/or 910a) to the real-time communication session, wherein the process to share the link to the real-time communication session includes displaying, via the display generation component, a sharing user interface (e.g., 626 and/or 632) (e.g., a pop-up window overlaid on the user interface, a sharing user interface that is partially overlaid on the user interface, and/or a sharing user interface that replaces the user interface) including a plurality of selectable options (e.g., 628a, 628b, 628c, 630, 632a, 632b, 632c, 632d, 632e, and/or 632f) for sharing the link (e.g., 624a, 634b, and/or 910a) to the real-time communication session (e.g., affordances and/or buttons corresponding to different sharing options, techniques, and/or applications for sharing the link), including concurrently displaying: a first selectable option (e.g., 632a, 632b, 632c, 632d, 632e, and/or 632f) (708) for sharing the link (e.g., 624a, 634b, and/or 910a) to the real-time communication session via a first communication protocol (e.g., short message service, electronic mail, a short range communication, a direct wireless communication technique, a file sharing service, and/or a social media application); and a second selectable option (e.g., 632a, 632b, 632c, 632d, 632e, and/or 632f) (710) for sharing the link (e.g., 624a, 634b, and/or 910a) to the real-time communication session via a second communication protocol that is different from the first communication protocol (e.g., short message service, electronic mail, a short range communication, a direct wireless communication technique, a file sharing service, and/or a social media application). In some embodiments, each selectable option of the plurality of selectable options corresponds to a respective communication protocol and/or application (e.g., a real-time communication application, a messaging application, a communication application, an email application, and/or a direct wireless communication technique, such as Bluetooth) that is configured to send (e.g., send data associated with the link from the computer system to an external computer system, such that the external computer system displays the link) the link to a user associated with an external computer system different from the computer system (e.g., a user selected via one or more user inputs detected while the computer system displays the user interface).

Including the first selectable option for sharing the link to the real-time communication session via a first communication protocol and the second selectable option for sharing the link to the real-time communication session via the second communication protocol provides a user with multiple options for sharing the link to the real-time communication session and reduces the number of inputs required by the user for sharing the link. For example, the user can select an option for sharing the link to the real-time communication session without having to navigate from the user interface of the real-time communication application to another application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects (712), via the one or more input devices (e.g., 602), a second user input (e.g., 650*m*) (e.g., a tap gesture, such as a single tap gesture) corresponding to selection of a selectable option (e.g., 632*c*) of the plurality of selectable options (e.g., 628*a*, 628*b*, 628*c*, 630, 632*a*, 632*b*, 632*c*, 632*d*, 632*e*, and/or 632*f*); and in response to detecting the second user input (714): in accordance with a determination that the second user input corresponds to selection of the first selectable option (e.g., 632*a*, 632*b*, 632*c*, 632*d*, 632*e*, and/or 632*f*), the computer system (e.g., 600) initiates (716) the process to share the link (e.g., 624*a*, 634*b*, and/or 910*a*) to the real-time communication session via the first communication protocol (e.g., short message service, electronic mail, a short range communication, a direct wireless communication technique, a file sharing service, and/or a social media application) (e.g., sending, transmitting, and/or sharing the link via the first communication protocol); and in accordance with a determination that the second user input corresponds to selection of the second selectable option (e.g., 632*a*, 632*b*, 632*c*, 632*d*, 632*e*, and/or 632*f*), the computer system (e.g., 600) initiates (718) the process to share the link (e.g., 624*a*, 634*b*, and/or 910*a*) to the real-time communication session via the second communication protocol (e.g., short message service, electronic mail, a short range communication, a direct wireless communication technique, a file sharing service, and/or a social media application) (e.g., sending, transmitting, and/or sharing the link via the second communication protocol).

Including the first selectable option for sharing the link to the real-time communication session via a first communication protocol and the second selectable option for sharing the link to the real-time communication session via the second communication protocol enables a user to select a preferred communication protocol for sharing the link to the real-time communication session and reduces the number of inputs required by the user for selecting the communication protocol and/or sharing the link. For example, the user can select an option for sharing the link to the real-time communication session without having to navigate from the user interface of the real-time communication application to another application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of selectable options (e.g., 628*a*, 628*b*, 628*c*, 630, 632*a*, 632*b*, 632*c*, 632*d*, 632*e*, and/or 632*f*) correspond to a plurality of communication protocols (e.g., short message service, electronic mail, a short range communication, a direct wireless communication technique, a file sharing service, and/or a social media application) (in some embodiments, each selectable option corresponds to a respective communication protocol) that include electronic mail (e.g., 632*d*) (e.g., an application of the computer system that shares the link to the real-time communication session over a network in an electronic message (e.g., an email)) and one or more real-time communication protocols (e.g., 632*b* and/or 632*c*) (e.g., applications of the computer system that share the link to the real-time communication session via a short message service, an instant communication and/or message service, and/or a social media service).

Including a plurality of selectable options that correspond to a plurality of communication protocols enables a user to select a preferred communication protocol without having to navigate to another application associated with the preferred communication protocol, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of selectable options (e.g., 628*a*, 628*b*, 628*c*, 630, 632*a*, 632*b*, 632*c*, 632*d*, 632*e*, and/or 632*f*) correspond to a plurality of communication protocols (e.g., short message service, electronic mail, a short range communication, a direct wireless communication technique, a file sharing service, and/or a social media application) (in some embodiments, each selectable option corresponds to a respective communication protocol) that include a short message service protocol (e.g., 632*b* and/or 632*c*) (e.g., an application of the computer system that shares the link to the real-time communication session over a network in a short message) and one or more messaging protocols (e.g., 632*b* and/or 632*c*) (e.g., applications of the computer system that share the link to the real-time communication session via an instant communication, a message service, and/or a social media service that do not use the short message service protocol). In some embodiments, the short message service protocol corresponds to a first application that is installed on the computer system and the one or more messaging protocols correspond to one or more second applications that are installed on the computer system.

Including a plurality of selectable options that correspond to a plurality of communication protocols enables a user to select a preferred communication protocol without having to navigate to another application associated with the preferred communication protocol, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of selectable options (e.g., 628*a*, 628*b*, 628*c*, 630, 632*a*, 632*b*, 632*c*, 632*d*, 632*e*, and/or 632*f*) correspond to a plurality of communication protocols (e.g., short message service, electronic mail, a short range communication, a direct wireless communication technique, a file sharing service, and/or a social media application) (in some embodiments, each selectable option corresponds to a respective communication protocol) that include a first messaging communication protocol (e.g., 632*b*) (e.g., a first application of the computer system that shares the link to the real-time communication session via a short message service, an instant communication and/or message service, and/or a social media service) and a second messaging communication protocol (e.g., 632*c*) (e.g., a second application of the computer system, different from the first application, that shares the link to the real-time communication session via a short message service, an instant communication and/or message service, and/or a social media service).

Including a plurality of selectable options that correspond to a plurality of communication protocols enables a user to select a preferred communication protocol without having to navigate to another application associated with the preferred communication protocol, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, initiating the process to share the link (e.g., 624a and/or 634b) to the real-time communication session includes: displaying, via the display generation component (e.g., 602), one or more user-interactive graphical user interface objects (e.g., 614a-614h) (e.g., visual indications of users and/or contacts for which the computer system includes a phone number, email address, username, and/or other contact information associated with the respective user and/or contact) that represent one or more previously contacted (e.g., favorite, recently contacted or frequently contacted) users (e.g., users that have been selected by a user associated with the computer system for receiving a communication most recently and/or within a threshold period of time from the current time (e.g., the last week, the last day, the last hour, the last 30 minutes)) and that, when selected, select a corresponding one or more previously contacted users with which to share the link (e.g., 624a and/or 634b) to the real-time communication session.

Displaying the one or more user-interactive graphical user interface objects that represent one or more previously contacted users enables a user to quickly select a desired recipient to share the link to the real-time communication session without providing additional inputs corresponding to an identifier of the desired recipient, thereby reducing the number of inputs required for selecting a recipient. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, one or more of the plurality of selectable options (e.g., 628a, 628b, 628c, 630, 632a, 632b, 632c, 632d, 632e, and/or 632f) correspond to a direct wireless sharing protocol (e.g., 632a) (e.g., establishing a short range communication (e.g., a Bluetooth connection, a Zigbee connection, and/or a Wi-Fi connection) with an external computer system to transmit, send, and/or share the link to the real-time communication session without transmitting, sending, and/or sharing the link to the external computer system via an intermediate device, such as a server and/or an external network (e.g., public Internet)).

Including a plurality of selectable options that correspond to a plurality of communication protocols enables a user to select a preferred communication protocol without having to navigate to another application associated with the preferred communication protocol, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) receives (720), via the one or more input devices (e.g., 602), a third user input (e.g., 650g and/or 650i) (e.g., a tap gesture, such as a single tap gesture) corresponding to selection of a messaging user-interactive graphical user interface object (e.g., 612j, 612l, and/or 632b) (e.g., the first selectable option, the second selectable option, and/or a messages invitation affordance); and in response to receiving the third user input, the computer system (e.g., 600) displays (722), via the display generation component (e.g., 602), a messaging user interface (e.g., 622, 634, and/or 908) of a messaging application (e.g., a messaging user interface that includes a virtual keyboard, a composition and/or input region, a messages region, one or more indicators of a recipient of a message), wherein the messaging user interface (e.g., 622, 634, and/or 908) includes a message composition region (e.g., 622c) (e.g., a region of the messaging user interface that displays text, images, data, and/or other information that is to be sent to a recipient (e.g., before detecting user input that causes the message to be sent)) that includes the link (e.g., 624a, 634b, and/or 910a) to the real-time communication session.

Displaying the messaging user-interactive graphical user interface object in the real-time communication application enables a user to quickly access a messaging application by selecting the messaging user-interactive graphical user interface object without having to provide additional user inputs to navigate to the messaging application, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after sharing the link (e.g., 624a, 634b, and/or 910a) to the real-time communication session (e.g., after and/or in response to user selection of a send affordance that causes a message including the link to the real-time communication session to be sent via the messaging application), the computer system (e.g., 600) displays (724) a second user interface (e.g., 604) (e.g., a home user interface and/or default user interface that is displayed upon launching the real-time communication application) of the real-time communication application, wherein the second user interface (e.g., 604) concurrently displays: a first user interface object (e.g., 606h) (726) (e.g., a visual indication and/or an affordance that includes information and/or details about the real-time communication session, such as a scheduled time for the real-time communication session, a type of real-time communication session (e.g., audio and/or video), invitees to the real-time communication session, and/or users that have joined the real-time communication session) (in some embodiments, user input corresponding to selection of the first user interface object causes the computer system to display a real-time communication session user interface for participating in the real-time communication session) that represents the real-time communication session corresponding to the shared link (e.g., 624*a*, 634*b*, and/or 910*a*); and a second user interface object (e.g., 606*a*-606*g*) (728) that represents a previous real-time communication session that occurred prior to a current time (e.g., a visual indication and/or an affordance corresponding to a previous real-time communication session that the user associated with the computer system joined and/or was invited to join and includes information and details about the previous real-time communication session) (in some embodiments, user input corresponding to selection of the second user interface object initiates a new real-time communication session with the same invitees as the previous real-time communication session).

Displaying the first user interface object that represents the real-time communication session corresponding to the shared link enables a user to quickly select and initiate the real-time communication session after sharing the link, thereby reducing the number of inputs needed for the user to participate in the real-time communication session. In addition, the first user interface object provides improved feedback to the user by confirming that the link to the real-time communication session was shared and that the real-time communication session is scheduled. Reducing the number of inputs needed to perform an operation and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the second user interface (e.g., 604) includes displaying an animation of the first user interface object (e.g., 606*h*) appearing in a list of real-time communication sessions (e.g., 606*a*-606*h*) (e.g., an appearance of the first user interface object is adjusted and/or changed over time in response to detecting events, such as invitees joining the real-time communication session). In some embodiments, displaying the animation of the first user interface object directs a user's attention to the first user interface object, thereby enabling the user to quickly locate the first user interface object and/or enabling the user to understand that the first user interface object corresponds to real-time communication session associated with the shared link.

Animating the appearance of the first user interface object that represents the real-time communication session corresponding to the shared link provides improved feedback to the user about a status of the real-time communication session. In addition, animating the appearance of the first user interface object that represents the real-time communication session corresponding to the shared link provides improved feedback to the user that the first user interface object represents the real-time communication session corresponding to the shared link. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface object (e.g., 606*h*) is displayed in a first region (e.g., 604*d*) of the second user interface (e.g., 604) corresponding to a first period of time (e.g., a first region corresponding to the current hour, a time that occurs after the current time, and/or the current day) (e.g., the first region of the second user interface is at a top portion of the display generation component that corresponds to one or more ongoing real-time communication sessions and/or one or more real-time communication sessions that are scheduled for a time later than the current time, the first user interface object and any additional user interface objects that represent ongoing real-time communication sessions and/or real-time communication sessions that are scheduled for a time later than the current time are listed in chronological order in the first region (e.g., the user interface object that represents a real-time communication session scheduled at a time closest to the current time is listed first and/or above other user interface objects that represent real-time communication sessions that are scheduled for times that occur further away from the current time), and/or the first region of the second user interface is positioned above a second region of the second user interface that corresponds to real-time communication sessions that occurred and/or were scheduled for times prior to the current time), and the second user interface object (e.g., 606*a*-606*g*) is displayed in a second region (e.g., 604*a*, 604*b*, and/or 604*c*) of the second user interface (e.g., 604) corresponding to a second period of time, different from the first period of time (e.g., a second region corresponding to the current day, the previous day, and/or the current week) (e.g., the second region is positioned below the first region of the second user interface such that the second user interface object is positioned below and/or after the first user interface object, the second region and the first region do not overlap with one another, the second user interface object displayed in the second region is positioned adjacent to (e.g., shares a boundary with) a third user interface object that represents a second previous real-time communication session, and/or the second user interface object, the third user interface object, and/or any additional user interface objects that represent additional previous real-time communication sessions are listed in chronological order in the second region (e.g., the user interface object that represents the most recent previous real-time communication session is listed first and/or above other user interface objects that represent less recent previous real-time communication sessions)).

Arranging the first and second user interface objects of the second user interface into one or more regions corresponding to respective periods of time enables a user to quickly and efficiently identify a relevant user interface object corresponding to a particular real-time communication session without having to scroll through a list of user interface objects to find the relevant user interface object, thereby reducing the number of inputs required by the user to initiate a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) receives (730) (e.g., while displaying the first user interface object in the first region of the second user interface), via the one or more input devices (e.g., 602), a fourth user input (e.g., 650*o* and/or 650*p*) (e.g., a tap gesture, such as a single tap gesture) corresponding to selection of the first user interface object (e.g., 606*h*) (e.g., a user interface object that corresponds to the real-time communication session that is associated with the link). In response to receiving the fourth user input (e.g., 650*o* and/or 650*p*), the computer system (e.g., 600) displays (732) a representation (e.g., 636 and/or 916*a*) of the real-time communication session that includes representations (e.g., 638, 638, 642, 644, 646, 916*a*, 916*b*, 916*c*, and/or 916*d*) of real-time contributions of one or more participants in the real-time communication session (e.g., a third user interface of the real-time communication application that corresponds to the real-time communication session) (e.g., a user interface that includes a visual representation of the user associated with the computer system (e.g., a real-time image and/or a real-time video feed captured by a camera of the computer system) and one or more visual representations of users invited to the real-time communication session (e.g., a placeholder image and/or an avatar of a respective user when the respective user has not joined the real-time communication session and/or a real-time image and/or real-time video feed of the respective user when the of the respective user has joined the real-time communication session)) (e.g., a user interface that enables the user to communicate (e.g., visually and/or audibly) with one or more other users associated with external computer systems).

Displaying the third user interface of the real-time communication application in response to receiving the fourth user input enables a user to initiate the real-time communication session without additional inputs for adding and/or selecting one or more invitees, thereby reducing the number of inputs needed for the user to participate in the real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the first user interface object (e.g., 606*h*) that represents the real-time communication session corresponding to the shared link (e.g., 624*a*, 634*b*, and/or 910*a*) (e.g., while displaying the second user interface of the real-time communication application), the computer system (e.g., 600) detects (734) that a second user (e.g., the user) has joined the real-time communication session (e.g., a user that is different from the user associated with the computer system). After detecting that the second user has joined the real-time communication session, the computer system (e.g., 600) detects (736) a request (e.g., an input causing computer system (e.g., 600) to display first user interface 604) to display the first user interface object (e.g., 606*h*). In response to detecting the request to display the first user interface object (e.g., 606*h*), the computer system (e.g., 600) displays (738) the first user interface object (e.g., 606*h*) with an updated appearance in which a first portion (e.g., 642*a*) (e.g., text and/or images) of the first user interface object (e.g., 606*h*) indicates that the second user joined the real-time communication session (e.g., an appearance of the first user interface object is adjusted and/or changed to visually indicate that an identity of one or more users that have joined the real-time communication session, such that the user associated with the computer system is aware and/or understands that the user is currently participating in the real-time communication session, and/or an appearance of the first user interface object is adjusted and/or changed to visually indicate a number of users that have joined the real-time communication session).

Updating an appearance of a first portion of the first user interface object that represents the real-time communication session corresponding to the shared link provides improved feedback to the user about a status of the real-time communication session. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the first user interface object (e.g., 606*h*) that represents the real-time communication session corresponding to the shared link (e.g., 624*a*, 634*b*, and/or 910*a*) (e.g., while displaying the second user interface of the real-time communication application), the computer system (e.g., 600) detects (740) that a third user (e.g., the user and/or the second user) has joined the real-time communication session (e.g., the user selected the link and/or otherwise selected a user interface object (e.g., displayed in a user interface of a real-time communication application) to initiate the real-time communication session). After detecting that the third user has joined the real-time communication session, the computer system (e.g., 600) detects (742) a request (e.g., an input causing computer system (e.g., 600) to display first user interface 604) to display the first user interface object (e.g., 606*h*). In response to detecting the request to display the first user interface object (e.g., 606*h*), the computer system (e.g., 600) displays (744) the first user interface object (e.g., 606*h*) with a visual icon (e.g., 642*b*) on a second portion of the first user interface object, wherein the visual icon (e.g., 642*b*) indicates that the third user that joined the real-time communication session (e.g., a textual indicator including an identifier (e.g., a name, a user name, a phone number, and/or an email address) of the user indicating that the user joined the real-time communication session, a visual indicator including an image and/or icon associated with the user and indicating that the user joined the real-time communication session, and/or a visual indicator including an image and/or icon representing a number of users that have joined the real-time communication session).

Updating a visual icon of a second portion of the first user interface object that represents the real-time communication session corresponding to the shared link provides improved feedback to the user about a status of the real-time communication session. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component (e.g., 602), a second messaging user interface (e.g., 652) of a second messaging application (e.g., a user interface including a keyboard (e.g., a virtual keyboard), a composition region, a conversation region, and/or an indication of one or more participants of a conversation), the computer system (e.g., 600) receives (746), via the one or more input devices (e.g., 602), one or more user inputs (e.g., one or more user inputs selecting keys of keyboard 612*e*) corresponding to content of a message configured to be sent via the messaging application to one or more participants in a message conversation (e.g., one or more inputs corresponding to selection of keys of a keyboard (e.g., a virtual keyboard) and/or user interface objects of the messaging user interface that cause text, images, and/or data to be displayed in a composition region of the messaging region, where the computer system is configured to send a message including the text, images, and/or data in response to additional user input). In response to receiving the one or more user inputs (748): in accordance with a determination that the content includes one or more predefined characters (e.g., alphanumeric characters and/or emoji characters), the computer system (e.g., 600) displays (750), via the display generation component, a selectable user interface object (e.g., 654, 658, and/or 660) (e.g., an image, object, and/or data corresponding a link to the real-time communication session to include in a message configured to be sent via the messaging application of the computer system) that, when selected via user input, is configured to initiate a process for sending a second link (e.g., 656*a* and/or 910*a*) to a second real-time communication session to the one or more participants in the message conversation (e.g., display the second link and/or an object associated with the second link in the composition region of the messaging user interface, such that the second link can be sent in a message via the messaging user interface of the computer system (e.g., in response to user input sending the message)). In some embodiments, the computer system sends the second link to the second real-time communication session to the one or more participants in the message conversation in response to detecting user input corresponding to selection of the selectable user interface object.

Displaying the real-time communication user interface object enables a user to generate and/or send a link to a real-time communication session from the messaging application without navigating to the real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the selectable user interface object (e.g., 654, 658, and/or 660), the computer system (e.g., 600) receives (752) a fifth user input (e.g., 650*q*) corresponding to selection of the selectable user interface object (e.g., 654, 658, and/or 660) (e.g., a tap gesture, such as a single tap gesture). In response to receiving the fifth user input (e.g., 650*q*) corresponding to selection of the selectable user interface object (e.g., 654, 658, and/or 660), the computer system (e.g., 600) displays (754), via the display generation component, the second link (e.g., 656*a* and/or 910*a*) to the second real-time communication session (e.g., an alphanumeric representation of a uniform resource locator and/or an object corresponding to the second link) in a second composition region (e.g., 652*b* and/or 652*c*) (e.g., a region including text, characters, objects, images, and/or other data that is configured to be sent in a message via the messaging application of the computer system in response to user input that sends the message (e.g., user input corresponding to a send user interface object)) of the second messaging user interface (e.g., 652, 658, and/or 660) of the second messaging application.

Displaying the second link in the second composition of the region of the second messaging user interface in response to selection of the real-time communication user interface object enables a user to send a link to a real-time communication session from the second messaging application without navigating to the real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after receiving the fifth user input (e.g., 650*q*) corresponding to selection of the selectable user interface object (e.g., 654, 658, and/or 660) (in some embodiments, in response to detecting user input corresponding to selection of a send user interface object of the messaging user interface), the computer system (e.g., 600) displays (756), via the display generation component (e.g., 602) (e.g., in response to a request to display a list of recent and upcoming real-time communication sessions), a fourth user interface (e.g., 604) of the real-time communication application (e.g., a home user interface and/or a default user interface of the real-time communication application that is displayed when the real-time communication application is launched), wherein the fourth user interface (e.g., 604) of the real-time communication application includes a third user interface object (e.g., 606*h*) corresponding to the second link (e.g., 656*a* and/or 910*a*) to the second real-time communication session (e.g., an affordance that includes one or more visual indications (e.g., textual indications and/or images corresponding to invitees, participants, and/or users of the second-real time communication and/or corresponding to a scheduled time of the second real-time communication session) of the second link to the second real-time communication session).

Displaying the fourth user interface of the real-time communication application including the third user interface object enables a user to quickly initiate the real-time communication session, thereby reducing the number of inputs needed for the user to participate in the real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second link (e.g., 656*a* and/or 910*a*) to the second real-time communication session corresponds to a previously scheduled real-time communication session (e.g., 660) that was scheduled prior to receiving the one or more user inputs corresponding to the content of the message configured to be sent via the second messaging application (e.g., the second link to the second real-time communication session is for a previously scheduled real-time communication session that is scheduled for a time that occurs at the current time or after the current time; the second link to the second-real time communication session was generated and/or shared to another user before receiving the one or more user inputs corresponding to the content of the message configured to be sent via the second messaging application).

Displaying the first user interface object corresponding to a previously scheduled real-time communication session enables a user to send an existing link to the previously scheduled real-time communication session from the second messaging application without navigating to the real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the one or more user inputs corresponding to content of the message configured to be sent via the messaging application to one or more participants in a message conversation, the computer system (e.g., 600) displays (758), via the display generation component (e.g., 602): the selectable user interface object (e.g., 660) (760) that, when selected via user input, is configured to initiate a process for sending the second link (e.g., 656*a* and/or 910*a*) to the second real-time communication session, and a second selectable user interface object (e.g., 658) (762) (e.g., a selectable user interface element different from the first real-time communication user interface object; an image, object, and/or data corresponding a link to the real-time communication session to include in a message configured to be sent via the messaging application of the computer system) that, when selected via user input, is configured to generate a third link to a third real-time communication session (e.g., display the third link and/or an object associated with the third link in the composition region of the messaging user interface, such that the third link can be sent in a message via the messaging user interface of the computer system (e.g., in response to user input sending the message)). The third link to the third real-time communication session corresponds a new real-time communication that does not correspond to a previously scheduled real-time communication session (e.g., the third link to the third real-time communication session was not previously generated; the third real-time communication session was not previously scheduled; and/or the third link to the third real-time communication session corresponds to a newly generated and scheduled real-time communication session).

Displaying the first real-time communication user interface object corresponding to a previously scheduled real-time communication session and the second real-time communication user interface object corresponding to a new real-time communication session enables a user to choose whether to send an existing link to the previously scheduled real-time communication session or to send a new link to the new real-time communication session from the messaging application without navigating to the real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays (764), via the display generation component (e.g., 602), a calendar user interface (e.g., 662) (e.g., a user interface that enables a user to schedule an appointment, a meeting, and/or an event) of a calendar application that includes a scheduling user interface object (e.g., 662*b*) (e.g., a button and/or affordance that, when selected via a user input, causes the computer system to initiate a process for creating and/or scheduling an appointment, a meeting, and/or an event). The computer system (e.g., 600) receives (766), via the one or more input devices (e.g., 602), a sixth user input (e.g., 650*r*) (e.g., a tap gesture, such as a single tap gesture) corresponding to selection of the scheduling user interface object (e.g., 662*b*). In response to receiving the sixth user input (e.g., 650*r*) (768), the computer system (e.g., 600) displays (770), via the display generation component, an event scheduling user interface (e.g., 664)(e.g., a user interface that enables a user to input and/or specify details related to a new appointment, meeting, and/or event) that includes a video conferencing user interface object (e.g., 664*b*) that, when selected via user input, displays a video conferencing user interface (e.g., 666) (e.g., a user interface that enables a user to select a video conferencing application and/or specify settings and/or details of a video conference that is associated with the new appointment, meeting, and/or event).

Displaying the event scheduling user interface that includes the video conferencing user interface object enables a user to schedule a real-time communication session via the calendar application without having to navigate to the real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component (e.g., 602), the event scheduling user interface (e.g., 664), the computer system (e.g., 600) receives (772), via the one or more input devices, a seventh user input (e.g., 650*s*) (e.g., a tap gesture, such as a single tap gesture) corresponding to selection of the video conferencing user interface object (e.g., 664*b*). In response to receiving the seventh user input (e.g., 650*s*) (774), the computer system (e.g., 600) displays (776), via the display generation component, the video conferencing user interface (e.g., 666) (e.g., a user interface that enables a user to select a video conferencing application and/or specify settings and/or details of a video conference that is associated with the new appointment, meeting, and/or event) that includes a plurality of video conferencing selectable options (e.g., 666*b*-666*e*) that correspond to respective applications for participating in the real-time communication session (e.g., buttons and/or affordances corresponding to different applications and/or software that are each configured to enable a user associated with the computer system to participate in a video conference (e.g., a real-time communication session)).

Displaying the video conferencing user interface including the plurality of video conferencing selectable options enables a user to schedule a real-time communication session via a preferred real-time communication application without having to navigate to the preferred real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of video conferencing selectable options (e.g., 666*b*-666*e*) includes a first video conferencing selectable option (e.g., 666*d*) corresponding to a first application of the computer system that satisfies one or more criteria (e.g., the one or more criteria are satisfied when an application and/or software is installed, downloaded, and/or otherwise linked to the computer system (e.g., the computer system has signed into an account of the application and/or software) and/or when the application and/or software is configured to enable a user of the computer system to participate in a video conference (e.g., a real-time communication session)) and a second video conferencing selectable option (666*b*) corresponding to a second application of the computer system that satisfies the one or more criteria (e.g., the second application of the computer system is different from the first application of the computer system; the one or more criteria are satisfied when an application and/or software is installed, downloaded, and/or otherwise linked to the computer system (e.g., the computer system has signed into an account of the application and/or software) and/or when the application and/or software is configured to enable a user of the computer system to participate in a video conference (e.g., a real-time communication session)).

Displaying the plurality of video conferencing selectable options that correspond to applications of the computer system and that satisfy the one or more criteria enables a user to schedule a real-time communication session via an application that is already downloaded and/or installed on the computer system, such that the user does not need to provide additional user inputs to install and/or download a new application and/or software on the computer system. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component (e.g., 602), the video conferencing user interface (e.g., 666), the computer system (e.g., 600) receives (778), via the one or more input devices (e.g., 602), eighth user input (e.g., 650*t*) (e.g., a tap gesture, such as a single tap gesture) corresponding to selection of the first video conferencing selectable option (e.g., 666*d*) of the plurality of selectable video conferencing options (e.g., 666*b*-666*e*). In response to receiving the eighth user input (e.g., 650*t*) (780), the computer system (e.g., 600) displays (782), via the display generation component (e.g., 602), a plurality of selectable settings options (e.g., 668*a*-668*c*) (e.g., affordances and/or buttons that enable a user to select, specify, and/or input various settings, options, and/or features of the real-time communication session to be performed via the first application of the computer system), wherein the plurality of selectable settings options (e.g., 668*a*-668*c*) correspond to available settings of the first application of the computer system (e.g., 600) (e.g., the plurality of settings options are specific to and/or generated by the first application of the computer system, such as an option for a one-time room for the real-time communication session, an option for a personal room associated with an account of the user of the computer system for the real-time communication session, and/or a password option that enables a user to limit access to the real-time communication session to users that enter a predefined password when joining and/or prior to joining the real-time communication session).

Displaying the video conferencing settings user interface including the plurality of settings selectable options enables a user to specify and/or select settings for the real-time communication session without having to navigate to a real-time communication application, thereby reducing a number of inputs required by the user to schedule and/or create a real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIGS. 7A-7H) are also applicable in an analogous manner to the methods described below. For example, methods 800 and 1000 optionally includes one or more of the characteristics of the various methods described above with reference to method 700. For example, the computer system of method 700 can be used for inviting a participant to a real-time communication session and joining the real-time communication session and/or for allowing a participant to join a real-time communication session. For brevity, these details are not repeated below.

FIGS. 8A-8G are a flow diagram illustrating a method for inviting a participant to a real-time communication session and joining the real-time communication session using an electronic device in accordance with some embodiments. Method 800 is performed at a computer system (e.g., 100, 300, 500, 600, 900, 902, 904, and/or 906) (e.g., an electronic device; a smart device, such as a smartphone or a smartwatch; a mobile device; a wearable device) that is in communication with a display generation component (e.g., 602) and one or more input devices (e.g., 602). Some operations in method 800 are, optionally, combined, the orders of some operations are, optionally, changed, and some operations are, optionally, omitted.

As described below, method 800 provides an intuitive way for inviting a participant to a real-time communication session and joining the real-time communication session. The method reduces the cognitive burden on a user for inviting participants to a real-time communication session and/or joining a real-time communication session, thereby creating a more efficient human-machine interface. For battery-operated computing devices, enabling a user to invite participants to a real-time communications session and/or join a real-time communication session faster and more efficiently conserves power and increases the time between battery charges.

The computer system (e.g., 600) detects (802), via the one or more input devices (e.g., 602), one or more first user inputs (e.g., 650*c*, 650*d*, 650*e*, and/or 650*f*) (e.g., a tap gesture on a user interface object associated with a suggested user and/or one or more inputs on a keyboard displayed via the display generation component associated with a name and/or phone number of a user) corresponding to selection of a user (e.g., a user interface object (e.g., displayed in response to the one or more first user inputs and/or displayed as a suggested user) that corresponds to a contact stored in memory of the computer system and/or a phone number for an external computer system associated with a user) to invite to a real-time communication session (e.g., a voice and/or video conference between at least a user associated with the computer system and the user associated with the external computer systems).

After (e.g., in response to) detecting the one or more first user inputs (e.g., 650c, 650d, 650e, and/or 650f) (e.g., while the user types and/or in response to selecting the user interface object associated with a contact and/or user), the computer system (e.g., 600) concurrently displays (804), via the display generation component (e.g., 602): a selectable user interface element (e.g., 612j, 612k, and/or 612l) (806) (e.g., an affordance and/or a button prompting a user to continue setting up the real-time communication session after selecting one or more users associated with respective external computer systems and/or an affordance and/or a button that, when selected, sends a message and/or data that includes a link associated with the real-time communication session) corresponding to a link (e.g., 624a, 634b, and/or 910a) to the real-time communication session (e.g., a link that, in response to user input corresponding to selection of the link, launches the real-time communication application and/or a different application (e.g., an application associated with a web browser) that enables the user associated with the external computer system to participate in the real-time communication session with the user associated with the computer system) and visual indication (e.g., 612g and/or 612i) (808) of the user.

While concurrently displaying the selectable user interface element (e.g., 612j, 612k, and/or 612l) and the visual indication of the user (e.g., 612g and/or 612i), the computer system (e.g., 600) detects (810), via the one or more input devices (e.g., 602), a second user input (e.g., 650g, 650i, and/or 650j) (e.g., a tap gesture) corresponding to selection of the selectable user interface element (e.g., 612j, 612k, and/or 612l).

In response (812) to detecting the second user input (e.g., 650g, 650i, and/or 650j), the computer system (e.g., 600) initiates (814) a process to send the link (e.g., 624a, 634b, and/or 910a) to the user (e.g., displaying a share user interface (e.g., a messaging user interface, a communication application user interface, and/or an email user interface) that enables the user associated with the computer system to send the link to the user associated with the external computer system and/or additional users associated with respective external computer systems) and displays (816) a user interface (e.g., 636 and/or 916a) for participating in the real-time communication session with the user (e.g., automatically starting the real-time communication session after sending the link by transitioning from the share user interface to a real-time communication user interface). In some embodiments, initiating the real-time communication session is performed in response to receiving the second user input. In some embodiments, initiating the real-time communication session displays a real-time communication user interface that includes a placeholder user interface object that corresponds to the user associated with the external computer system. In response to the user associated with the external computer system activating (e.g., via user input detected by the external computer system) the link to the real-time communication session, the placeholder user interface object is replaced with an image and/or representation of the user associated with the external computer system (e.g., received from a camera of the external computer system).

Displaying the user interface for participating in the real-time communication session with the user in response to detecting the second user input initiates the real-time communication session when the link is sent to the user and without requiring a user associated with the computer system to navigate to another user interface and/or provide additional inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to concurrently displaying the selectable user interface element (e.g., 612j, 612k, and/or 612l) and the visual indication of the user (e.g., 612g and/or 612i) (e.g., while detecting the one or more inputs corresponding to selection of the user to invite to the real-time communication session), the computer system (e.g., 600) displays (818), via the display generation component (e.g., 602), a user selection user interface (e.g., 612) (e.g., a user interface that is displayed while detecting the one or more inputs corresponding to selection of the user to invite to the real-time communication session; a user interface that enables a user to select and/or input the user and/or additional users for inviting to the real-time communication session). In accordance with a determination that no user that is selected as an invitee to the real-time communication session satisfies a first set of criteria (e.g., the first set of criteria includes one or more requirements that an identifier, such as a user name, email address, phone number, and/or other identifier, associated with a respective user (e.g., any user that is selected as an invitee to the real-time communication session) is not associated with a real-time communication application configured to initiate the real-time communication session and/or an external computer system associated with the respective user (e.g., any user that is selected as an invitee to the real-time communication session) does not include a particular application (e.g., a particular real-time video communication application)), the user selection user interface (e.g., 612) includes an initiation user interface object (e.g., 612d) (820) (e.g., a button and/or an affordance that optionally includes an indication, such as a visual indication, that the initiation user interface object causes initiation of the real-time communication session in response to user selection) that, when selected via user input, is configured to initiate the real-time communication session (e.g., without sending a link via a separate message) (e.g., and any additional users selected/invited to the real-time communication session) (e.g., the initiation user interface object is displayed when all users selected as invitees to the real-time communication session are associated with a respective external computer system that includes a particular real-time communication application (e.g., installed on the respective external computer system and/or the respective external computer system is logged into and/or otherwise associated with an account of the particular real-time communication application)). In some embodiments, in response to detecting user input corresponding to the initiation user interface object, the computer system calls a recipient device of the user (e.g., causes the recipient device to ring for a predetermined period of time) without sending the recipient device of the user an asynchronous message with a link to the real-time communication session. In accordance with a determination that at least one user that is selected as an invitee to the real-time communication session satisfies the first set of criteria (e.g., at least one user that is selected as an invitee to the real-time communication session is not associated with an external computer system that includes the particular real-time communication application) (e.g., an identifier, such as a user name email address, phone number, and/or other identifier, associated with at least one user is not associated with a real-time communication application configured to initiate the real-time communication session and/or an external computer system associated with at least one user does not includes a particular application (e.g., a particular real-time video communication application)), the user selection user interface (e.g., 612) includes a link sharing user interface object (e.g., 612*j*, 612*k*, and/or 612*l*) (822) (e.g., a button and/or an affordance that optionally includes an indication, such as a visual indication, that the link sharing user interface object enables sharing of the link to the real-time communication session in response to user selection) that, when selected via user input, is configured to initiate a process for sharing a link to the real-time communication session with one or more other users (e.g., a user interface that includes the selectable user interface element and the visual indication of the user, such as a messaging user interface of a messaging application) (e.g., the link sharing user interface object is displayed when at least one user selected as invitees to the real-time communication session is associated with a respective external computer system that does not include a particular real-time communication application (e.g., installed on the respective external computer system and/or the respective external computer system is logged into and/or otherwise associated with an account of the particular real-time communication application)).

Displaying the initiation user interface object and/or the link sharing user interface object based on whether users selected as invitees to the real-time communication session satisfy the first set of criteria provides relevant options for inviting users to the real-time communication session based on the selected users, thereby reducing a number of inputs required to send the link to the user. In addition, displaying the initiation user interface object and/or the link sharing user interface object based on whether the users selected as invitees to the real-time communication satisfy the first set of criteria provides improved feedback about the selected users. Reducing the number of inputs needed to perform an operation and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the user selection user interface (e.g., 612) that includes the initiation user interface object (e.g., 612*d*) (e.g., the user and any other user selected as an invitee to the real-time communication session satisfies the set of criteria), the computer system (e.g., 600) detects (824) one or more third user inputs (e.g., 650*e* and/or 650*f*) (e.g., one or more tap gestures) corresponding to selection of a second user (e.g., a second user different from the user) to invite to the real-time communication session, wherein the second user satisfies the first set of criteria (e.g., an identifier, such as a user name email address, phone number, and/or other identifier, associated with the second user is not associated with a real-time communication application configured to initiate the real-time communication session and/or an external computer system associated with the second user does not includes a particular application (e.g., a particular real-time video communication application)). In response to detecting the one or more third user inputs (e.g., 650*e* and/or 650*f*), the computer system (e.g., 600) ceases to display (826) the initiation user interface object (e.g., 612*d*) and displays the link sharing user interface object (e.g., 612*j*, 612*k*, and/or 612*l*) (e.g., replacing display of the initiation user interface object with the link sharing user interface object). In some embodiments, the computer system replaces display of the initiation user interface object with the link sharing user interface object when any user that is selected as an invitee to the real-time communication session satisfies the first set of criteria (e.g., any user selected as an invitee to the real-time communication session is associated with an external computer system that does not include the particular real-time communication application). The computer system displays the initiation user interface object when the user and all other users invited to the real-time communication session do not satisfy the first set of criteria.

Replacing display of the initiation user interface object with the link sharing user interface object when the second user satisfies the first set of criteria provides a relevant option for inviting users to the real-time communication session based on the first and second users, thereby reducing a number of inputs required to send the link to the first and second users. In addition, replacing the initiation user interface object with the link sharing user interface object provides improved feedback about the selected second user. Reducing the number of inputs needed to perform an operation and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user selection user interface (e.g., 612) that includes the initiation user interface object (e.g., 612*d*) (e.g., the user and any other user selected as an invitee to the real-time communication session) includes a second visual indication (e.g., 612*g*) of the user with a first visual characteristic (e.g., an indication of an identifier, such as a name, user name, email address, phone number, and/or other identifier, of the user having a first font and/or text color, such as blue). In some embodiments, in response to detecting the one or more third user inputs (e.g., 650*e* and/or 650*f*) corresponding to selection of the second user (828): the computer system (e.g., 600) displays (830) the second visual indication (e.g., 612*g*) of the user with a second visual characteristic (e.g., an indication of an identifier, such as a name, user name, email address, phone number, and/or other identifier, of the user having a second font and/or text color, such as green), different from the first visual characteristic; and the computer system (e.g., 600) displays (832), concurrently with the second visual indication (e.g., 612*g*) of the user, a third visual indication (e.g., 612*i*) of the second user with the second visual characteristic (e.g., an indication of an identifier, such as a name, user name, email address, phone number, and/or other identifier, of the second user having the second font and/or text color, such as green).

Changing a visual characteristic of the second visual indication of the user from the first visual characteristic to the second visual characteristic when the second user satisfies the first set of criteria provides improved feedback about the selected second user, as well as about the communication protocol for communicating with both the first user and the second user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to concurrently displaying the selectable user interface element (e.g., 612*j*, 612*k*, and/or 612*l*) and the visual indication of the user (e.g., 612*g* and/or 612*i*), the computer system (e.g., 600) displays (834), via the display generation component (e.g., 602), a second user selection user interface (e.g., 612) (e.g., a user interface that includes one or more user interface objects corresponding to contacts and/or users that are available for selection to invite to the real-time communication session, a keyboard (e.g., a virtual keyboard) for searching for a contact and/or user to invite to the real-time communication session, and/or an invitee list visually indicating the user and/or other users that have been selected as invitees to the real-time communication session) that concurrently displays: a messaging user interface object (e.g., 612*k* and/or 612*l*) (836) (e.g., a first user interface object corresponding to sharing the link to the real-time communication session in an electronic message (e.g., a short message service message) via a messaging application of the computer system) that, when selected via user input, causes display of a messaging user interface (e.g., 622 and/or 908) (e.g., a user interface including a messages region having one or more visual indications of sent and/or received messages, a keyboard (e.g., a virtual keyboard) for selecting content of a message, a composition area for drafting content of the message, and/or an indication of one or more recipients of the message) of a messaging application (e.g., an application and/or software of the computer system that enables electronic messages (e.g., short message service messages) to one or more recipients (e.g., recipients identified via a name, phone number, user name, email address, and/or another suitable identifier)) for sharing the link (e.g., 624*a*, 634*b*, and/or 910*a*) to the real-time communication session (e.g., the computer system is configured to send an electronic message (e.g., a short message service message) having the link to the real-time communication session over a network (e.g., the Internet, a cellular network, and/or a personal network)); and a sharing user interface object (e.g., 612*j*) (838) (e.g., a second user interface object corresponding to sharing the link to the real-time communication session via one or more communication protocols) that, when selected via user input, causes display of a sharing user interface (e.g., 626 and/or 632) that includes a plurality of selectable options (e.g., 628*a*, 628*b*, 628*c*, 630, 632*a*, 632*b*, 632*c*, 632*d*, 632*e*, and/or 632*f*) for sharing the link (e.g., 624*a*, 634*b*, and/or 910*a*) to the real-time communication session via different communication protocols (e.g., affordances and/or buttons corresponding to different sharing options, techniques, and/or applications for sharing the link).

Concurrently displaying the messaging user interface object and the sharing user interface object enables a user to select a preferred communication protocol without having to navigate to another application associated with the preferred communication protocol, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the sharing user interface includes (e.g., 626 and/or 632): a sharing option (e.g., 628*a*) that is selectable to share the link (e.g., 624*a*, 634*a*, and/or 910*a*) to the real-time communication session via one or more communication protocols (e.g., short message service, electronic mail, a short range communication, a direct wireless communication technique, a file sharing service, and/or a social media application); a copy option (e.g., 628*b*) that is selectable to copy (e.g., storing (e.g., temporarily) data associated with the link to the real-time communication session that can be reproduced (e.g., pasted) in response to detecting a user input) the link (e.g., 624*a* and/or 634*b*) to the real-time communication session; and a messaging option (e.g., 628*c*) that is selectable to share the link (e.g., 624*a* and/or 634*b*) to the real-time communication session via the messaging application (e.g., a selectable option that, when selected via user input, causes the computer system to display a messaging user interface of a messaging application that is configured to send an electronic message having the link to the real-time communication session).

Including the sharing option, the copy option, and the messaging option on the sharing user interface enables a user to select a preferred sharing option without having to navigate to another application associated with the preferred communication protocol, thereby reducing the number of inputs needed for the user to share the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects (840) a fourth user input (e.g., 650*j*) (e.g., a tap gesture, such as a single tap gesture) corresponding to selection of the sharing option (e.g., 612*k*). In response to detecting the fourth user input (e.g., 650*j*), the computer system (e.g., 600) displays (842), via the display generation component (e.g., 602), a second sharing user interface (e.g., 626) (e.g., a sharing user interface including a plurality of selectable options for sharing the link to the real-time communication session via one or more communication protocols (e.g., affordances and/or buttons corresponding to different sharing options, techniques, and/or applications for sharing the link)) that concurrently displays: a first selectable option (e.g., 628*a*-628*c*) (844) for sharing the link to the real-time communication session with users that meet a second set of criteria (e.g., an identifier, such as a user name email address, phone number, and/or other identifier, associated with each user is not associated with a real-time communication application configured to initiate the real-time communication session and/or an external computer system associated with each user does not include a particular application (e.g., a particular real-time video communication application)); and a second selectable option (e.g., 630) (846) for sharing the link to the real-time communication session with users that do not meet the second set of criteria (e.g., the first set of criteria; an identifier, such as a user name email address, phone number, and/or other identifier, associated with each user is associated with a real-time communication application configured to initiate the real-time communication session and/or an external computer system associated with each user includes a particular application (e.g., a particular real-time video communication application)).

Concurrently displaying the first selectable option and the second selectable option for sharing the link with different types of users enables a user to share the link via two communication protocols at the same time, thereby reducing a number of inputs required to send the link to the user. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects (848) a fifth user input (e.g., 650k) (e.g., a tap gesture, such as a single tap gesture) corresponding to selection of the first selectable option (e.g., 628a) for sharing the link to the real-time communication session with users that meet the second set of criteria. In response to detecting the fifth user input (e.g., 650k), the computer system (e.g., 600) displays (850), via the display generation component, a third sharing user interface (e.g., 632) (e.g., a sharing user interface including a plurality of selectable options for sharing the link to the real-time communication session via one or more communication protocols (e.g., affordances and/or buttons corresponding to different sharing options, techniques, and/or applications for sharing the link)), wherein displaying the third sharing user interface (e.g., 632) includes concurrently displaying: a third selectable option (e.g., 632a-632f) (852) for sharing the link to the real-time communication session via a first communication protocol (e.g., short message service, electronic mail, a short range communication, a direct wireless communication technique, a file sharing service, and/or a social media application); and a fourth selectable option (e.g., 632a-632f) (854) for sharing the link to the real-time communication session via a second communication protocol (e.g., short message service, electronic mail, a short range communication, a direct wireless communication technique, a file sharing service, and/or a social media application), different from the first communication protocol.

Including the third selectable option for sharing the link to the real-time communication session via a first communication protocol and the fourth selectable option for sharing the link to the real-time communication session via the second communication protocol that is different from the first communication protocol provides a user with multiple options for sharing the link to the real-time communication session and reduces the number of inputs required by the user for sharing the link. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to concurrently displaying the selectable user interface element (e.g., 612j, 612k, and/or 612l) and the visual indication of the user (e.g., 612g and/or 612i), the computer system (e.g., 600) displays (856), via the display generation component (e.g., 602), a list of users (e.g., 618 and/or 620) (e.g., a list of users displayed in response to an input of the one or more first user inputs, a list of suggested users displayed in response to an input of the one or more first user inputs, and/or a list of users associated with an input (e.g., users matching text and/or characters of the input) of the one or more first user inputs). In accordance with a determination that the user to invite to the real-time communication session satisfies a third set of criteria (e.g., the first set of criteria and/or the second set of criteria; an identifier, such as a user name email address, phone number, and/or other identifier, associated with the user is associated with a real-time communication application configured to initiate the real-time communication session and/or an external computer system associated with the user includes a particular application (e.g., a particular real-time video communication application)), the list of users includes a fourth visual indication of the user (e.g., 618a) (858) having a third visual characteristic (e.g., an indication of an identifier, such as a name, user name, email address, phone number, and/or other identifier, of the user having a first font and/or text color, such as blue; an indication of an identifier, such as a name, user name, email address, phone number, and/or other identifier, of the user is displayed in a first region or a first position). In accordance with a determination that the user to invite to the real-time communication session does not satisfy the third set of criteria (e.g., an identifier, such as a user name email address, phone number, and/or other identifier, associated with the user is not associated with a real-time communication application configured to initiate the real-time communication session and/or an external computer system associated with the user does not include a particular application (e.g., a particular real-time video communication application)), the list of users includes the fourth visual indication of the user (e.g., 620c) (860) having a fourth visual characteristic (e.g., an indication of an identifier, such as a name, user name, email address, phone number, and/or other identifier, of the user having a second font and/or text color, such as green; an indication of an identifier, such as a name, user name, email address, phone number, and/or other identifier, of the user is displayed in a second region or a second position that is after the first region or the first position, respectively), different from the third visual characteristic.

Displaying an appearance of the fourth visual indication having a third visual characteristic and/or a fourth visual characteristic based on a determination that the user satisfies the third set of criteria provides improved feedback about the selected user, as well as about the communication protocol for communicating with the selected user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to concurrently displaying the selectable user interface element (e.g., 612j, 612k, and/or 612l) and the visual indication of the user (e.g., 612g and/or 612i), the computer system (e.g., 600) displays (862), via the display generation component (e.g., 602), a second list of users (e.g., 618 and/or 620) (e.g., a list of users displayed in response to an input of the one or more first user inputs, a list of suggested users displayed in response to an input of the one or more first user inputs, and/or a list of users associated with an input (e.g., users matching text and/or characters of the input) of the one or more first user inputs). In accordance with a determination that the user to invite to the real-time communication session satisfies a fourth set of criteria (e.g., an identifier, such as a user name email address, phone number, and/or other identifier, associated with the user is associated with a particular messaging application and/or an external computer system associated with the user includes a particular application (e.g., a particular messaging application)), the second list of users includes a fifth visual indication of the user (e.g., 618*a*) (864) having a fifth visual characteristic (e.g., an indication of an identifier, such as a name, user name, email address, phone number, and/or other identifier, of the user having a first font and/or text color, such as blue; an indication of an identifier, such as a name, user name, email address, phone number, and/or other identifier, of the user is displayed in a first region or a first position). In accordance with a determination that the user to invite to the real-time communication session does not satisfy the fourth set of criteria (e.g., an identifier, such as a user name email address, phone number, and/or other identifier, associated with the user is not associated with a particular messaging application and/or an external computer system associated with the user does not include a particular application (e.g., a particular messaging application)), the second list of users includes the fifth visual indication of the user (e.g., 620*c*) (866) having a sixth visual characteristic (e.g., an indication of an identifier, such as a name, user name, email address, phone number, and/or other identifier, of the user having a second font and/or text color, such as green; an indication of an identifier, such as a name, user name, email address, phone number, and/or other identifier, of the user is displayed in a second region or a second position that is after the first region or the first position, respectively), different from the fifth visual characteristic.

Displaying an appearance of the fifth visual indication having a fifth visual characteristic and/or a sixth visual characteristic based on a determination that the user satisfies the fourth set of criteria provides improved feedback about the selected user, as well as about the communication protocol for communicating with the selected user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to concurrently displaying the selectable user interface element (e.g., 612*j*, 612*k*, and/or 612*l*) and the visual indication of the user (e.g., 612*g* and/or 612*i*), the computer system (e.g., 600) displays (868), via the display generation component, a third list of users (e.g., 618 and/or 620) (e.g., a list of users displayed in response to an input of the one or more first user inputs, a list of suggested users displayed in response to an input of the one or more first user inputs, and/or a list of users associated with an input (e.g., users matching text and/or characters of the input) of the one or more first user inputs), wherein displaying the third list of users (e.g., 618 and/or 620) includes concurrently displaying: a representation of a third user (e.g., 618*a*) (870) in a first region of the third list of users, wherein the first region of the third list of users corresponds to users who are contactable via a first communication protocol (e.g., the third user includes an identifier (e.g., a phone number, an email address, and/or a user name) associated with a first communication protocol (e.g., a preferred communication protocol)); and a representation of a fourth user (e.g., 618*e*) (872) in a second region of the third list of users, wherein the second region of the third list of users corresponds to users who are not contactable via the first communication protocol but are contactable via a second communication protocol, different from the first communication protocol (e.g., the fourth user includes an identifier associated with a second communication protocol (e.g., a less preferred communication protocol) different from the first communication protocol; users having identifiers associated with a preferred communication protocol are arranged first in the third list of users regardless of whether identifiers associated with the users more closely match a search input).

Arranging the third list of users based on a communication protocol associated with a respective user enables a user to quickly and efficiently identify a relevant user, thereby reducing the number of inputs required to invite the relevant user. In addition, arranging the third list of users based on a communication protocol associated with a respective user provides improved feedback about the respective user, as well as about the communication protocol for communicating with the respective user. Reducing the number of inputs needed to perform an operation and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the user interface (e.g., 636 and/or 916*a*) for participating in the real-time communication session with the user, the computer system (e.g., 600) detects (874) that the user has not joined the real-time communication session (e.g., receiving data from an external computer system associated with the user and/or receiving data from an external computer system, such as a server, where the data indicates that the user has not initiated the real-time communication session and/or that the user is not actively participating in the real-time communication session). In response to detecting that the user has not joined the real-time communication session (876): in accordance with a determination that the user satisfies a fifth set of criteria (e.g., the first set of criteria, the second set of criteria, and/or the third set of criteria; an identifier, such as a user name email address, phone number, and/or other identifier, associated with the user is associated with a real-time communication application configured to initiate the real-time communication session and/or an external computer system associated with the user includes a particular application (e.g., a particular real-time video communication application)), the computer system (e.g., 600) displays (878), via the display generation component, a first status indicator (e.g., 638*d* and/or 922) (e.g., a status indicator that is also a user-selectable user interactive graphical user interface object for initiating communication with the user) for the user on the user interface (e.g., 636 and/or 916*a*) for participating in the real-time communication session with the user; and in accordance with a determination that the user does not satisfy the fifth set of criteria (e.g., an identifier, such as a user name email address, phone number, and/or other identifier, associated with the user is not associated with a real-time communication application configured to initiate the real-time communication session and/or an external computer system associated with the user does not include a particular application (e.g., a particular real-time video communication application)), the computer system (e.g., 600) displays (880), via the display generation component, a second status indicator (e.g., 640*d* and/or 924) (e.g., a textual and/or visual indicator that the user has been invited to the real-time communication session, but that the user has not initiated the real-time communication session and/or that the user is not actively participating in the real-time communication session), different from the first status indicator, for the user on the user interface (e.g., 636 and/or 916*a*) for participating in the real-time communication session with the user.

Displaying the first status indicator and/or the second status indicator based on whether the user satisfies the fifth set of criteria provides improved visual feedback that the user has not joined the real-time communication session and whether communication can be initiated with the user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first status indicator (e.g., 638*d* and/or 922) indicates that a real-time communication alert can be delivered via an external computer system associated with the user corresponding to the first status indicator (e.g., 638*d* and/or 922) (e.g., establish a connection between the computer system and the external computer system over a network and/or transmit data to the external computer system that causes the external computer system to ring and/or display a notification related to the real-time communication session). In some embodiments, the second status indicator (e.g., 640*d* and/or 924) includes a visual indication that an asynchronous communication alert has been delivered to the external computer system associated with the user corresponding to the second status indicator (e.g., 640*d* and/or 924) without indicating that a real-time communication alert can be delivered via an external computer system associated with the user corresponding to the second status indicator (e.g., 640*d* and/or 924) (e.g., text and/or an image indicating that the user has been invited to the real-time communication session, but that the user has not joined the real-time communication session; the second status indicator does not enable communication to be initiated with the external computer system associated with the user (e.g., is not selectable)).

Displaying the first status indicator including the contact user interface object enables communication with the user to be initiated without navigating to another application and/or user interface, thereby reducing a number of inputs needed to initiate communication with the user. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, via the display generation component (e.g., 602), the second status indicator (e.g., 640*d* and/or 924), different from the first status indicator (e.g., 638*d* and/or 922), for the user on the user interface (e.g., 636 and/or 916*a*) for participating in the real-time communication session with the user, includes displaying a selectable affordance (e.g., 638*d* and/or 922) that, when selected, causes delivery of a real-time communication alert via an external computer system associated with the user corresponding to the first status indicator (e.g., 638*d* and/or 922) without displaying a selectable affordance that, when selected, causes delivery of a real-time communication alert via an external computer system associated with the user corresponding to the second status indicator (e.g., 640*d* and/or 924) (e.g., when the user does not satisfy the fifth set of criteria, the status for the user does not include the contact user interface object and/or an affordance for initiating communication with the user).

Displaying the first status indicator with the contact user interface object and displaying the second status indicator without the contact user interface object provides improved visual feedback that, when the user satisfies the fifth set of criteria, communication can be initiated with the user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the first status indicator (e.g., 638*d* and/or 922) for the user on the user interface (e.g., 636 and/or 916*a*) for participating in the real-time communication session with the user (e.g., the user satisfies the fifth set of criteria), the computer system (e.g., 600) detects (882) a sixth user input (e.g., a tap gesture, such as a single tap gesture) corresponding to selection of the first status indicator (e.g., 638*d* and/or 922) (e.g., corresponding to the contact user interface object of the first status indicator). In response to detecting the sixth user input corresponding to selection of the first status indicator (e.g., 638*d* and/or 922), the computer system (e.g., 600) causes (884) delivery of a real-time communication alert via an external computer system associated with the user corresponding to the first status indicator (e.g., 638*d* and/or 922) (e.g., establishing a connection between the computer system and the external computer system over a network and/or transmitting data to the external computer system that causes the external computer system to ring and/or display a notification related to the real-time communication session).

Initiating communication with the user in response to detecting the sixth user input enables communication with the user to be initiated without navigating to another application and/or user interface, thereby reducing a number of inputs needed to initiate communication with the user. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface (e.g., 636 and/or 916*a*) for participating in the real-time communication session with the user includes a messaging user interface object (e.g., 638*c*, 640*c*, and/or 920) (e.g., an affordance and/or a button that, when selected via user input, causes the computer system to display a messaging user interface of a messaging application that enables the user to send an electronic message to the user) that, when selected via user input, causes display of a messaging user interface (e.g., 622, 652, and/or 908) of a messaging application for sending a message (e.g., a short messaging service message and/or another asynchronous electronic message) to the user.

Including the messaging user interface object enables a process for sending a message to the user without additional user inputs required to navigate to a messaging application, thereby reducing a number of inputs needed to send a message to the user. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the user interface (e.g., 636 and/or 916a) for participating in the real-time communication session with the user that includes the messaging user interface object (e.g., 638c, 640c, and/or 920), the computer system (e.g., 600) detects (886) that the user has joined the real-time communication session (e.g., receiving data from an external computer system associated with the user and/or receiving data from an external computer system, such as a server, where the data indicates that the user has initiated the real-time communication session and/or that the user is actively participating in the real-time communication session). In response to detecting that the user has joined the real-time communication session, the computer system (e.g., 600) ceases display (888) of the messaging user interface object (e.g., 638c, 640c, and/or 920) (e.g., ceasing to display the messaging user interface object and optionally displaying a real-time image and/or real-time video feed received from (e.g., directly or indirectly) an external device associated with the user).

Ceasing display of the messaging user interface object in response to detecting that the user joined the real-time communication session provides improved feedback that the user joined the real-time communication session, and thus, sending a message to the user would not encourage the user to join the real-time communication session. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to concurrently displaying the selectable user interface element (e.g., 612j, 612k, and/or 612l) and the visual indication of the user (e.g., 612g and/or 612i), the computer system (e.g., 600) displays (890) an invitation user interface (e.g., 612) (e.g., a user interface of a real-time communication application that enables selection of one or more users to invite to a real-time communication session). While displaying the invitation user interface (e.g., 612), the computer system (e.g., 600) displays (892) a list of users (e.g., 618 and/or 620) including the user (e.g., the list of users are displayed in response to displaying the invitation user interface, the list of users are displayed in response to user input corresponding to an identifier of a user and the list of users includes one or more users having respective identifiers that are associated with the user input), wherein the list of users (e.g., 618 and/or 620) includes a plurality of user interface objects (e.g., 618a-618e and/or 620a-620c) (e.g., buttons and/or affordances corresponding to a respective user that includes an identifier that corresponds to, matches, and/or partially matches the user input and/or buttons and/or affordances corresponding to one or more users that have been recently contacted and/or communicated with via the computer system). While displaying the list of users (e.g., 618 and/or 620), the computer system (e.g., 600) detects (894) a seventh user input (e.g., 650d and/or 650f) (e.g., a tap gesture, such as a single tap gesture) corresponding to a respective user interface object (e.g., 618a and/or 620c) associated with the user. In response to detecting the seventh user input (e.g., 650d and/or 650f), the computer system (e.g., 600) displays (896) a visual indication (e.g., 612g and/or 612i) of the user in an invitees region (e.g., 612a) (e.g., a region of the invitation user interface that includes identifiers of one or more users that have been selected as invitees of the real-time communication session) of the invitation user interface (e.g., 612).

Displaying the visual indication of the user in the invitees region of the invitation user interface without requiring that an entire identifier of the user be input, reduces the number of inputs needed to add an invitee to the real-time communication session. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 800 (e.g., FIGS. 8A-8G) are also applicable in an analogous manner to the methods described below/above. For example, methods 700 and 1000 optionally includes one or more of the characteristics of the various methods described above with reference to method 800. For example, the computer system of method 800 can be used for sharing a link to a real-time communication session and/or for allowing a participant to join a real-time communication session. For brevity, these details are not repeated below.

FIGS. 9A-9H illustrate exemplary user interfaces for joining a real-time communication session, in accordance with some embodiments. The user interfaces in these figures are used to illustrate the processes described below, including the processes in FIG. 10.

FIGS. 9A-9H illustrate exemplary user interfaces for joining a real-time communication session from the perspective of different users (e.g., users joining the real-time communication session from different types of devices, from devices having different applications installed, and/or from devices having different operating system software). As set forth below, first electronic device 900 corresponds to a first participant (e.g., "Sam"), such as a host participant, of the real-time communication session. First electronic device 900 includes a particular real-time communication application (e.g., a first real-time communication application and/or RTCApp) that is used to perform (e.g., initiate, conduct, and/or run) the real-time communication session. In addition, first electronic device 900 is a first type of device (e.g., a device having a first operating system software).

Second electronic device 902 corresponds to a second participant (e.g., "Ivy"), such as a first invitee, of the real-time communication session. Second electronic device 902 also includes the particular real-time communication application (e.g., the first real-time communication application and/or RTCApp) that is used to perform the real-time communication session. In addition, second electronic device 902 is the first type of device (e.g., a device having the first operating system software).

Third electronic device 904 corresponds to a third participant (e.g., "Joel"), such as a second invitee, of the real-time communication session. Third electronic device 904 does not include the particular real-time communication application (e.g., third electronic device 904 does not have the first real-time communication application and/or RTCApp installed) that is used to perform the real-time communication session. However, the third participant associated with third electronic device 904 has an account (e.g., log-in credentials, such as a user name, email, and/or password) that is associated with the particular real-time communication application (e.g., an account that is linked to the real-time communication session, an account that provides access to the real-time communication application, and/or an account that verifies an identity of the third participant when third electronic device 904 is used to join the real-time communication session). In addition, third electronic device 904 is a second type of device (e.g., a device that does not have the first operating system software) that is different from the first type of device.

Fourth electronic device 906 corresponds to a fourth participant (e.g., "Lauren"), such as a third invitee, of the real-time communication session. Fourth electronic device 906 does not include the particular real-time communication application (e.g., fourth electronic device 906 does not have the first real-time communication application and/or RTCApp installed) and the fourth participant does not have an account (e.g., credentials for signing into an account) that is associated with the particular real-time communication application. In addition, fourth electronic device 906 is a third type of device (e.g., the second type of device and/or a device that does not include the first operating system software) that is different from the first type of device.

FIGS. 9A-9H illustrate different exemplary user interfaces that first electronic device 900, second electronic device 902, third electronic device 904, and fourth electronic device 906 display when the respective participants attempt to join the real-time communication session. For instance, at FIG. 9A first electronic device 900 displays, via display 900a, a messaging user interface 908 of a messaging application of first electronic device 900. Messaging user interface 908 displays message 910 in messages region 908a indicating that message 910 was sent via first electronic device 900 to recipients indicated by recipient region 908b of messaging user interface 908. Message 910 includes link 910a to a real-time communication session. As set forth above with reference to FIGS. 6A-6V, link 910a can be generated via first electronic device 900 when first electronic device 900 displays user interfaces corresponding to the real-time communication application (e.g., user interfaces 604, 612, 622, 626, 632, and/or 634) and/or user interfaces corresponding to the messaging application (e.g., user interface 652).

Figure 9A:
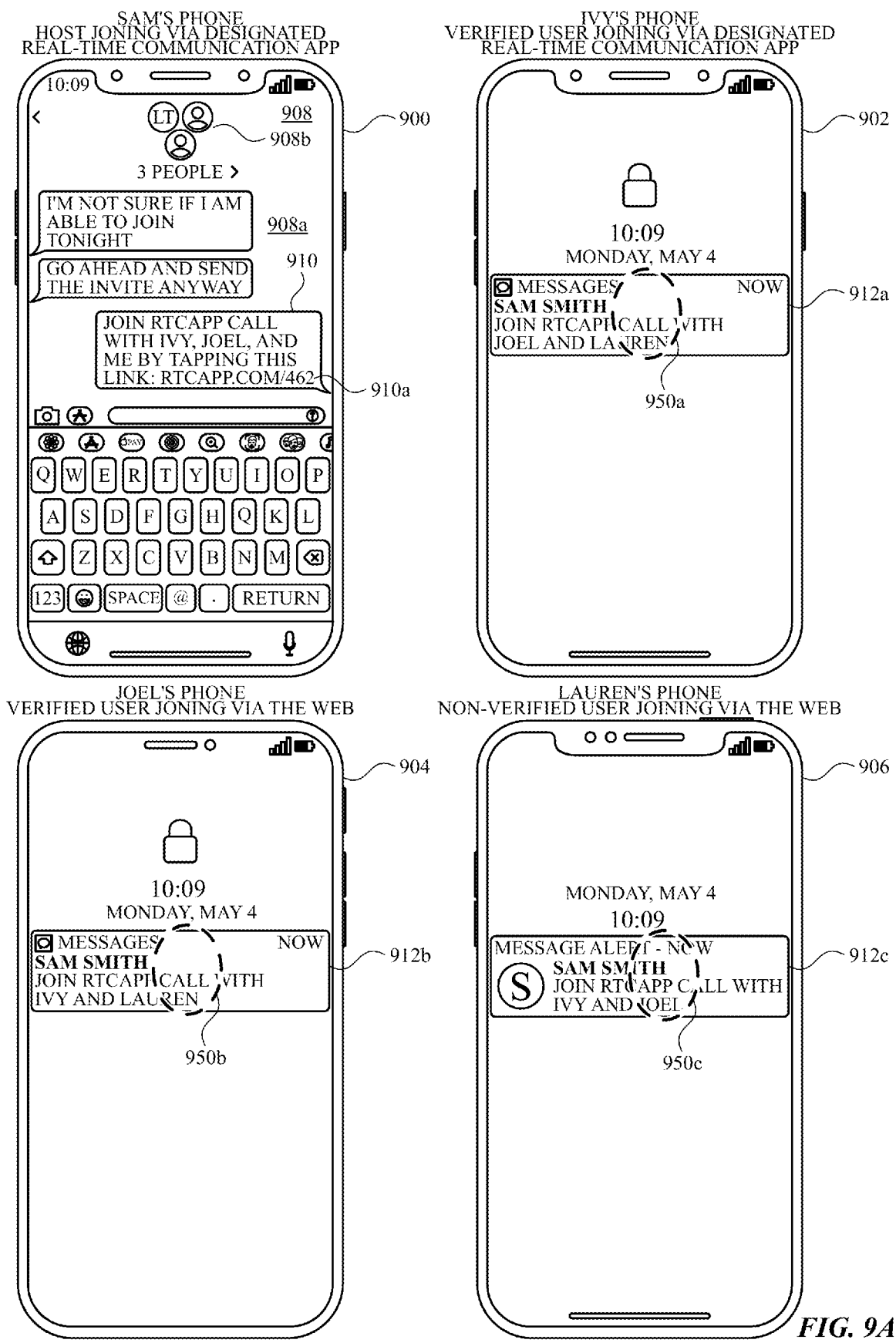
FIGS. 9A-9H illustrate exemplary user interfaces for joining a real-time communication session, in accordance with some embodiments.
Figure 9B:
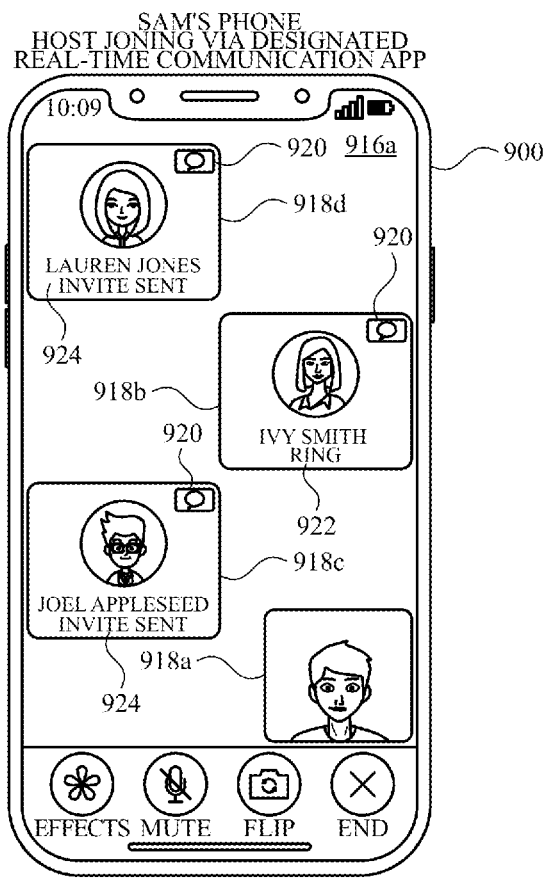
Figure 9B:
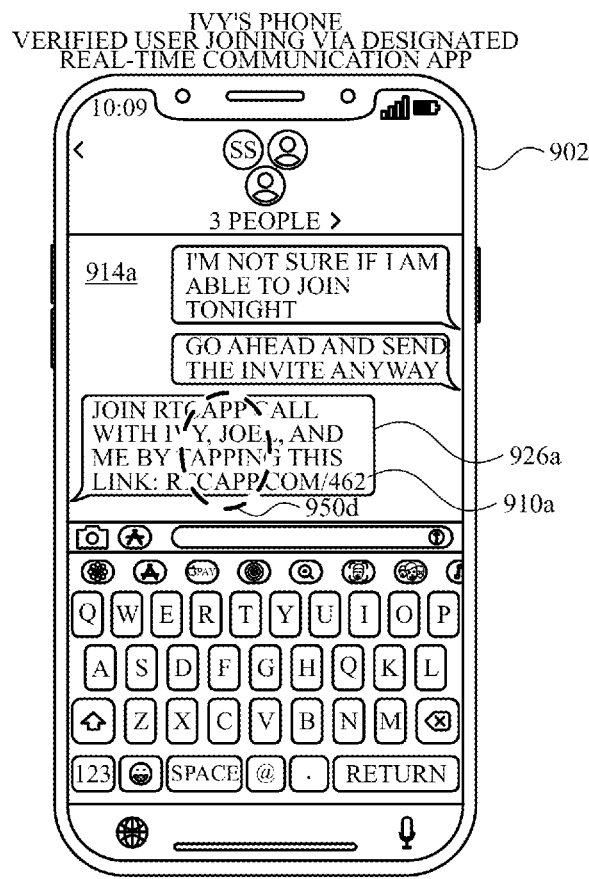
Figure 9B:
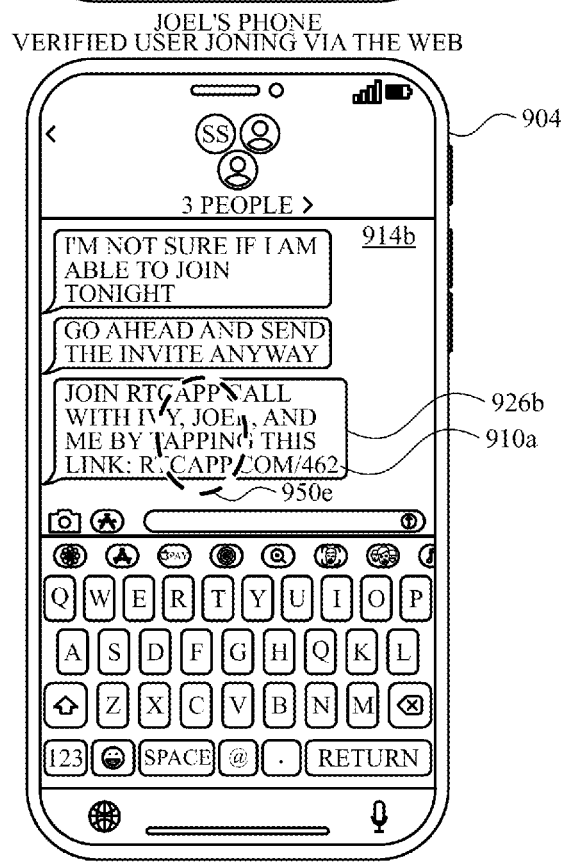
Figure 9B:
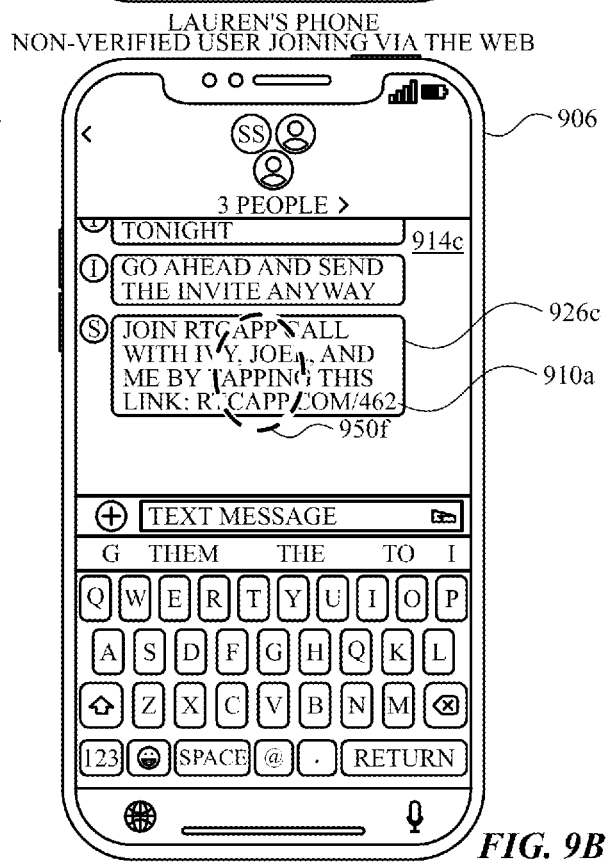

At FIG. 9A, recipients region 908b indicates that first electronic device 900 sent message 910 having link 910a to three recipients (e.g., Ivy, Joel, and Lauren). As such, second electronic device 902 displays notification 912a, third electronic device 904 displays notification 912b, and fourth electronic device 906 displays notification 912c, where notifications 912a-912c correspond to message 910 (e.g., second electronic device 902, third electronic device 904, and fourth electronic device 906 received message 910 from first electronic device 900). At FIG. 9A, second electronic device 902 detects user input 950a corresponding to selection of notification 912a, third electronic device 904 detects user input 950b corresponding to selection of notification 912b, and fourth electronic device 906 detects user input 950c corresponding to selection of notification 912c. In response to detecting user input 950a, second electronic device 902 displays messaging user interface 914a, as shown at FIG. 9B. In response to detecting user input 950b, third electronic device 904 displays messaging user interface 914b, as shown at FIG. 9B. Similarly, in response to detecting user input 950c, fourth electronic device 906 displays messaging user interface 914c, as shown at FIG. 9B.

At FIG. 9B, first electronic device 900 displays real-time communication user interface 916a. Real-time communication user interface 916a includes first participant indicator 918a corresponding to the first participant associated with first electronic device 900 (e.g., a real-time image and/or video feed of the first participant (e.g., "Sam") captured via a camera of first electronic device 900), second participant indicator 918b corresponding to the second participant associated with second electronic device 902, third participant indicator 918c corresponding to the third participant associated with third electronic device 904, and fourth participant indicator 918d corresponding to the fourth participant associated with fourth electronic device 906. At FIG. 9B, second electronic device 902, third electronic device 904, and fourth electronic device 906 do not display real-time communication user interface 916a, indicating that the second participant, the third participant, and the fourth participant have not yet joined the real-time communication session. As such, second participant indicator 918b, third participant indicator 918c, and fourth participant indicator 918d displayed by first electronic device 900 include visual representations of the second participant, the third participant, and the fourth participant, respectively. The visual representations of the second participant, the third participant, and the fourth participant are not real-time images and/or video feeds captured via second electronic device 902, third electronic device 904, and fourth electronic device 906, respectively, because the second participant, the third participant, and the fourth participant have not joined the real-time communication session. As such, the visual representations of second participant indicator 918b, third participant indicator 918c, and fourth participant indicator 918d include avatars, default images, and/or stored images associated with the second participant, the third participant, and the fourth participant, respectively.

As set forth above, second participant indicator 918b, third participant indicator 918c, and fourth participant indicator 918d each include messages user interface object 920 that, when selected via user input, enables first electronic device 900 to send a message to one or more of the second participant (e.g., second electronic device 902), the third participant (e.g., third electronic device 904), and the fourth participant (e.g., fourth electronic device 906). Second participant indicator 918b includes call user interface object 922, whereas third participant indicator 918c and fourth participant indicator 918d include status indicators 924. As set forth above, first electronic device 900 is configured to call and/or initiate communication with second electronic device 902 via the real-time communication application (e.g., RTCApp) in response to detecting user input corresponding to selection of call user interface object 922. Third participant indicator 918c and fourth participant indicator 918d do not include call user interface object 922 because third electronic device 904 and fourth electronic device 906 do not include the particular real-time communication application (e.g., RTCApp), and thus, first electronic device 900 cannot initiate a call and/or communication with third electronic device 904 and fourth electronic device 906 via the particular real-time communication application.

Figure 9C:
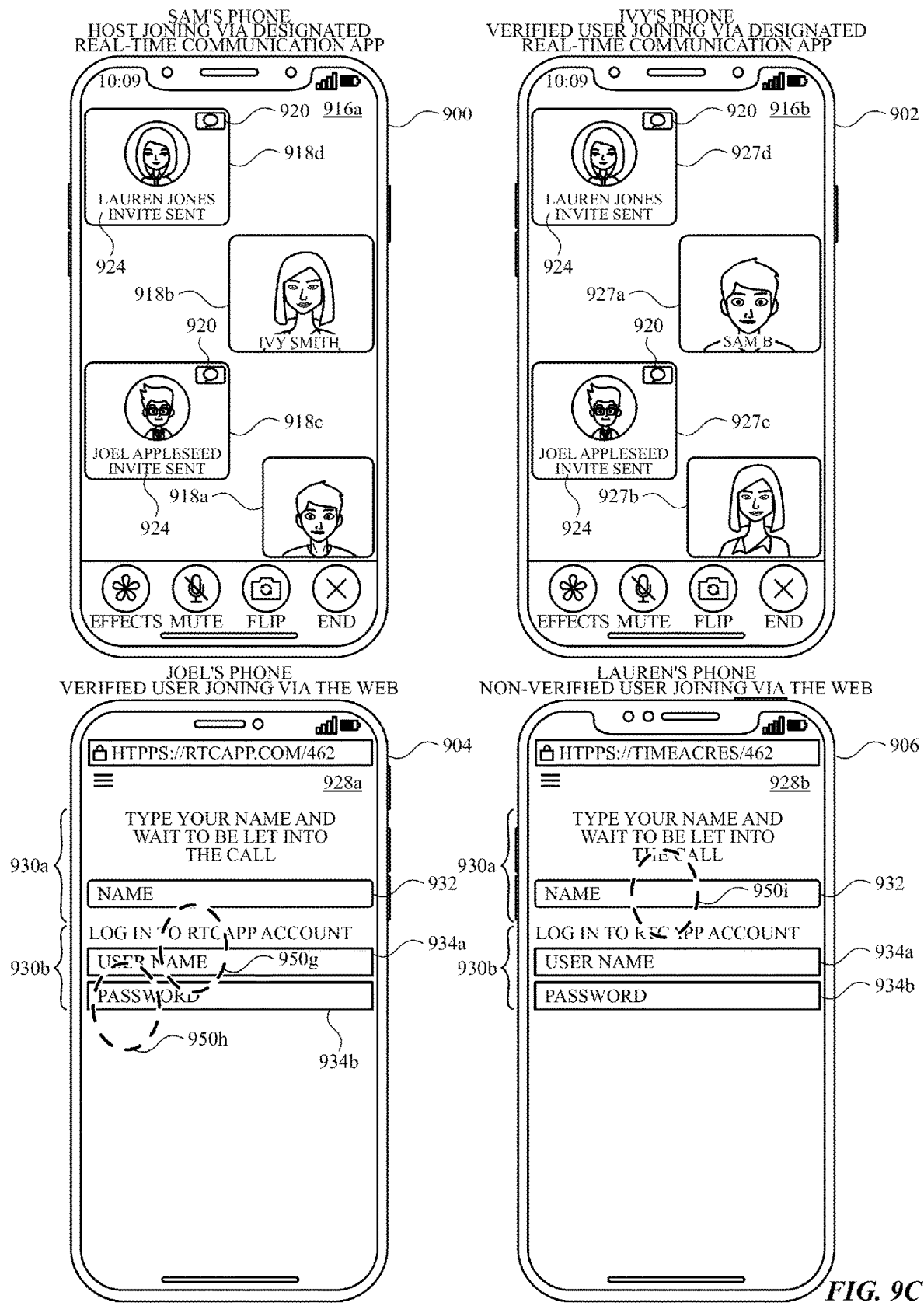

At FIG. 9B, second electronic device 902 detects user input 950d corresponding to selection of message 926a (e.g., a message corresponding to message 910 and/or a message having link 910a) of messaging user interface 914a, third electronic device 904 detects user input 950e corresponding to selection message 926b (e.g., a message corresponding to message 910 and/or a message having link 910a) of messaging user interface 914b, and fourth electronic device 906 detects user input 950f corresponding to selection of message 926c (e.g., a message corresponding to message 910 and/or a message having link 910a) of messaging user interface 914c. In response to detecting user input 950d, second electronic device 902 displays real-time communication user interface 916b, as shown at FIG. 9C. In response to detecting user input 950e, third electronic device 904 displays first log-in user interface 928a, as shown at FIG. 9C. In response to detecting user input 950f, fourth electronic device 906 displays first log-in user interface 928b, as shown at FIG. 9C.

Because second electronic device 902 includes the particular real-time communication application (e.g., the first real-time communication application), second electronic device 902 joins the real-time communication session and displays real-time communication user interface 916b. In some embodiments, second electronic device 902 is logged into and/or signed into an account associated with the particular real-time communication application, which verifies an identity of the second participant and enables the second participant to join the real-time communication session (e.g., in response to detecting user input 950d). In some embodiments, the identity of the second participant is verified because second electronic device 902 includes the particular real-time communication application.

Similar to first electronic device 900, second electronic device 902 displays first participant indicator 927a corresponding to the first participant (e.g. "Sam"), second participant indicator 927b corresponding to the second participant (e.g., the user of second electronic device 902; "Ivy"), third participant indicator 927c corresponding to the third participant (e.g., "Joel"), and fourth participant indicator 927d corresponding to the fourth participant (e.g., "Lauren"). Because the first participant associated with first electronic device 900 (e.g., "Sam") has joined the real-time communication session (and first electronic device 900 displays real-time communication user interface 916a), first participant indicator 927a includes a real-time image and/or video feed (e.g., captured via a camera of first electronic device 900) of the first participant and does not include messages user interface object 920, call user interface object 922, and/or status indicator 924 because the first participant is actively participating in the real-time communication session. In addition, second participant indicator 927b includes a real-time image and/or video feed of the second participant (e.g., captured via a camera of second electronic device 902), which provides a visual indication of the second participant using second electronic device 902 (e.g., the second participant can view a representation of an image and/or video feed that will also be displayed to other participants in the real-time communication session).

In FIG. 9C, third participant indicator 927c and fourth participant indicator 927d include visual representations of the third participant and the fourth participant, respectively. The visual representations of the third participant and the fourth participant are not real-time images and/or video feeds captured via third electronic device 904 and fourth electronic device 906, respectively, because the third participant and the fourth participant have not joined the real-time communication session. As such, the visual representations of third participant indicator 927c and fourth participant indicator 927d include avatars, default images, and/or stored images associated with the third participant and the fourth participant, respectively. Further, as set forth above, third participant indicator 927c and fourth participant indicator 927d each include messages user interface object 920 that, when selected via user input, enables second electronic device 902 to send a message to one or more of the third participant (e.g., third electronic device 904) and/or the fourth participant (e.g., fourth electronic device 906). In addition, third participant indicator 927c and fourth participant indicator 927d include status indicators 924 because third electronic device 904 and fourth electronic device 906 do not include the particular real-time communication application (e.g., RTCApp). Thus, second electronic device 902 cannot initiate a call and/or communication with third electronic device 904 and fourth electronic device 906 via the particular real-time communication application.

At FIG. 9C, first electronic device 900 displays and/or updates real-time communication user interface 916a, and specifically, displays second participant indicator 918b with a real-time image and/or video feed in response to detecting that the second participant has joined the real-time communication session (e.g., via second electronic device 902). Second participant indicator 918b includes a real-time image and/or video feed (e.g., captured via a camera of second electronic device 902) of the second participant and does not include messages user interface object 920, call user interface object 922, and/or status indicator 924 because the second participant is actively participating in the real-time communication session.

Because third electronic device 904 and fourth electronic device 906 do not include the particular real-time communication application, third electronic device 904 and fourth electronic device 906 cannot launch the particular real-time communication application and display a real-time communication user interface in response to detecting user input 950e and user input 950f, respectively. Accordingly, third electronic device 904 displays first log-in user interface 928a (e.g., a log-in user interface of a browser application) in response to detecting user input 950e. Similarly, fourth electronic device 906 displays first log-in user interface 928b (e.g., a log-in user interface of a browser application) in response to detecting user input 950f.

At FIG. 9C, first log-in user interface 928a and first log-in user interface 928b each include first log-in region 930a and second log-in region 930b, which correspond to different options for verifying an identity of the third participant and the fourth participant. For instance, first log-in region 930a corresponds to an option for a participant to join the real-time communication session without an account associated with the particular real-time communication application. For example, participants associated with a device that does not include the particular real-time communication session and/or participants without an account associated with the particular real-time communication application can attempt to join the real-time communication session by providing an identifier (e.g., a name, a nickname, and/or another identifier). First log-in region 930a includes user interface object 932 that, when selected via user input, causes third electronic device 904 and/or fourth electronic device 906 to prompt the user to input an identifier (e.g., a name, a nickname, and/or another identifier) to gain authorization to the real-time communication session.

Second log-in region 930b corresponds to an option for a participant to join the real-time communication via an account associated with the real-time communication application. For instance, second log-in region 930b includes first credential user interface object 934a and second credential user interface object 934b. In response to detecting user input corresponding to first credential user interface object 934a, third electronic device 904 and/or fourth electronic device 906 prompts a user to input a user name and/or email address for the account associated with the particular real-time communication application. In response to detecting user input corresponding to second credential user interface object 934b, third electronic device 904 and/or fourth electronic device 906 prompts a user to input a password for the account associated with the particular real-time communication application. As set forth below, in some embodiments, when credentials of the account associated with the particular real-time communication application are verified (e.g., the received credentials are the correct credentials to log into the account), third electronic device 904 and/or fourth electronic device 906 join the real-time communication session.

Figure 9D:
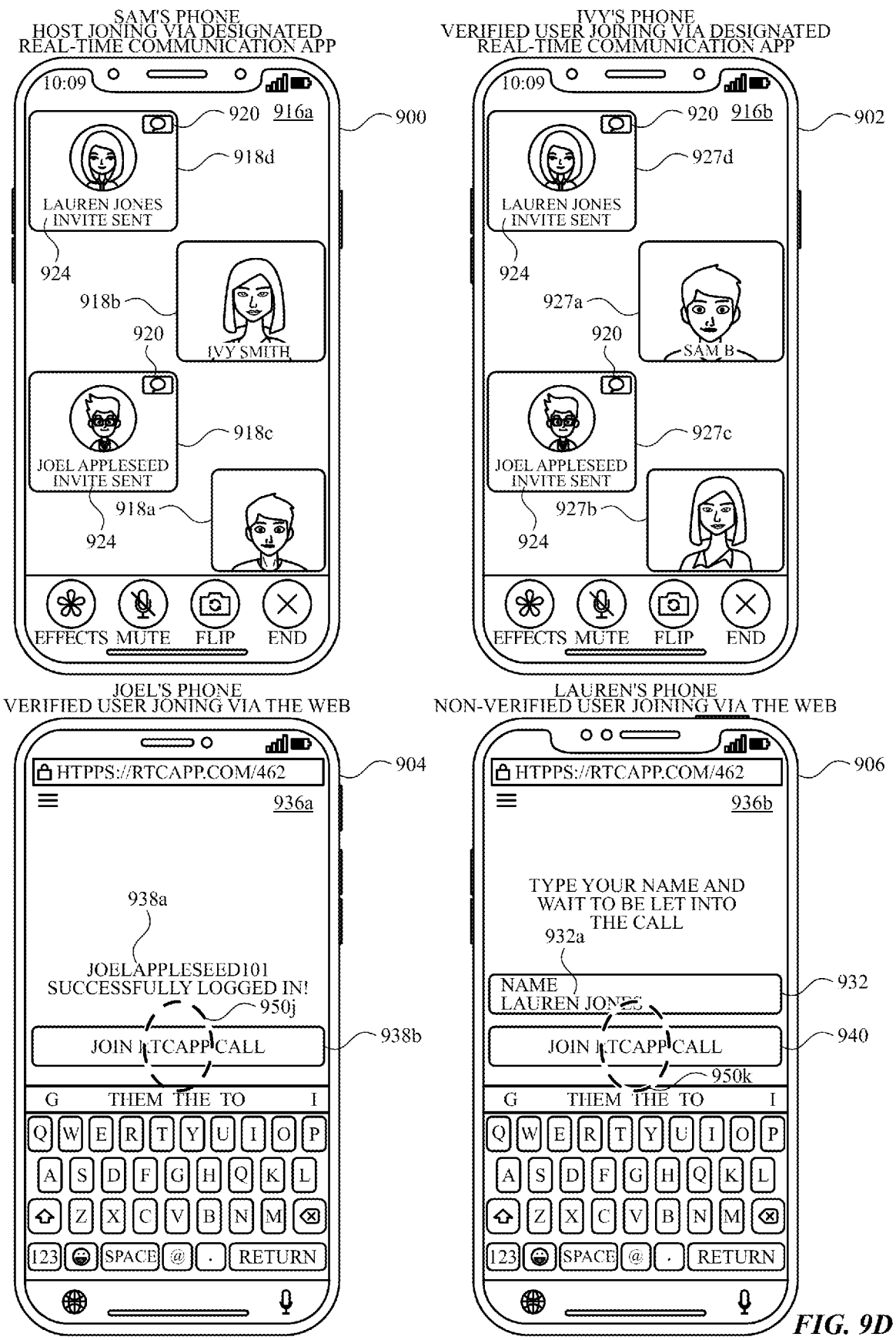

At FIG. 9C, third electronic device 904 detects user input 950g corresponding to first credential user interface object 934a and user input 950h corresponding to second credential user interface object 934b. After detecting user input 950g and user input 950h, third electronic device 904 (e.g., via communication with a server) verifies and/or receives verification of the received credentials and displays second log-in user interface 936a, as shown at FIG. 9D. At FIG. 9C, fourth electronic device 906 detects user input 950i corresponding to user interface object 932 of first log-in region 930a. After detecting user input 950i, fourth electronic device 906 displays second log-in user interface 936b, as shown at FIG. 9D.

At FIG. 9D, first electronic device 900 and second electronic device 902 maintain display of real-time communication user interface 916a and real-time communication user interface 916b, as set forth above with reference to FIG. 9C. For example, at FIG. 9D, the third participant and the fourth participant have not joined the real-time communication session (e.g., via third electronic device 904 and fourth electronic device 906, respectively), and thus, first electronic device 900 and second electronic device 902 maintain display (e.g., do not update display and/or change display) of real-time communication user interface 916a and real-time communication user interface 916b, respectively.

At FIG. 9D, third electronic device 904 displays second log-in user interface 936a. Second log-in user interface 936a includes visual indicator 938a indicating that the third participant was successfully logged into the account associated with the real-time communication application. For example, third electronic device 904 verifies and/or receives verification that credentials associated with the account of the third participant are correct (e.g., match stored credentials of the account of the third participant), and in some embodiments, verifies and/or receives verification of an identity of the third participant via the credentials associated with the account (e.g., verifies that the third participant is associated with an identifier used to invite the third participant to the real-time communication session). Second log-in user interface 936a includes join user interface object 938b that, when selected via user input, causes third electronic device 904 to join the real-time communication session (e.g., causes third electronic device 904 to display real-time communication user interface 942 and/or begin capturing images and/or video via a camera of third electronic device 904).

Further, fourth electronic device 906 displays second log-in user interface 936b. Because fourth electronic device 906 detected user input 950i corresponding to user interface object 932 of first log-in region 930a (and not user input corresponding to first credential user interface object 934a and/or second credential user interface object 934b), second log-in user interface 936b does not include visual indicator 938a. Instead, second log-in user interface 936b includes user interface object 932 having identifier 932a (e.g., "Lauren Jones") that corresponds to one or more user inputs detected via fourth electronic device 906 (e.g., user inputs detected by fourth electronic device 906 after detecting user input 950i). Second log-in user interface 936b displays join user interface object 940 that, when selected via user input, initiates a process for authorizing fourth electronic device 906 to join the real-time communication session, as set forth below.

Figure 9E:
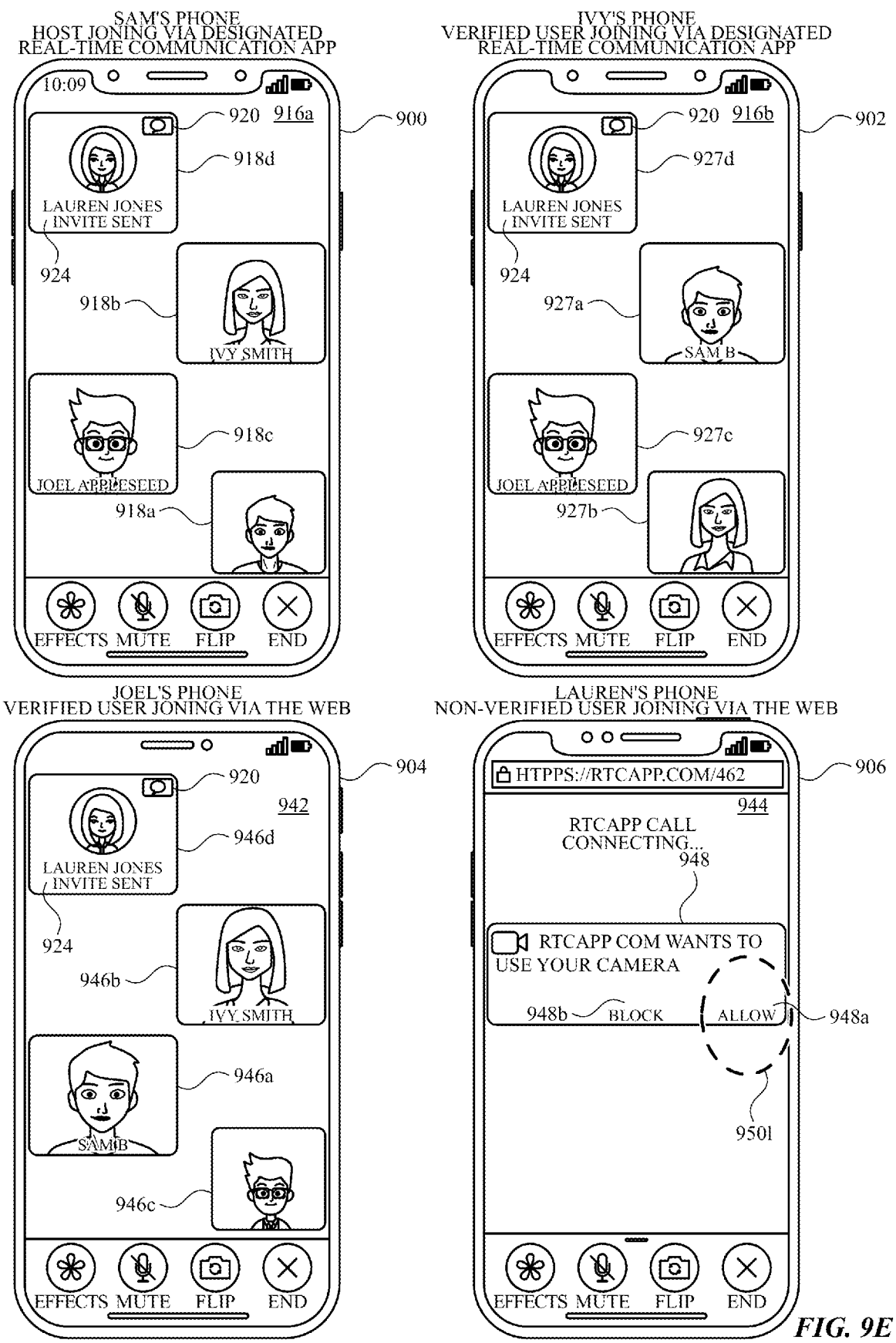

At FIG. 9D, third electronic device 904 detects user input 950j corresponding to join user interface object 938b. In response to detecting user input 950j, third electronic device 904 joins the real-time communication session and displays real-time communication user interface 942, as shown at FIG. 9E. At FIG. 9D, fourth electronic device 906 detects user input 950k corresponding to join user interface object 940. In response to detecting user input 950k, fourth electronic device 906 displays first connection user interface 944, as shown at FIG. 9E. As set forth below, because an identity of the third participant (e.g., a user of third electronic device 904) is verified by successfully logging into the account associated with the real-time communication application, third electronic device 904 is authorized to join the real-time communication session and displays real-time communication user interface 942. However, an identity of the fourth participant (e.g., a user of fourth electronic device 906) has not been verified because fourth electronic device 906 does not include the real-time communication application and fourth electronic device 906 has not been logged into an account associated with the real-time communication application. As such, fourth electronic device 906 is not yet authorized to join the real-time communication session in response to detecting user input 950k.

At FIG. 9E, first electronic device 900 displays and/or updates third participant indicator 918c and second electronic device 902 displays and/or updates third participant indicator 927c indicating that the third participant has joined the real-time communication session (e.g., via third electronic device 904). In particular, first electronic device 900 displays third participant indicator 918c that includes a real-time image and/or video feed of the third participant (e.g., captured via a camera of third electronic device 904). Similarly, second electronic device 902 displays third participant indicator 927c that includes a real-time image and/or video feed of the third participant (e.g., captured via a camera of third electronic device 904). First electronic device 900 and second electronic device 902 do not display messages user interface object 920, call user interface object 922, and/or status indicator 924 with third participant indicator 918c and third participant indicator 927c, respectively, because the third participant is actively participating in the real-time communication session.

At FIG. 9E, third electronic device 904 displays real-time communication user interface 942. Real-time communication user interface 942 first participant indicator 946a corresponding to the first participant (e.g. "Sam"), second participant indicator 946b corresponding to the second participant (e.g., "Ivy"), third participant indicator 946c corresponding to the third participant (e.g., a user of third electronic device 904; "Joel"), and fourth participant indicator 946d corresponding to the fourth participant (e.g., "Lauren"). Because the first participant associated with first electronic device 900 (e.g., "Sam") and the second participant associated with second electronic device 902 (e.g., "Ivy") have joined the real-time communication session, first participant indicator 946a and second participant indicator 946b both include a real-time image and/or video feed (e.g., captured via cameras of first electronic device 900 and second electronic device 902, respectively) of the first participant and the second participant. First participant indicator 946a and second participant indicator 946b do not include messages user interface object 920, call user interface object 922, and/or status indicator 924 because the first participant and the second participant are actively participating in the real-time communication session. Third participant indicator 946c includes a real-time image and/or video feed of the third participant (e.g., captured via a camera of third electronic device 904), which provides a visual indication of the third participant using third electronic device 904 (e.g., the third participant can view a representation of an image and/or video feed that will also be displayed to other participants in the real-time communication session).

In FIG. 9E, fourth participant indicator 946d includes a visual representation of the fourth participant (e.g., "Lauren"). The visual representations of the fourth participant is not a real-time image and/or video feed captured via fourth electronic device 906 because the fourth participant has not joined and/or been authorized to join the real-time communication session (e.g., via fourth electronic device 906). As such, the visual representation includes an avatar, a default image, and/or a stored image associated with the fourth participant. As set forth above, fourth participant indicator 946d includes messages user interface object 920 that, when selected via user input, enables third electronic device 904 to send a message to the fourth participant. Fourth participant indicator 927d includes status indicator 924 because fourth electronic device 906 does not include the particular real-time communication application, and thus, third electronic device 904 cannot initiate a call and/or communication with fourth electronic device 906 via the particular real-time communication application.

At FIG. 9E, fourth electronic device 906 displays first connection user interface 944 including video user interface object 948. Video user interface object 948 is displayed to confirm that the fourth participant approves a camera of fourth electronic device 906 to be used and/or activated when participating in the real-time communication session. Video user interface object 948 includes allow user interface object 948a and block user interface object 948b. In response to detecting user input corresponding to allow user interface object 948a, fourth electronic device 906 receives authorization to activate and/or use a camera of fourth electronic device 906 when fourth electronic device 906 joins the real-time communication session. In contrast, in response to detecting user input corresponding to block user interface object 948b, fourth electronic device 906 does not receive authorization to activate and/or use the camera when fourth electronic device 906 joins the real-time communication session. In some embodiments, fourth electronic device 906 does not attempt (e.g., foregoes attempting) to join the real-time communication session in response to detecting user input corresponding to selection of block user interface object 948b. In some embodiments, fourth electronic device 906 continues to attempt to join the real-time communication session in response to detecting user input corresponding to selection of block user interface object 948b, but fourth electronic device 906 does not activate and/or enable the camera of fourth electronic device 906.

At FIG. 9E, fourth electronic device 906 detects user input 950l corresponding to selection of allow user interface object 948a. In response to detecting user input 950l, fourth electronic device 906 displays second connection user interface 952, as shown at FIG. 9F.

Figure 9F:
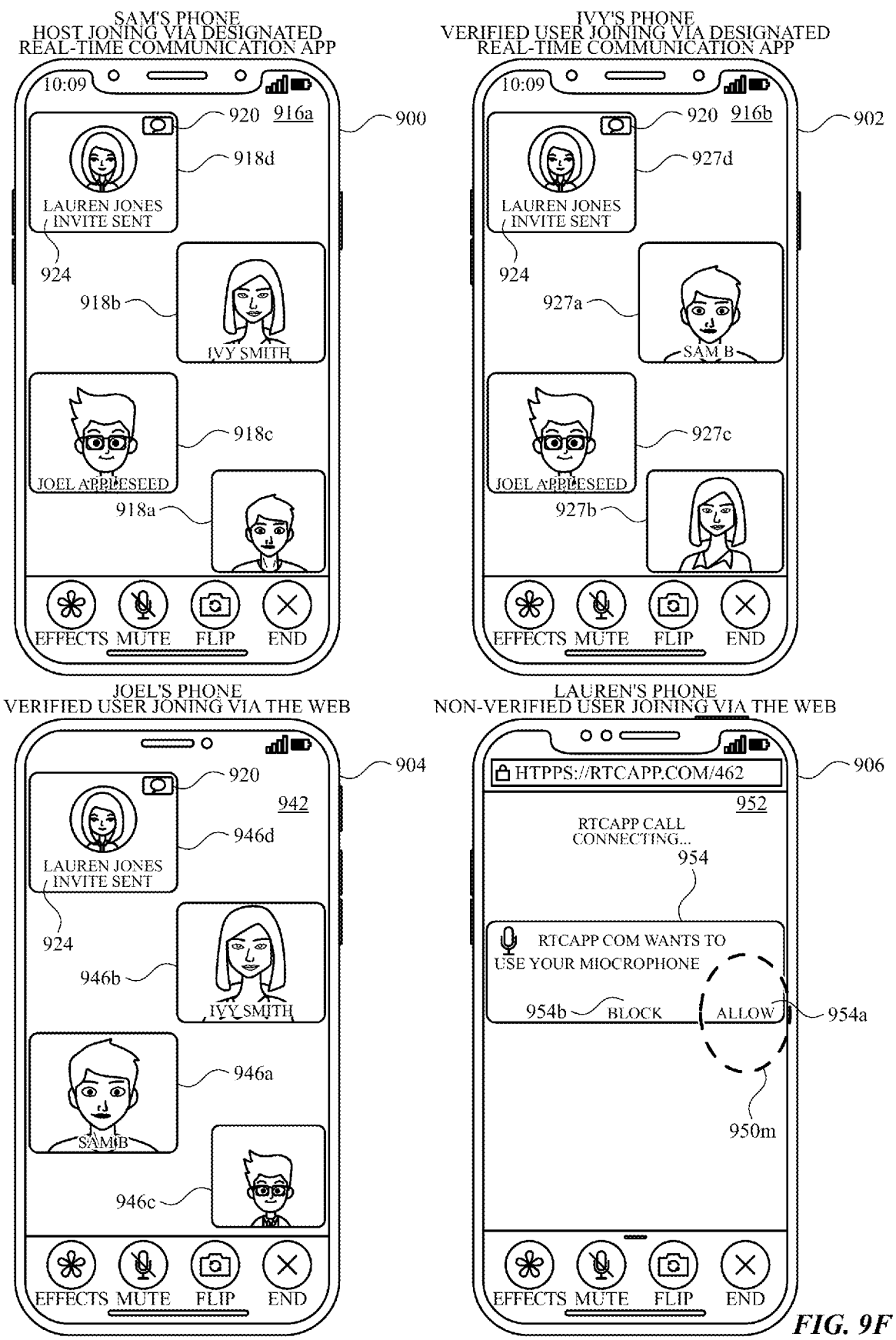

At FIG. 9F, second connection user interface 952 includes audio user interface object 954. Audio user interface object 954 is displayed to confirm that the fourth participant approves a microphone and/or other audio capturing device of fourth electronic device 906 to be used and/or activated when participating in the real-time communication session. Audio user interface object 954 includes allow user interface object 954a and block user interface object 954b. In response to detecting user input corresponding to allow user interface object 954a, fourth electronic device 906 receives authorization to activate and/or use a microphone of fourth electronic device 906 when fourth electronic device 906 joins the real-time communication session. In contrast, in response to detecting user input corresponding to block user interface object 954b, fourth electronic device 906 does not receive authorization to activate and/or use the microphone when fourth electronic device 906 joins the real-time communication session. In some embodiments, fourth electronic device 906 does not attempt (e.g., foregoes attempting) to join the real-time communication session in response to detecting user input corresponding to selection of block user interface object 954b. In some embodiments, fourth electronic device 906 continues to attempt to join the real-time communication session in response to detecting user input corresponding to selection of block user interface object 954b, but fourth electronic device 906 does not activate and/or enable the microphone of fourth electronic device 906.

At FIG. 9F, fourth electronic device 906 detects user input 950m corresponding to selection of allow user interface object 954a. In response to detecting user input 950m, fourth electronic device 906 displays stand-by user interface 956, as shown at FIG. 9G.

Figure 9G:
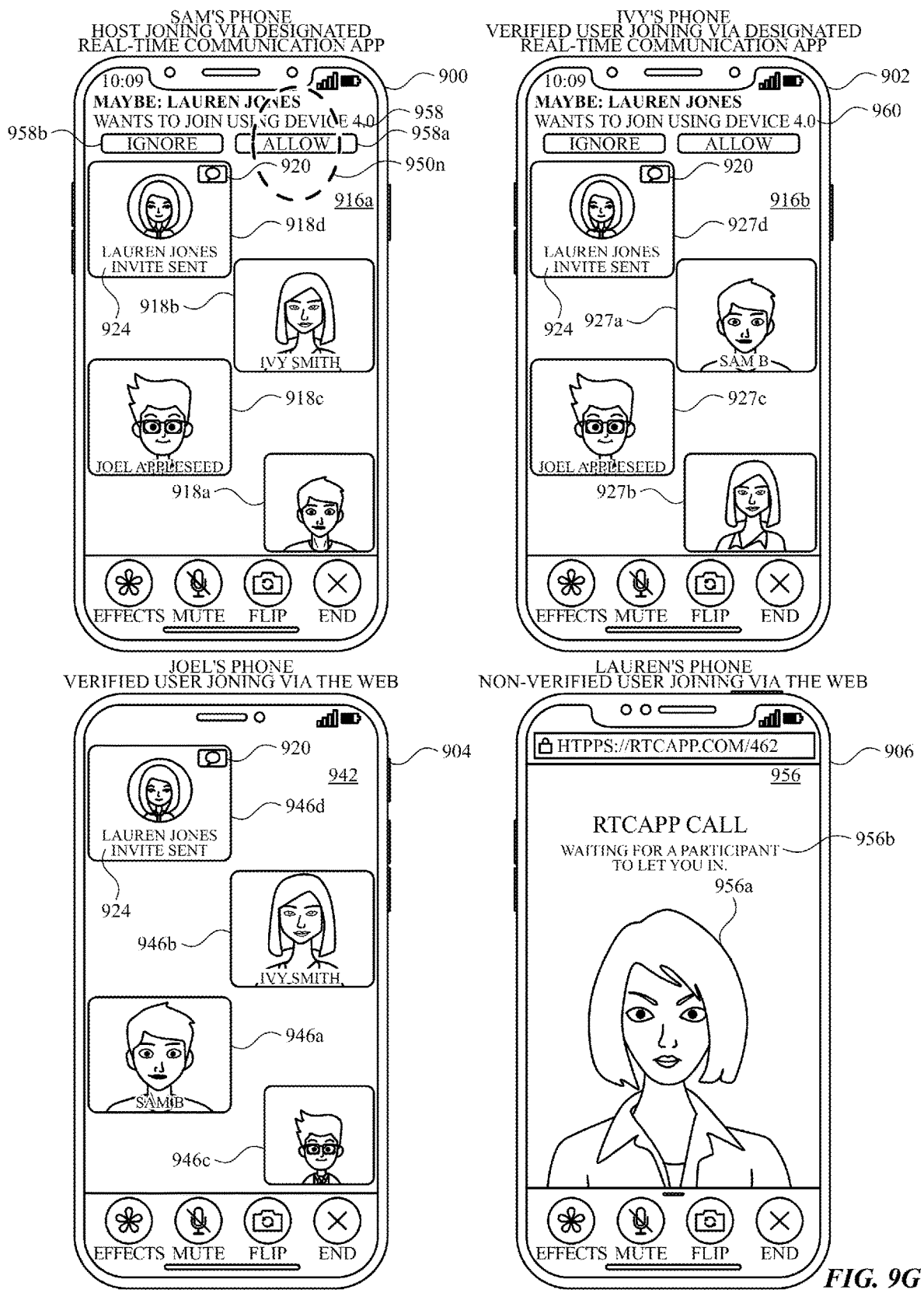

At FIG. 9G, fourth electronic device 906 displays stand-by user interface 956, which corresponds to a virtual waiting room for the fourth participant before fourth electronic device 906 receives authorization to join the real-time communication session. Stand-by user interface 956 includes visual representation 956a of the fourth participant, such as a real-time image and/or video feed captured via a camera of fourth electronic device 906. When fourth electronic device 906 detects user input corresponding to selection of block user interface object 948b, stand-by user interface 956 can include an avatar, a generic image, and/or a stored image (e.g., an image that is not a real-time image and/or video feed) corresponding to the fourth participant. In addition, stand-by user interface 956 includes visual indication 956b indicating that fourth electronic device 906 has not received authorization to join the real-time communication session and that fourth electronic device 906 is waiting to receive authorization before the fourth participant can join the real-time communication session. In some embodiments, fourth electronic device 906 joins the real-time communication session in response to detecting user input 950m, but one or more of first electronic device 900, second electronic device 902, and/or third electronic device 904 display a remove user interface object that, when selected via user input, causes fourth electronic device 906 to be removed and/or disconnected from the real-time communication session.

At FIG. 9G, first electronic device 900 displays authorization user interface object 958 and second electronic device

902 displays authorization user interface object 960. As set forth below, first electronic device 900 and/or second electronic device 902 are configured to authorize fourth electronic device 906 to join the real-time communication session in response to detecting user input corresponding to authorization user interface object 958 and/or authorization user interface object 960, respectively. Third electronic device 904 does not display an authorization user interface object, such that third electronic device 904 cannot provide authorization for fourth electronic device 906 to join the real-time communication session.

In some embodiments, devices that include the particular real-time communication application (e.g., the first real-time communication application) and/or include a particular operating system software display authorization user interface objects that enable the devices to provide authorization for other participants (e.g., unverified participants) to join the real-time communication session. In some embodiments, a device corresponding to a host participant, such as a participant that scheduled and/or organized the real-time communication session (e.g., a participant associated with a device that generated and/or sent message 910), displays the authorization user interface object while no other devices display the authorization user interface object (e.g., only the device corresponding to the host participant displays the authorization user interface object). In some embodiments, devices that have been connected to and/or participating in the real-time communication session for a predefined amount of time (e.g., 30 seconds, 1 minute, 2 minutes, and/or 5 minutes) display the authorization user interface object.

For instance, at FIG. 9G, third electronic device 904 does not display an authorization user interface object because third electronic device 904 does not include the particular real-time communication application, does not include the particular operating system software, is not associated with a host participant of the real-time communication session, and/or has not been connected to the real-time communication session for the predefined amount of time. However, first electronic device 900 displays authorization user interface object 958 and second electronic device 902 displays authorization user interface object 960 because first electronic device 900 and second electronic device 902 include the particular real-time communication application, include the particular operating system software, are associated with a host participant of the real-time communication session, and/or have been connected to the real-time communication session for the predefined amount of time.

At FIG. 9G, first electronic device 900 detects user input 950*n* corresponding to selection of allow user interface object 958*a* of authorization user interface object 958. In response to detecting user input 950*n*, first electronic device 900 transmits data (e.g., to a server) indicative of authorization and/or approval for fourth electronic device 906 to join the real-time communication session. After first electronic device 900 detects user input 950*n*, fourth electronic device 906 joins the real-time communication session and displays real-time communication user interface 962, as shown at FIG. 9H.

In some embodiments, in response to detecting user input corresponding to selection of ignore user interface object 958*b*, first electronic device 900 does not transmit (e.g., foregoes transmitting) the data indicative of authorization and/or approval for fourth electronic device 906 to join the real-time communication session, but instead transmits data indicative of a rejection for fourth electronic device 906 to join the real-time communication session. After detecting user input corresponding to selection of ignore user interface object 958*b*, fourth electronic device 906 is not authorized to join the real-time communication session. In some embodiments, fourth electronic device 906 displays a notification and/or indication that fourth electronic device 906 did not receive authorization to join the real-time communication session. In some embodiments, fourth electronic device 906 displays (e.g., re-displays) first log-in user interface 928*b* and/or second log-in user interface 936*b* indicating that fourth electronic device 906 did not receive authorization to join the real-time communication session.

Figure 9H:
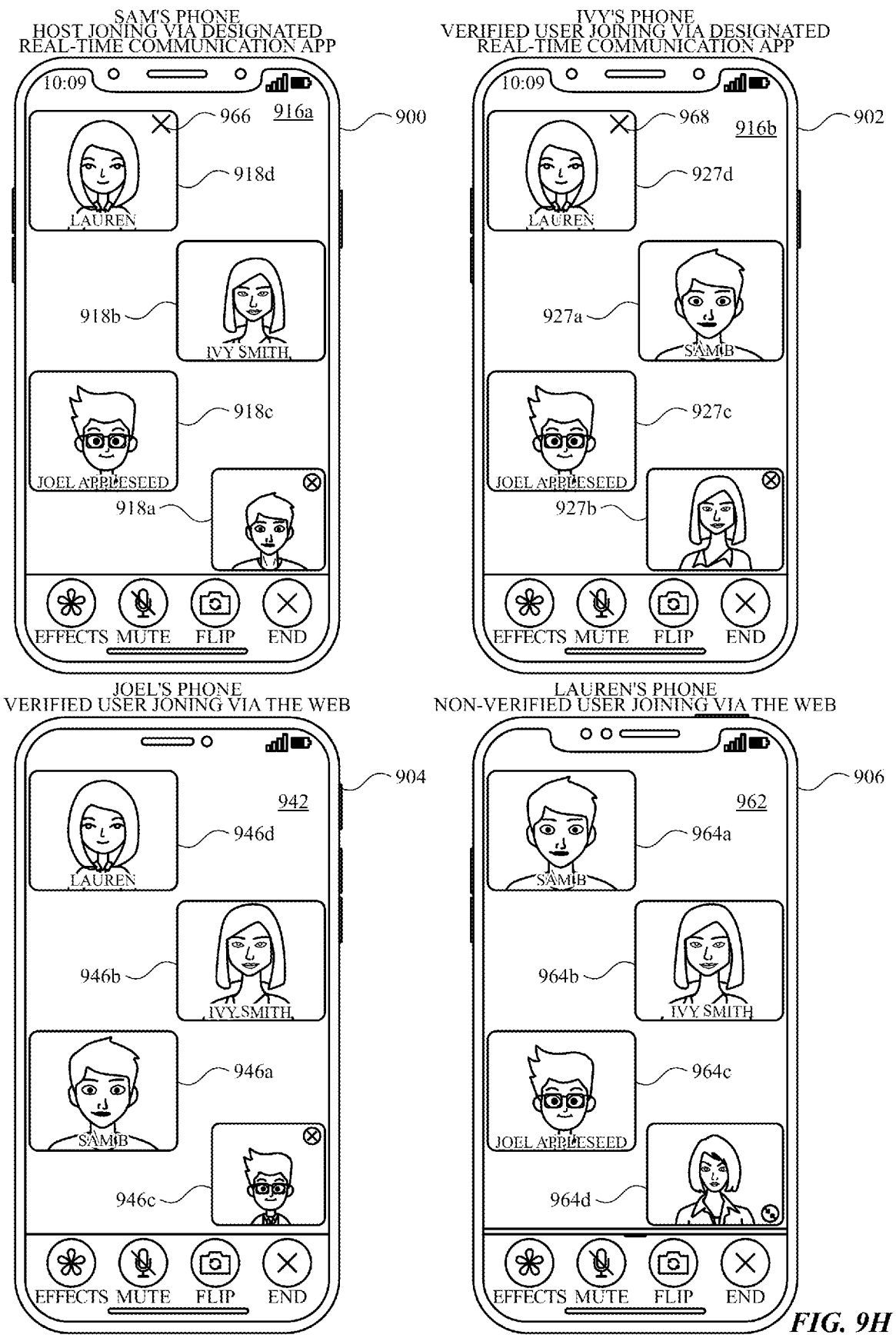

At FIG. 9H, first electronic device 900 displays and/or updates fourth participant indicator 918*d* indicating that fourth electronic device 906 was authorized to join and joined the real-time communication session. In particular, first electronic device 900 displays fourth participant indicator 918*d* that includes a real-time image and/or video feed of the fourth participant associated with fourth electronic device 906 without displaying messages user interface object 920 and/or status indicator 924. Similarly, second electronic device 902 displays and/or updates fourth participant indicator 927*d* indicating that fourth electronic device 906 was authorized to join and joined the real-time communication session. In particular, second electronic device 902 displays fourth participant indicator 927*d* that includes a real-time image and/or video feed of the fourth participant associated with fourth electronic device 906 without displaying messages user interface object 920 and/or status indicator 924. Third electronic device 904 displays and/or updates fourth participant indicator 946*d* indicating that fourth electronic device 906 was authorized to join and joined the real-time communication session. In particular, third electronic device 904 displays fourth participant indicator 946*d* that includes a real-time image and/or video feed of the fourth participant associated with fourth electronic device 906 without displaying messages user interface object 920 and/or status indicator 924.

In FIG. 9H, fourth electronic device 906 displays real-time communication user interface 962. Real-time communication user interface 962 includes first participant indicator 964*a* corresponding to the first participant (e.g., "Sam"), second participant indicator 964*b* corresponding to the second participant (e.g., "Ivy"), third participant indicator 964*c* corresponding to the third participant (e.g., "Joel"), and fourth participant indicator 964*d* corresponding to the fourth participant (e.g., a user of fourth electronic device 906; "Lauren"). Because the first participant associated with first electronic device 900 (e.g., "Sam"), the second participant associated with second electronic device 902, and the third participant associated with third electronic device 904 have joined the real-time communication session, first participant indicator 964*a*, second participant indicator 964*b*, and third participant indicator 964*c* each include a real-time image and/or video feed (e.g., captured via cameras of first electronic device 900, second electronic device 902, and third electronic device 904, respectively) of the first participant, the second participant, and the third participant, respectively. First participant indicator 964*a*, second participant indicator 964*b*, and third participant indicator 964*c* do not include messages user interface object 920, call user interface object 922, and/or status indicator 924 because the first participant, the second participant, and the third participant are actively participating in the real-time communication session. Fourth participant indicator 964*d* includes a real-time image and/or video feed of the fourth participant (e.g., captured via a camera of fourth electronic device 906), which provides a visual indication of the fourth participant using fourth electronic device 906 (e.g., the fourth participant can view a representation of an image and/or video feed that will also be displayed to other participants in the real-time communication session).

At FIG. 9H, first electronic device 900 displays remove user interface object 966 on fourth participant indicator 918d and second electronic device 902 displays remove user interface object 968 on fourth participant indicator 927d. Because the fourth participant joined the real-time communication session via fourth electronic device 906, which does not include the particular real-time communication application and/or the particular operating system software, and without logging into an account associated with the real-time communication application, the fourth participant can be removed from, disconnected from, or otherwise prevented from participating in the real-time communication session by first electronic device 900 and second electronic device 902. For instance, in response to detecting user input corresponding to selection of remove user interface object 966 and/or remove user interface object 968, first electronic device 900 and/or second electronic device 902 cause fourth electronic device 906 to disconnect from the real-time communication session or be placed into (or back into) a "waiting room" until authorized to re-join the real-time communication session. As set forth above, an identity of the fourth participant is unable to be verified because the fourth participant joins the real-time communication session via a device without the particular real-time communication application and/or without the particular operating system software, and without logging into an account associated with the real-time communication application. Because the identity of the fourth participant is not verified (e.g., verified electronically via credentials), at least one of the devices connected to the real-time communication session can remove fourth electronic device 906 from the real-time communication session (e.g., a user of a device views an image of the unverified participant (e.g., a participant associated with a device without the particular real-time communication application and/or without the particular operating software), determines that the unverified participant is unauthorized, and removes the unverified participant from the real-time communication session).

At FIG. 9H, third electronic device 904 and fourth electronic device 906 do not display a remove user interface object on any of the participant indicators (e.g., 946a, 946b, 946c, 946d, 964a, 964b, 964c, and/or 964d). Third electronic device 904 does not include a remove user interface object because third electronic device 904 does not include the particular real-time application and/or the particular operating system software even though an identity of the third participant was verified by successfully logging into the account associated with the real-time communication application. In some embodiments, third electronic device 904 also displays the remove user interface object on fourth participant indicator 946d. In some embodiments, devices corresponding to verified participants that have been connected to the real-time communication session for a predefined amount of time (e.g., 30 seconds, 1 minute, 2 minutes, and/or 5 minutes) display remove user interface objects for unverified participants. In some embodiments, devices that include the particular real-time communication application and/or the particular operating system software display the remove user interface object for unverified participants (and, optionally, verified participants). In some embodiments, devices that include the real-time communication application and/or the particular operating system software and that have been connected to the real-time communication session for the predefined amount of time display remove user interface objects for unverified participants (and, optionally, verified participants).

Fourth electronic device 906 does not include a remove user interface object because, as set forth above, the fourth participant required approval from another participant to join the real-time communication session (e.g., the fourth participant was not automatically verified based on the type of device of the fourth electronic device or an account associated with the fourth electronic device). In some embodiments, unverified participants of the real-time communication session are not provided the ability to remove other participants of the real-time communication session. In some embodiments, electronic devices corresponding to unverified participants do not display remove user interface objects for other unverified participants and/or for verified participants.

FIG. 10 is a flow diagram illustrating a method for allowing a participant to join a real-time communication session using an electronic device in accordance with some embodiments. Method 1000 is performed at a computer system (e.g., 100, 300, 500, 600, 900, 902, 904, and/or 906) (e.g., an electronic device; a smart device, such as a smartphone or a smartwatch; a mobile device; a wearable device) that is in communication with a display generation component and one or more input devices. Some operations in method 1000 are, optionally, combined, the orders of some operations are, optionally, changed, and some operations are, optionally, omitted.

As described below, method 1000 provides an intuitive way for allowing a participant to join a real-time communication session. The method reduces the cognitive burden on a user for allowing a participant to join a real-time communication session, thereby creating a more efficient human-machine interface. For battery-operated computing devices, enabling a user to allow a participant to join a real-time communication session faster and more efficiently conserves power and increases the time between battery charges.

While the computer system (e.g., 600, 900, and/or 902) displays (1002), via the display generation component, a user interface (e.g., 636, 916a, and/or 916b) that includes a visual representation of an active real-time communication session for a first user (e.g., "Sam" and/or "Ivy") (e.g., a user interface that includes one or more user interface objects corresponding to a user of the computer system and/or one or more users associated with respective external computer systems, where the one or more user interface objects include an image (e.g., a live video feed captured via a camera of a respective computer system) and/or an indication of the user corresponding to the respective user interface object), a second user (e.g., "Lauren") different from the first user attempts to join the real-time communication (e.g., detecting and/or receiving data from an external computer system associated with the second user and/or an external computer system, such as a server, where the data includes the attempt and/or a request from the second user to join the real-time communication).

After the second user attempts to join the real-time communication session, the computer system (e.g., 600, 900, and/or 902) displays (1004) in the user interface (e.g., 636, 916a, and/or 916b) a visual representation (e.g., 644, 646, 918c, 927c, 958, and/or 960) of the attempt of the second user to join the real-time communication session (e.g., a notification (e.g., a push notification) indicative of the attempt of the second user to join the real-time communication session, a notification (e.g., a push notification) that includes one or more selectable options for accepting and/or denying the attempt of the second user to join the real-time communication session and/or a representation of the second user (e.g., a real-time video stream, a photo, and/or a name of the second user)), wherein displaying the visual representation (e.g., 644, 646, 918*c*, 927*c*, 958, and/or 960) of the attempt of the second user to join the real-time communication session includes: in accordance with a determination (e.g., a determination made by the computer system and/or a determination made by an external computer system, such as a server) that one or more criteria have been met, wherein the one or more criteria include a requirement that an identity of the second user has not been verified as an invitee to the real-time communication session (e.g., an identifier, such as a user name email address, phone number, and/or other identifier, associated with the second user was not included by the first user and/or another user in the real-time communication session in a list of authorized users for the real-time communication session; a name, email address, and/or user name of the second user is not included in a list of authorized users for the real-time communication session; an account and/or email address associated with the second user is not associated with a real-time communication application configured to initiate the real-time communication session; and/or an external computer system associated with the second user does not include a particular application (e.g., a particular real-time video communication application)) in order for the one or more criteria to be met, the visual representation (e.g., 958 and/or 960) of the attempt of the second user to join the real-time communication session includes (1006) an option (e.g., 958*a* and/or 958*b*) (e.g., a notification (e.g., a push notification) that includes one or more user-selectable graphical user interface objects that enable the first user to admit and/or deny admittance of the second user to the real-time communication session) that is selectable to determine whether the second user is allowed to participate in the real-time communication session (e.g., allowing the second user to join the real-time communication session, removing the second user from the real-time communication session, and/or preventing the second user from joining the real-time communication session); and in accordance with a determination (e.g., a determination made by the computer system and/or a determination made by an external computer system, such as a server) that the identity of the second user has been verified as an invitee to the real-time communication session (e.g., an identifier, such as a user name, email address, phone number, and/or other identifier, associated with the second user was included by the first user and/or another user in the real-time communication session in a list of authorized users for the real-time communication session; a name, email address, and/or user name of the second user is included in a list of authorized users for the real-time communication session; an account and/or email address associated with the second user is associated with a real-time communication application configured to initiate the real-time communication session; and/or an external computer system associated with the second user includes a particular application (e.g., a particular real-time video communication application)), the visual representation (e.g., 644, 646, 918*c* and/or 927*c*) of the attempt of the second user to join the real-time communication session includes (1008) a representation (e.g., 644, 646, 918*c* and/or 927*c*) of the second user (e.g., an avatar or video feed of the user) that is displayed without displaying the option (e.g., 958*a* and/or 958*b*) that is selectable to determine whether the second user is allowed to participate in the real-time communication session (e.g., the second user is admitted to the real-time communication session without requiring authorization from the first user and/or another user in the real-time communication session when the set of one or more criteria have not been met).

In some embodiments, the determination that the identity of the second user has been verified as an invitee to the real-time communication session includes a determination that the identity of the second user meets a set of criteria (e.g., an account and/or email address associated with the second user is associated with a real-time communication application configured to initiate the real-time communication session). Based on the determination that the identity of the second user meets the set of criteria, the visual representation (e.g., 918*c*, 918*d*, 927*c*, and/or 927*d*) of the attempt of the second user to join the real-time communication session includes the representation (e.g., 918*c*, 918*d*, 927*c* and/or 927*d*) of the second user that is displayed without displaying the option (e.g., 958*a* and/or 958*b*) that is selectable to determine whether the second user is allowed to participate in the real-time communication session, but the representation (e.g., 918*d* and/or 927*d*) of the second user includes a selectable user interface object (e.g., 966 and/or 968) (e.g., an "X" included on and/or adjacent to the representation of the second user) that, when selected via user input, is configured to remove the second user from the real-time communication session. Additionally or alternatively, based on the determination that the identity of the second user meets the set of criteria, the visual representation (e.g., 918*c*, 918*d*, 927*c*, and/or 927*d*) of the attempt of the second user to join the real-time communication session includes the representation of the second user (e.g., 918*c*, 918*d*, 927*c*, and/or 927*d*) that is displayed without displaying the option (e.g., 958*a* and/or 958*b*) that is selectable to determine whether the second user is allowed to participate in the real-time communication session, but the computer system displays (e.g., concurrently displays with the representation of the second user) a confirmation user interface object that, when selected via user input, allows the second user to remain in the real-time communication session.

In some embodiments, while displaying the option (e.g., 958*a* and/or 958*b*) that is selectable to determine whether the second user is allowed to participate in the real-time communication session, the computer system detects, via the one or more input devices, user input (e.g., 950*u*) corresponding to selection of the option (e.g., 958*a*). In response to detecting the user input (e.g., 950*u*), the computer system initiates a process to allow the second user to join the active communication session.

Displaying the option that is selectable to determine whether the second user is allowed to participate in the real-time communication session when the one or more criteria have been met improves security of the computer system by preventing unauthorized users from joining the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user is designated as a host of the real-time communication session (e.g., the first user scheduled the real-time communication session, the first user selected one or more invitees to the real-time communication session (e.g., invitees that can be verified as invitees to the real-time communication session), the first user caused, via one or more user inputs, generation of a link to the real-time communication session, and/or the first user sent one or more messages associated with the real-time communication session to invitees to the real-time communication session). In some embodiments, the computer system (e.g., 600 and/or 900) displays the option (e.g., 958a and/or 958b) that is selectable to determine whether the second user is allowed to participate in the real-time communication session and the option (e.g., 958a and/or 958b) that is selectable to determine whether the second user is allowed to participate in the real-time communication session is not displayed on other devices (e.g., 902, 904, and/or 906) of other participants in the real-time communication session (e.g., computer systems (e.g., 900) associated with the host are the only devices that display the option (e.g., 958a and/or 958b) that is selectable to determine whether the second user is allowed to participate in the real-time communication session) (e.g., external computer systems (e.g., 904) associated with other users that have been verified as invitees to the real-time communication session do not display the option (e.g., 958a and/or 958b) that is selectable to determine whether the second user is allowed to participate in the real-time communication session; the first user is the only user participating in the active real-time communication session that is able to allow the second user to participate in the real-time communication session). In some embodiments, one or more third users are actively participating in the real-time communication session when the second user attempts to join the real-time communication session. The one or more third users are not designated as the host to the real-time communication session, and therefore, external computer systems (e.g., 904) associated with the one or more third users do not display the option (e.g., 958a and/or 958b) that is selectable to determine whether the second user is allowed to participate in the real-time communication session (e.g., the one or more third users cannot admit and/or deny admittance of the second user to the real-time communication session because they are not designated as the host to the real-time communication session).

Displaying the option that is selectable to determine whether the second user is allowed to participate in the real-time communication session on a computer system of a host of the real-time communication session improves security of the computer system because the host is more likely to identify unauthorized users. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user is not designated as a host of the real-time communication session (e.g., the first user did not schedule the real-time communication session, the first user did not select one or more invitees to the real-time communication session (e.g., invitees that can be verified as invitees to the real-time communication session), the first user did not cause, via one or more user inputs, generation of a link (e.g., 910a) to the real-time communication session, and/or the first user did not send one or more messages associated with the real-time communication session to invitees to the real-time communication session) (e.g., the first user joined the real-time communication session via a link (e.g., 910a) received from another user (e.g., via an electronic message), the first user joined the real-time communication session via a link (e.g., 910a) to the real-time communication session and the computer system (e.g., 902) associated with the first user includes a particular real-time communication application, and/or the first user joined the real-time communication session via a notification received from a host user (e.g., a user that scheduled the real-time communication session) (e.g., the first user was directly called via a real-time communication application configured to initiate the real-time communication session)). In some embodiments, the computer system (e.g., 900 and/or 902) is not the only device that displays the visual representation (e.g., 918b, 918c, 918d, 927a, 927c, 927d, 958, and/or 960) of the attempt of the second user to join the real-time communication session including the option (e.g., 958a and/or 958b) that is selectable to determine whether the second user is allowed to participate in the real-time communication session (e.g., external computer systems (e.g., 902) associated with other users that have been verified as invitees to the real-time communication session display the option (e.g., 960) that is selectable to determine whether the second user is allowed to participate in the real-time communication session; the first user is not the only user participating in the active real-time communication session that is able to allow the second user to participate in the real-time communication session).

Displaying the option that is selectable to determine whether the second user is allowed to participate in the real-time communication session on a computer system of a non-host of the real-time communication session improves security of the computer system by enabling participants, in addition to the host, to identify unauthorized users. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation (e.g., 918d) of the second user in the user interface, the computer system (e.g., 900) receives (1010) data that indicates that a third user (e.g., "Ivy") participating in the real-time communication session (e.g., a third user that has been verified as an invitee to the real-time communication session) removed the second user (e.g., "Lauren") from the real-time communication session (e.g., an external computer system associated with the third user detected a user input corresponding to a remove user interface object displayed with the representation of the second user, and in response to the external computer system detecting the user input corresponding to the remove user interface object, the external computer system transmits and/or sends data that is received by the computer system (e.g., received by the computer system directly from the external computer system and/or received by the computer system indirectly from the external computer system via another external computer system, such as a server)). In response to receiving the data that indicates that the third user participating in the real-time communication session removed the second user from the real-time communication session, the computer system (e.g., 900) ceases display (1012) of the representation of the second user (e.g., 918d) (e.g., the second user is removed from the real-time communication session and/or the second user is no longer admitted to participate in the real-time communication session, such that the representation of the second user is no longer displayed via the display generation component of the computer system and the second user cannot communicate with the first user and/or the third user via the real-time communication session).

Enabling the third user to remove the second user from the real-time communication session improves security of the computer system by allowing other participants of the real-time communication session to identify and remove unauthorized participants. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the visual representation (e.g., 958 and/or 960) of the attempt of the second user to join the real-time communication session including the option (e.g., 958a and/or 958b) that is selectable to determine whether the second user is allowed to participate in the real-time communication session includes concurrently displaying: the representation of the second user (e.g., 918d and/or 927d) (e.g., the second user is tentatively admitted to the real-time communication session pending approval and/or rejection via the option that is selectable to determine whether the second user is allowed to participate in the real-time communication session) and a remove user interface object (e.g., 966 and/or 968) (e.g., an affordance and/or button overlaid on and/or displayed adjacent to the representation of the second user) that, when selected via user input, causes the second user (e.g., 918d, 927d, and/or "Lauren") to be removed from the real-time communication session (e.g., the first user, and optionally other users that are participating in the real-time communication session, can remove the second user by selecting the remove user interface object).

In some embodiments, the first user (and optionally other users participating in the real-time communication session) can remove the second user from the real-time communication session via selection of the remove user interface object (e.g., 966 and/or 968) and/or selection of a rejection user interface object (e.g., 958b) of the option that is selectable to determine whether the second user is allowed to participate in the real-time communication session.

Concurrently displaying the representation of the second user and the option that is selectable to determine whether the second user is allowed to participate in the real-time communication session provides improved security to the computer system by enabling a user to confirm an identify of the second user and better make a determination as to whether the second user is allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the visual representation (e.g., 958 and/or 960) of the attempt of the second user to join the real-time communication session including the option (e.g., 958a and/or 958b) that is selectable to determine whether the second user is allowed to participate in the real-time communication session includes displaying the visual representation (e.g., 958 and/or 960) of the attempt of the second user to join the real-time communication session including the option (e.g., 958a and/or 958b) that is selectable to determine whether the second user is allowed to participate in the real-time communication session without displaying the representation of the second user (e.g., 918d and/or 927d) (e.g., the second user is not admitted to the real-time communication session (e.g., tentatively or otherwise) until approved via the option that is selectable to determine whether the second user is allowed to participate in the real-time communication session). In some embodiments, the second user is placed in a waiting room (e.g., a virtual waiting room) until approved via the option that is selectable to determine whether the second user is allowed to participate in the real-time communication session. The waiting room does not enable the second user to communicate with the first user and/or any other users that are participating in the real-time communication session.

Displaying the option that is selectable to determine whether the second user is allowed to participate in the real-time communication session without displaying the representation of the second user improves security of the computer system because the second user cannot view and/or listen to communication between participants of the real-time communication session until the second user is approved to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more criteria include a second requirement that the first user has been participating in the real-time communication session for at least a threshold amount of time (e.g., the first user joined the real-time communication session at a first time that is at least 30 seconds, 60 seconds, and/or 2 minutes prior to the time when the second user attempts to join the real-time communication session) in order for the one or more criteria to be met.

Enabling the first user to determine whether the second user is allowed to participate in the real-time communication session after the first user has been participating in the real-time communication session for the threshold amount of time improves security of the computer system by allowing participants that have been verified by other participants to determine whether the second user is allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second user attempts to join the real-time communication session via selection of a link (e.g., 910a) corresponding to the real-time communication session (e.g., a uniform resource locator that is specific to the real-time communication session with the first user and/or other users that have been identified as invitees to the real-time communication session), the second user is allowed to join the real-time communication session (e.g., the second user satisfies the set of criteria and/or the option that is selectable to determine whether the second user is allowed to participate in the real-time communication session is selected to allow the second user to participate in the real-time communication session), and a fifth user (e.g., 902 and/or "Ivy") (e.g., the first user and/or another user participating in the real-time communication session) satisfying a second set of criteria (e.g., the fifth user is participating in the real-time communication session, the fifth user is associated with an identifier, such as a user name, email address, phone number, and/or other identifier, included by the first user and/or another user in the real-time communication session in a list of authorized users for the real-time communication session; a name, email address, and/or user name of the fifth user is included in a list of authorized users for the real-time communication session; an account and/or email address associated with the fifth user is associated with a real-time communication application configured to initiate the real-time communication session; and/or an external computer system associated with the fifth user includes a particular application (e.g., a particular real-time video communication application)) is able to remove the second user from the real-time communication.

Enabling the fifth user to remove the second user from the real-time communication session improves security of the computer system by allowing participants, in addition to the first user, of the real-time communication session to identify and remove unauthorized participants. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second set of criteria includes a second requirement that the fifth user (e.g., "Ivy") is connected to the real-time communication session using a particular real-time communication application (e.g., "RTCApp") (e.g., a real-time communication application that is configured to enable and/or initiate the real-time communication session) in order for the second set of criteria to be met.

Enabling the fifth user to determine whether the second user is allowed to participate in the real-time communication session when the fifth user is connected to the real-time communication session using a particular real-time communication application improves security of the computer system by allowing a participant that has been authorized to join the real-time communication session to determine whether the second user is allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second set of criteria include a third requirement that the fifth user (e.g., "Ivy") has been participating in the real-time communication session for at least a threshold period of time (e.g., the fifth user joined the real-time communication session at a first time that is at least 30 seconds, 60 seconds, and/or 2 minutes prior to the time when the second user attempts to join the real-time communication session) in order for the second set of criteria to be met.

Enabling the fifth user to determine whether the second user is allowed to participate in the real-time communication session when an identifier of the fifth user is associated with a particular real-time communication application and when the fifth user has been participating in the real-time communication session for the threshold period of time improves security of the computer system by allowing a participant that has been authorized to join the real-time communication session to determine whether the second user is allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the second user (e.g., 918$d$ and/or 927$d$) includes a visual indication of identifier name of the second user (e.g., a first and/or last name, user name, and/or email address of the second user).

Including a visual indication of an identifier name of the second user provides improved feedback about the identity of the second user and improves security of the computer system by further verifying whether the second user is authorized to participate in the real-time communication session. Providing improved feedback and providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation (e.g., 918$d$ and/or 927$d$) of the second user includes a remove user interface object (e.g., 966 and/or 968) (e.g., an "X" overlaid and/or displayed adjacent to the representation of the second user) that, when selected via user input, causes the second user to be removed from the real-time communication session (e.g., the second user is no longer able to participate in the real-time communication session and communicate with the first user and/or the representation of the second user ceases to be displayed in response to selection of the remove user interface object).

Displaying the representation of the second user including the remove user interface object improves security of the computer system by enabling the first user and/or other participants of the real-time communication session to verify the identity of the second user and determine whether the second user should continue participating in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the requirement that the identity of the second user (e.g., 906 and/or "Lauren") has been verified as an invitee to the real-time communication session is satisfied when an identifier of the second user (e.g., a name, user name, phone number, and/or email address associated with the second user) is included in a list of verified invitees associated with the real-time communication session (e.g., a list of users selected by a host of the real-time communication session as invitees to join the real-time communication session) and the identifier of the second user is associated with a particular type of account (e.g., the identifier is linked to an account associated with a particular real-time communication application and/or the identifier is linked to an account that enables access to a particular real-time communication application).

Including the requirement that an identifier of the second user be included in a list of verified attendees and/or that the identifier of the second user is associated with a particular type of account provides improved security by confirming whether the second user was intended to be allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the requirement that the identity of the second user (e.g., 906 and/or "Lauren") has been verified as an invitee to the real-time communication session is satisfied when an email address of the second user is included in a list of verified invitees associated with the real-time communication session (e.g., a list of users selected by a host of the real-time communication session as invitees to join the real-time communication session) and the email address of the second user includes a predefined domain name (e.g., the email address includes a first portion associated with the second user (e.g., the recipient portion of the email address) and a second portion that specifies a particular domain name (e.g., the domain name portion of the email address)).

Including the requirement that an email address of the second user be included in a list of verified invitees and/or that the email address includes a predefined domain name provides improved security by confirming whether the second user was intended to be allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the requirement that the identity of the second user (e.g., 906 and/or "Lauren") has been verified as an invitee to the real-time communication session is not satisfied when an identifier of the second user (e.g., a name, user name, phone number, and/or email address associated with the second user) is included in a list of verified invitees associated with the real-time communication session (e.g., a list of users selected by a host of the real-time communication session as invitees to join the real-time communication session) and the identifier of the second user is not associated with a particular type of account (e.g., the identifier is not linked to an account associated with a particular real-time communication application and/or the identifier is not linked to an account that enables access to a particular real-time communication application).

Including the requirement that the identifier of the second user be associated with a particular type of account provides improved security by confirming whether the second user was intended to be allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the requirement that the identity of the second user (e.g., 906 and/or "Lauren") has been verified as an invitee to the real-time communication session is not satisfied when the second user attempts to join the real-time communication via a link (e.g., 910*a*) to the real-time communication session (e.g., the user selects and/or otherwise launches a uniform resource locator that is specific to the real-time communication session with the first user and/or other users that have been identified as invitees to the real-time communication session) and an identifier (e.g., a name, user name, phone number, and/or email address associated with the second user) of the second user is not associated with a particular type of account (e.g., the identifier is not linked to an account associated with a particular real-time communication application and/or the identifier is not linked to an account that enables access to a particular real-time communication application).

Including the requirement that, when the second user joins via a link to the real-time communication session, the identifier of the second user be associated with a particular type of account provides improved security by confirming whether the second user was intended to be allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the requirement that the identity of the second user (e.g., 906 and/or "Lauren") has been verified as an invitee to the real-time communication session is not satisfied when an identifier of the second user (e.g., a name, user name, phone number, and/or email address associated with the second user) is not included in a list of verified invitees associated with the real-time communication session (e.g., a list of users selected by a host of the real-time communication session as invitees to join the real-time communication session). In some embodiments, the requirement that the identity of the second user has been verified as an invitee to the real-time communication session is not satisfied when the identifier of the second user is not included in the list of verified invitees associated with the real-time communication session regardless of whether the identifier of the second user is associated with a particular type of account (e.g., the identifier is linked to an account associated with a particular real-time communication application and/or the identifier is linked to an account that enables access to a particular real-time communication application).

Including the requirement that the identifier of the second user be included in a list of verified invitees provides improved security by confirming whether the second user was intended to be allowed to participate in the real-time communication session. Providing improved security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIG. 10) are also applicable in an analogous manner to the methods described above. For example, methods 700 and 800 optionally includes one or more of the characteristics of the various methods described above with reference to method 1000. For example, the computer system of method 1000 can also be used for sharing a link to a real-time communication session and/or inviting a participant to a real-time communication session and joining the real-time communication session. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve a security of a computer system by limiting access to verified invitees of a real-time communication session. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to verify whether a user should be granted access to a real-time communication session and/or verified via user input. Accordingly, use of such personal information data enables users to have calculated control of users that join a real-time communication session. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of verifying users of a real-time communication session, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, computer systems can determine whether to allow a user to participate in a real-time communication session based on non-personal information data or a bare minimum amount of personal information.

What is claimed is:

1. A computer system that is in communication with a display generation component and one or more input devices, comprising:
   one or more processors; and
   memory storing one or more programs configured to be executed by the one or more processors, the one or more programs including instructions for:
      displaying, via the display generation component, a user interface of a real-time communication application, the user interface including a user-interactive graphical user interface element corresponding to a link to a real-time communication session;
      receiving, via the one or more input devices, user input corresponding to selection of the user-interactive graphical user interface element; and
      in response to receiving the user input:
         initiating a process to share the link to the real-time communication session, wherein the process to share the link to the real-time communication session includes displaying, via the display generation component, a sharing user interface including a plurality of selectable options for sharing the link to the real-time communication session, including concurrently displaying:
            a first selectable option for sharing the link to the real-time communication session via a first communication protocol; and
            a second selectable option for sharing the link to the real-time communication session via a second communication protocol that is different from the first communication protocol;
         after sharing the link to the real-time communication session, displaying a second user interface of the real-time communication application, wherein the second user interface concurrently displays:
            a first user interface object that represents the real-time communication session corresponding to the shared link; and
            a second user interface object that represents a previous real-time communication session that occurred prior to a current time.

2. The computer system of claim 1, wherein the one or more programs further include instructions for:
   detecting, via the one or more input devices, a second user input corresponding to selection of a selectable option of the plurality of selectable options; and
   in response to detecting the second user input:
      in accordance with a determination that the second user input corresponds to selection of the first selectable option, initiating the process to share the link to the real-time communication session via the first communication protocol; and
      in accordance with a determination that the second user input corresponds to selection of the second selectable option, initiating the process to share the link to the real-time communication session via the second communication protocol.

3. The computer system of claim 1, wherein the plurality of selectable options correspond to a plurality of communication protocols that include electronic mail and one or more real-time communication protocols.

4. The computer system of claim 1, wherein the plurality of selectable options correspond to a plurality of communication protocols that include a short message service protocol and one or more messaging protocols.

5. The computer system of claim 1, wherein the plurality of selectable options correspond to a plurality of communication protocols that include a first messaging communication protocol and a second messaging communication protocol.

6. The computer system of claim 1, wherein initiating the process to share the link to the real-time communication session includes:
   displaying, via the display generation component, one or more user-interactive graphical user interface objects that represent one or more previously contacted users and that, when selected, select a corresponding one or more previously contacted users with which to share the link to the real-time communication session.

7. The computer system of claim 1, wherein one or more of the plurality of selectable options correspond to a direct wireless sharing protocol.

8. The computer system of claim 1, wherein the one or more programs further include instructions for:
   receiving, via the one or more input devices, a third user input corresponding to selection of a messaging user-interactive graphical user interface object; and
   in response to receiving the third user input, displaying, via the display generation component, a messaging user interface of a messaging application, wherein the messaging user interface includes a message composition region that includes the link to the real-time communication session.

9. The computer system of claim 1, wherein displaying the second user interface includes displaying an animation of the first user interface object appearing in a list of real-time communication sessions.

10. The computer system of claim 1, wherein:
   the first user interface object is displayed in a first region of the second user interface corresponding to a first period of time, and
   the second user interface object is displayed in a second region of the second user interface corresponding to a second period of time, different from the first period of time.

11. The computer system of claim 1, wherein the one or more programs further include instructions for:
   receiving, via the one or more input devices, a fourth user input corresponding to selection of the first user interface object; and
   in response to receiving the fourth user input, displaying a representation of the real-time communication session that includes representations of real-time contributions of one or more participants in the real-time communication session.

12. The computer system of claim 1, wherein the one or more programs further include instructions for:
   after displaying the first user interface object that represents the real-time communication session corresponding to the shared link, detecting that a second user has joined the real-time communication session; and
   after detecting that the second user has joined the real-time communication session, detecting a request to display the first user interface object; and
   in response to detecting the request to display the first user interface object, displaying the first user interface object with an updated appearance in which a first portion of the first user interface object indicates that the second user joined the real-time communication session.

13. The computer system of claim 1, wherein the one or more programs further include instructions for:

after displaying the first user interface object that represents the real-time communication session corresponding to the shared link, detecting that a third user has joined the real-time communication session;

after detecting that the third user has joined the real-time communication session, detecting a request to display the first user interface object; and in response to detecting the request to display the first user interface object, displaying the first user interface object with a visual icon on a second portion of the first user interface object, wherein the visual icon indicates that the third user that joined the real-time communication session.

14. The computer system of claim 1, wherein the one or more programs further include instructions for:

while displaying, via the display generation component, a second messaging user interface of a second messaging application, receiving, via the one or more input devices, one or more user inputs corresponding to content of a message configured to be sent via the second messaging application to one or more participants in a message conversation; and in response to receiving the one or more user inputs:

in accordance with a determination that the content includes one or more predefined characters, displaying, via the display generation component, a selectable user interface object that, when selected via user input, is configured to initiate a process for sending a second link to a second real-time communication session to the one or more participants in the message conversation.

15. The computer system of claim 14, wherein the one or more programs further include instructions for:

while displaying the selectable user interface object, receiving a fifth user input corresponding to selection of the selectable user interface object; and in response to receiving the fifth user input corresponding to selection of the selectable user interface object, displaying, via the display generation component, the second link to the second real-time communication session in a second composition region of the second messaging user interface of the second messaging application.

16. The computer system of claim 15, wherein the one or more programs further include instructions for:

after receiving the fifth user input corresponding to selection of the selectable user interface object, displaying, via the display generation component, a fourth user interface of the real-time communication application, wherein the fourth user interface of the real-time communication application includes a third user interface object corresponding to the second link to the second real-time communication session.

17. The computer system of claim 14, wherein the second link to the second real-time communication session corresponds to a previously scheduled real-time communication session that was scheduled prior to receiving the one or more user inputs corresponding to the content of the message configured to be sent via the second messaging application.

18. The computer system of claim 17, wherein the one or more programs further include instructions for:

in response to detecting the one or more user inputs corresponding to content of the message configured to be sent via the second messaging application to one or more participants in a message conversation concurrently displaying, via the display generation component:

the selectable user interface object that, when selected via user input, is configured to initiate a process for sending the second link to the second real-time communication session, and a second selectable user interface object that, when selected via user input, is configured to generate a third link to a third real-time communication session, and wherein the third link to the third real-time communication session corresponds a new real-time communication that does not correspond to a previously scheduled real-time communication session.

19. The computer system of claim 1, wherein the one or more programs further include instructions for:

displaying, via the display generation component, a calendar user interface of a calendar application that includes a scheduling user interface object;

receiving, via the one or more input devices, a sixth user input corresponding to selection of the scheduling user interface object; and in response to receiving the sixth user input:

displaying, via the display generation component, an event scheduling user interface that includes a video conferencing user interface object that, when selected via user input, displays a video conferencing user interface.

20. The computer system of claim 19, wherein the one or more programs further include instructions for:

while displaying, via the display generation component, the event scheduling user interface, receiving, via the one or more input devices, a seventh user input corresponding to selection of the video conferencing user interface object; and in response to receiving the seventh user input:

displaying, via the display generation component, the video conferencing user interface that includes a plurality of video conferencing selectable options that correspond to respective applications for participating in the real-time communication session.

21. The computer system of claim 20, wherein the plurality of video conferencing selectable options includes a first video conferencing selectable option corresponding to a first application of the computer system that satisfies one or more criteria and a second video conferencing selectable option corresponding to a second application of the computer system that satisfies the one or more criteria.

22. The computer system of claim 21, wherein the one or more programs further include instructions for:

while displaying, via the display generation component, the video conferencing user interface, receiving, via the one or more input devices, eighth user input corresponding to selection of the first video conferencing selectable option of the plurality of selectable video conferencing options; and in response to receiving the eighth user input:

displaying, via the display generation component, a plurality of selectable settings options, wherein the plurality of selectable settings options correspond to available settings of the first application of the computer system.

23. A non-transitory computer-readable storage medium storing one or more programs configured to be executed by one or more processors of a computer system that is in communication with a display generation component and one or more input devices, the one or more programs including instructions for:

displaying, via the display generation component, a user interface of a real-time communication application, the user interface including a user-interactive graphical user interface element corresponding to a link to a real-time communication session;

receiving, via the one or more input devices, user input corresponding to selection of the user-interactive graphical user interface element; and in response to receiving the user input:

initiating a process to share the link to the real-time communication session, wherein the process to share the link to the real-time communication session includes displaying, via the display generation component, a sharing user interface including a plurality of selectable options for sharing the link to the real-time communication session, including concurrently displaying:

a first selectable option for sharing the link to the real-time communication session via a first communication protocol; and a second selectable option for sharing the link to the real-time communication session via a second communication protocol that is different from the first communication protocol;

after sharing the link to the real-time communication session, displaying a second user interface of the real-time communication application, wherein the second user interface concurrently displays:

a first user interface object that represents the real-time communication session corresponding to the shared link; and a second user interface object that represents a previous real-time communication session that occurred prior to a current time.

24. The non-transitory computer-readable storage medium of claim 23, wherein the one or more programs further include instructions for:

detecting, via the one or more input devices, a second user input corresponding to selection of a selectable option of the plurality of selectable options; and in response to detecting the second user input:

in accordance with a determination that the second user input corresponds to selection of the first selectable option, initiating the process to share the link to the real-time communication session via the first communication protocol; and in accordance with a determination that the second user input corresponds to selection of the second selectable option, initiating the process to share the link to the real-time communication session via the second communication protocol.

25. The non-transitory computer-readable storage medium of claim 23, wherein the plurality of selectable options correspond to a plurality of communication protocols that include electronic mail and one or more real-time communication protocols.

26. The non-transitory computer-readable storage medium of claim 23, wherein the plurality of selectable options correspond to a plurality of communication protocols that include a short message service protocol and one or more messaging protocols.

27. The non-transitory computer-readable storage medium of claim 23, wherein the plurality of selectable options correspond to a plurality of communication protocols that include a first messaging communication protocol and a second messaging communication protocol.

28. The non-transitory computer-readable storage medium of claim 23, wherein initiating the process to share the link to the real-time communication session includes:

displaying, via the display generation component, one or more user-interactive graphical user interface objects that represent one or more previously contacted users and that, when selected, select a corresponding one or more previously contacted users with which to share the link to the real-time communication session.

29. The non-transitory computer-readable storage medium of claim 23, wherein one or more of the plurality of selectable options correspond to a direct wireless sharing protocol.

30. The non-transitory computer-readable storage medium of claim 23, wherein the one or more programs further include instructions for:

receiving, via the one or more input devices, a third user input corresponding to selection of a messaging user-interactive graphical user interface object; and in response to receiving the third user input, displaying, via the display generation component, a messaging user interface of a messaging application, wherein the messaging user interface includes a message composition region that includes the link to the real-time communication session.

31. The non-transitory computer-readable storage medium of claim 23, wherein displaying the second user interface includes displaying an animation of the first user interface object appearing in a list of real-time communication sessions.

32. The non-transitory computer-readable storage medium of claim 23, wherein:

the first user interface object is displayed in a first region of the second user interface corresponding to a first period of time, and the second user interface object is displayed in a second region of the second user interface corresponding to a second period of time, different from the first period of time.

33. The non-transitory computer-readable storage medium of claim 23, wherein the one or more programs further include instructions for:

receiving, via the one or more input devices, a fourth user input corresponding to selection of the first user interface object; and in response to receiving the fourth user input, displaying a representation of the real-time communication session that includes representations of real-time contributions of one or more participants in the real-time communication session.

34. The non-transitory computer-readable storage medium of claim 23, wherein the one or more programs further include instructions for:

after displaying the first user interface object that represents the real-time communication session corresponding to the shared link, detecting that a second user has joined the real-time communication session; and after detecting that the second user has joined the real-time communication session, detecting a request to display the first user interface object; and in response to detecting the request to display the first user interface object, displaying the first user interface object with an updated appearance in which a first portion of the first user interface object indicates that the second user joined the real-time communication session.

35. The non-transitory computer-readable storage medium of claim 23, wherein the one or more programs further include instructions for:

after displaying the first user interface object that represents the real-time communication session corresponding to the shared link, detecting that a third user has joined the real-time communication session;

after detecting that the third user has joined the real-time communication session, detecting a request to display the first user interface object; and in response to detecting the request to display the first user interface object, displaying the first user interface object with a visual icon on a second portion of the first user interface object, wherein the visual icon indicates that the third user that joined the real-time communication session.

36. The non-transitory computer-readable storage medium of claim 23, wherein the one or more programs further include instructions for:

while displaying, via the display generation component, a second messaging user interface of a second messaging application, receiving, via the one or more input devices, one or more user inputs corresponding to content of a message configured to be sent via the second messaging application to one or more participants in a message conversation; and in response to receiving the one or more user inputs:
in accordance with a determination that the content includes one or more predefined characters, displaying, via the display generation component, a selectable user interface object that, when selected via user input, is configured to initiate a process for sending a second link to a second real-time communication session to the one or more participants in the message conversation.

37. The non-transitory computer-readable storage medium of claim 36, wherein the one or more programs further include instructions for:

while displaying the selectable user interface object, receiving a fifth user input corresponding to selection of the selectable user interface object; and in response to receiving the fifth user input corresponding to selection of the selectable user interface object, displaying, via the display generation component, the second link to the second real-time communication session in a second composition region of the second messaging user interface of the second messaging application.

38. The non-transitory computer-readable storage medium of claim 37, wherein the one or more programs further include instructions for:

after receiving the fifth user input corresponding to selection of the selectable user interface object, displaying, via the display generation component, a fourth user interface of the real-time communication application, wherein the fourth user interface of the real-time communication application includes a third user interface object corresponding to the second link to the second real-time communication session.

39. The non-transitory computer-readable storage medium of claim 36, wherein the second link to the second real-time communication session corresponds to a previously scheduled real-time communication session that was scheduled prior to receiving the one or more user inputs corresponding to the content of the message configured to be sent via the second messaging application.

40. The non-transitory computer-readable storage medium of claim 39, wherein the one or more programs further include instructions for:

in response to detecting the one or more user inputs corresponding to content of the message configured to be sent via the second messaging application to one or more participants in a message conversation concurrently displaying, via the display generation component:

the selectable user interface object that, when selected via user input, is configured to initiate a process for sending the second link to the second real-time communication session, and a second selectable user interface object that, when selected via user input, is configured to generate a third link to a third real-time communication session, and wherein the third link to the third real-time communication session corresponds a new real-time communication that does not correspond to a previously scheduled real-time communication session.

41. The non-transitory computer-readable storage medium of claim 23, wherein the one or more programs further include instructions for:

displaying, via the display generation component, a calendar user interface of a calendar application that includes a scheduling user interface object;

receiving, via the one or more input devices, a sixth user input corresponding to selection of the scheduling user interface object; and in response to receiving the sixth user input:
displaying, via the display generation component, an event scheduling user interface that includes a video conferencing user interface object that, when selected via user input, displays a video conferencing user interface.

42. The non-transitory computer-readable storage medium of claim 41, wherein the one or more programs further include instructions for:

while displaying, via the display generation component, the event scheduling user interface, receiving, via the one or more input devices, a seventh user input corresponding to selection of the video conferencing user interface object; and in response to receiving the seventh user input:
displaying, via the display generation component, the video conferencing user interface that includes a plurality of video conferencing selectable options that correspond to respective applications for participating in the real-time communication session.

43. The non-transitory computer-readable storage medium of claim 42, wherein the plurality of video conferencing selectable options includes a first video conferencing selectable option corresponding to a first application of the computer system that satisfies one or more criteria and a second video conferencing selectable option corresponding to a second application of the computer system that satisfies the one or more criteria.

44. The non-transitory computer-readable storage medium of claim 43, wherein the one or more programs further include instructions for:

while displaying, via the display generation component, the video conferencing user interface, receiving, via the one or more input devices, eighth user input corresponding to selection of the first video conferencing selectable option of the plurality of selectable video conferencing options; and in response to receiving the eighth user input:
displaying, via the display generation component, a plurality of selectable settings options, wherein the plurality of selectable settings options correspond to available settings of the first application of the computer system.

45. A method, comprising:
at a computer system that is in communication with a display generation component and one or more input devices:
displaying, via the display generation component, a user interface of a real-time communication application, the user interface including a user-interactive graphical user interface element corresponding to a link to a real-time communication session;
receiving, via the one or more input devices, user input corresponding to selection of the user-interactive graphical user interface element; and
in response to receiving the user input:
initiating a process to share the link to the real-time communication session, wherein the process to share the link to the real-time communication session includes displaying, via the display generation component, a sharing user interface including a plurality of selectable options for sharing the link to the real-time communication session, including concurrently displaying:
a first selectable option for sharing the link to the real-time communication session via a first communication protocol; and
a second selectable option for sharing the link to the real-time communication session via a second communication protocol that is different from the first communication protocol;
after sharing the link to the real-time communication session, displaying a second user interface of the real-time communication application, wherein the second user interface concurrently displays:
a first user interface object that represents the real-time communication session corresponding to the shared link; and
a second user interface object that represents a previous real-time communication session that occurred prior to a current time.

46. The method of claim 45, further comprising:
detecting, via the one or more input devices, a second user input corresponding to selection of a selectable option of the plurality of selectable options; and
in response to detecting the second user input:
in accordance with a determination that the second user input corresponds to selection of the first selectable option, initiating the process to share the link to the real-time communication session via the first communication protocol; and
in accordance with a determination that the second user input corresponds to selection of the second selectable option, initiating the process to share the link to the real-time communication session via the second communication protocol.

47. The method of claim 45, wherein the plurality of selectable options correspond to a plurality of communication protocols that include electronic mail and one or more real-time communication protocols.

48. The method of claim 45, wherein the plurality of selectable options correspond to a plurality of communication protocols that include a short message service protocol and one or more messaging protocols.

49. The method of claim 45, wherein the plurality of selectable options correspond to a plurality of communication protocols that include a first messaging communication protocol and a second messaging communication protocol.

50. The method of claim 45, wherein initiating the process to share the link to the real-time communication session includes:
displaying, via the display generation component, one or more user-interactive graphical user interface objects that represent one or more previously contacted users and that, when selected, select a corresponding one or more previously contacted users with which to share the link to the real-time communication session.

51. The method of claim 45, wherein one or more of the plurality of selectable options correspond to a direct wireless sharing protocol.

52. The method of claim 45, further comprising:
receiving, via the one or more input devices, a third user input corresponding to selection of a messaging user-interactive graphical user interface object; and
in response to receiving the third user input, displaying, via the display generation component, a messaging user interface of a messaging application, wherein the messaging user interface includes a message composition region that includes the link to the real-time communication session.

53. The method of claim 45, wherein displaying the second user interface includes displaying an animation of the first user interface object appearing in a list of real-time communication sessions.

54. The method of claim 45, wherein:
the first user interface object is displayed in a first region of the second user interface corresponding to a first period of time, and
the second user interface object is displayed in a second region of the second user interface corresponding to a second period of time, different from the first period of time.

55. The method of claim 45, further comprising:
receiving, via the one or more input devices, a fourth user input corresponding to selection of the first user interface object; and
in response to receiving the fourth user input, displaying a representation of the real-time communication session that includes representations of real-time contributions of one or more participants in the real-time communication session.

56. The method of claim 45, further comprising:
after displaying the first user interface object that represents the real-time communication session corresponding to the shared link, detecting that a second user has joined the real-time communication session; and
after detecting that the second user has joined the real-time communication session, detecting a request to display the first user interface object; and
in response to detecting the request to display the first user interface object, displaying the first user interface object with an updated appearance in which a first portion of the first user interface object indicates that the second user joined the real-time communication session.

57. The method of claim 45, further comprising:
after displaying the first user interface object that represents the real-time communication session corresponding to the shared link, detecting that a third user has joined the real-time communication session;
after detecting that the third user has joined the real-time communication session, detecting a request to display the first user interface object; and in response to detecting the request to display the first user interface object, displaying the first user interface object with a visual icon on a second portion of the first user interface object, wherein the visual icon indicates that the third user that joined the real-time communication session.

58. The method of claim 45, further comprising:
while displaying, via the display generation component, a second messaging user interface of a second messaging application, receiving, via the one or more input devices, one or more user inputs corresponding to content of a message configured to be sent via the second messaging application to one or more participants in a message conversation; and
in response to receiving the one or more user inputs:
   in accordance with a determination that the content includes one or more predefined characters, displaying, via the display generation component, a selectable user interface object that, when selected via user input, is configured to initiate a process for sending a second link to a second real-time communication session to the one or more participants in the message conversation.

59. The method of claim 58, further comprising:
while displaying the selectable user interface object, receiving a fifth user input corresponding to selection of the selectable user interface object; and
in response to receiving the fifth user input corresponding to selection of the selectable user interface object, displaying, via the display generation component, the second link to the second real-time communication session in a second composition region of the second messaging user interface of the second messaging application.

60. The method of claim 59, further comprising:
after receiving the fifth user input corresponding to selection of the selectable user interface object, displaying, via the display generation component, a fourth user interface of the real-time communication application, wherein the fourth user interface of the real-time communication application includes a third user interface object corresponding to the second link to the second real-time communication session.

61. The method of claim 58, wherein the second link to the second real-time communication session corresponds to a previously scheduled real-time communication session that was scheduled prior to receiving the one or more user inputs corresponding to the content of the message configured to be sent via the second messaging application.

62. The method of claim 61, further comprising:
in response to detecting the one or more user inputs corresponding to content of the message configured to be sent via the second messaging application to one or more participants in a message conversation concurrently displaying, via the display generation component:
   the selectable user interface object that, when selected via user input, is configured to initiate a process for sending the second link to the second real-time communication session, and
   a second selectable user interface object that, when selected via user input, is configured to generate a third link to a third real-time communication session, and wherein the third link to the third real-time communication session corresponds a new real-time communication that does not correspond to a previously scheduled real-time communication session.

63. The method of claim 45, further comprising:
displaying, via the display generation component, a calendar user interface of a calendar application that includes a scheduling user interface object;
receiving, via the one or more input devices, a sixth user input corresponding to selection of the scheduling user interface object; and
in response to receiving the sixth user input:
   displaying, via the display generation component, an event scheduling user interface that includes a video conferencing user interface object that, when selected via user input, displays a video conferencing user interface.

64. The method of claim 63, further comprising:
while displaying, via the display generation component, the event scheduling user interface, receiving, via the one or more input devices, a seventh user input corresponding to selection of the video conferencing user interface object; and
in response to receiving the seventh user input:
   displaying, via the display generation component, the video conferencing user interface that includes a plurality of video conferencing selectable options that correspond to respective applications for participating in the real-time communication session.

65. The method of claim 64, wherein the plurality of video conferencing selectable options includes a first video conferencing selectable option corresponding to a first application of the computer system that satisfies one or more criteria and a second video conferencing selectable option corresponding to a second application of the computer system that satisfies the one or more criteria.

66. The method of claim 65, further comprising:
while displaying, via the display generation component, the video conferencing user interface, receiving, via the one or more input devices, eighth user input corresponding to selection of the first video conferencing selectable option of the plurality of selectable video conferencing options; and
in response to receiving the eighth user input:
   displaying, via the display generation component, a plurality of selectable settings options, wherein the plurality of selectable settings options correspond to available settings of the first application of the computer system.

* * * * *